United States Patent
Unagami et al.

(10) Patent No.: US 8,707,430 B2
(45) Date of Patent: Apr. 22, 2014

(54) TAMPERING MONITORING SYSTEM, MANAGEMENT APPARATUS, AND MANAGEMENT METHOD

(75) Inventors: Yuji Unagami, Osaka (JP); Yuichi Futa, Osaka (JP); Natsume Matsuzaki, Osaka (JP); Hiroki Shizuya, Sendai (JP); Masao Sakai, Sendai (JP); Shuji Isobe, Sendai (JP); Eisuke Koizumi, Sendai (JP); Shingo Hasegawa, Sendai (JP)

(73) Assignee: Panasonic Corporation, Osaka (JP)

( * ) Notice: Subject to any disclaimer, the term of this patent is extended or adjusted under 35 U.S.C. 154(b) by 219 days.

(21) Appl. No.: 13/089,433

(22) Filed: Apr. 19, 2011

(65) Prior Publication Data

US 2011/0265180 A1  Oct. 27, 2011

(30) Foreign Application Priority Data

Apr. 26, 2010  (JP) ................. 2010-100611

(51) Int. Cl.
  *G06F 11/00*  (2006.01)
  *G06F 12/14*  (2006.01)
  *G06F 12/16*  (2006.01)
  *G08B 23/00*  (2006.01)

(52) U.S. Cl.
  USPC ............. 726/22; 709/224; 713/188; 713/194

(58) Field of Classification Search
  USPC ................. 726/22–26; 713/188, 194
  See application file for complete search history.

(56) References Cited

U.S. PATENT DOCUMENTS

| | | | |
|---|---|---|---|
| 6,029,197 A * | 2/2000 | Erimli et al. | 709/223 |
| 6,065,053 A * | 5/2000 | Nouri et al. | 709/224 |
| 6,073,165 A * | 6/2000 | Narasimhan et al. | 709/206 |
| 6,128,279 A * | 10/2000 | O'Neil et al. | 370/229 |
| 6,219,708 B1 * | 4/2001 | Martenson | 709/226 |
| 6,301,266 B1 * | 10/2001 | Peterson et al. | 370/465 |

(Continued)

FOREIGN PATENT DOCUMENTS

| | | |
|---|---|---|
| JP | 3056732 | 4/2000 |
| WO | 2008/099682 | 8/2008 |
| WO | 2009/118800 | 10/2009 |

OTHER PUBLICATIONS

Tatsuaki Okamoto and Hirosuke Yamamoto, "Gendai Ango" (Modern Encryption), Sangyo Tosho, 1997 with verified partial translation.

(Continued)

*Primary Examiner* — Dustin Nguyen
(74) *Attorney, Agent, or Firm* — Wenderoth, Liind & Ponack, L.L.P.

(57) ABSTRACT

An information security apparatus includes a plurality of monitoring modules that monitor for tampering. A management apparatus includes a reception unit that receives a plurality of monitoring results each generated by a source monitoring module monitoring a target monitoring module; a detection unit that detects an abnormality by referring to fewer than all of the received monitoring results; and an identification unit that identifies, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target of monitoring to the source of monitoring, starting from the monitoring module that generates the monitoring result related to the abnormality.

9 Claims, 64 Drawing Sheets

(56) References Cited

U.S. PATENT DOCUMENTS

| | | | |
|---|---|---|---|
| 6,539,266 B1 | 3/2003 | Ishikawa | |
| 7,904,726 B2* | 3/2011 | Elgezabal | 713/176 |
| 8,230,228 B2* | 7/2012 | Hahn et al. | 713/179 |
| 8,458,798 B2* | 6/2013 | Williams et al. | 726/25 |
| 2006/0047805 A1* | 3/2006 | Byrd et al. | 709/224 |
| 2008/0244739 A1* | 10/2008 | Liu et al. | 726/22 |
| 2009/0193521 A1* | 7/2009 | Matsushima et al. | 726/22 |
| 2010/0107245 A1* | 4/2010 | Jakubowski et al. | 726/22 |
| 2010/0180343 A1 | 7/2010 | Maeda et al. | |
| 2010/0235588 A1 | 9/2010 | Maeda et al. | |
| 2010/0310068 A1* | 12/2010 | Fischer | 380/43 |
| 2012/0096565 A1* | 4/2012 | Ou et al. | 726/26 |

OTHER PUBLICATIONS

ITU-T Recommendation X.509 (1997 E): Information Technology—Open Systems Interconnection—The Directory: Authentication Framework, 1997.

F. Preparata, G. Metze and R.T. Chien, "On the Connection Assignment Problem of Diagnosable Systems", IEEE Trans. Electronic Computers, vol. 16, pp. 848-854, 1968.

* cited by examiner

FIG.56

Monitoring result C112

| ID | Source monitoring module | Target monitoring module | Result | Time of monitoring |
|----|--------------------------|--------------------------|--------|--------------------|
| 0 | 1 | 2 | ○ | 2011.1.31 13:00 | C100
| 1 | 1 | 3 | ○ | 2011.1.31 13:00 | C101
| 3 | 2 | 4 | ○ | 2011.1.31 13:00 | C103
| 6 | 3 | 6 | × | 2011.1.31 13:00 | C106
| 7 | 4 | 6 | ○ | 2011.1.31 13:00 | C107
| ... | ... | ... | ... | ... |

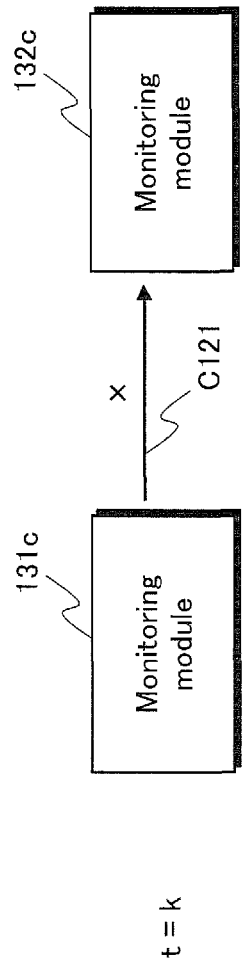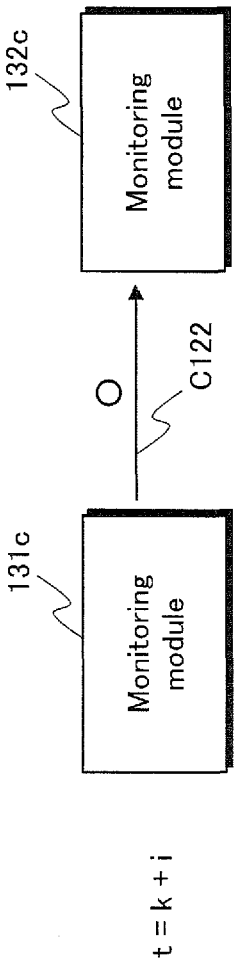
FIG.58A
FIG.58B

FIG.59

| | | Monitoring result | | | |
|---|---|---|---|---|---|
| ID | Source monitoring module | Target monitoring module | Result | Time of monitoring | |
| 1 | 1 | 2 | × | 2011.1.31 13:00 | ← C121 |
| 2 | 1 | 2 | ○ | 2011.2.5 9:00 | ← C122 |
| ... | ... | ... | ... | ... | |

C120

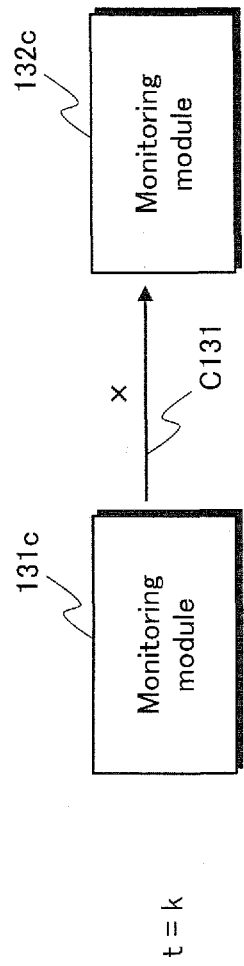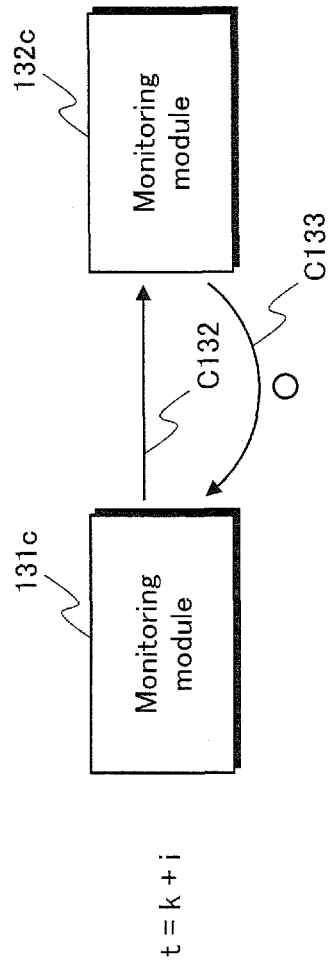

FIG.61

| ID | Source monitoring module | Target monitoring module | Result | Time of monitoring |
|---|---|---|---|---|
| 1 | 1 | 2 | × | 2011.1.31 13:00 |
| 2 | 2 | 1 | ○ | 2011.2.5 9:00 |
| ... | ... | ... | ... | ... |

Monitoring result C130, C131, C133

FIG.64

Monitoring pattern

| ID | Source monitoring module | Target monitoring module | D106 |
|---|---|---|---|
| 6 | 2 | 4 | |

Monitoring pattern

| ID | Source monitoring module | Target monitoring module | D101 |
|---|---|---|---|
| 1 | 4 | 3 | |

Monitoring pattern

| ID | Source monitoring module | Target monitoring module | D102 |
|---|---|---|---|
| 2 | 3 | 6 | |

Monitoring pattern

| ID | Source monitoring module | Target monitoring module | D103 |
|---|---|---|---|
| 3 | 6 | 7 | |

Monitoring pattern

| ID | Source monitoring module | Target monitoring module | D104 |
|---|---|---|---|
| 4 | 7 | 5 | |

Monitoring pattern

| ID | Source monitoring module | Target monitoring module | D105 |
|---|---|---|---|
| 5 | 5 | 2 | |

TAMPERING MONITORING SYSTEM, MANAGEMENT APPARATUS, AND MANAGEMENT METHOD

This application is based on an application No. 2010-100611 filed in Japan, the content of which is hereby incorporated by reference.

BACKGROUND OF INVENTION

1. Technical Field

The present invention relates to management technology that monitors tampering in modules or the like that operate inside devices such as information security apparatuses.

2. Background Art

A conventionally known method of ensuring that an application program that stores confidential data, such as an authentication key, is not analyzed by a malicious third party (hereinafter, "attacker"), is to protect the application program with an anti-tamper module. The anti-tamper module is normally provided on the device as hardware and protects application programs. However, in light of how new attack methods are continually being proposed these days, it is preferable to protect application programs with software, i.e. with a computer program that can easily be updated to respond flexibly to new attack methods.

Technology to protect application programs via software includes verification of tampering using hash values. Another example is a decryption loading function, whereby application programs are encrypted and stored when not in use. Application programs are decrypted and loaded into memory only when used.

Even when using such technology, however, the very software that is used to protect application programs (hereinafter, a "protection control module") may be subject to attack. If the protection control module is tampered with, application programs are also exposed to attack.

Patent Literature 1 discloses technology for preventing changes to a program that reliably precludes execution of a program that has been tampered with even when changes occur in a check program that checks whether another program has changed. With this technology, a plurality of check programs that monitor changes in other programs are provided in a computer system, with each check program monitoring one or more of the other check programs. The following is a brief description of this technology.

With this technology, two monitoring modules A and B monitor each other. The monitoring modules A and B respectively include programs that are to be protected from tampering by an attacker (main programs A and B), programs for detecting whether other modules have been tampered with (check programs A and B), and information necessary for the check programs to detect tampering (check information A and B). Check program A uses check information A to detect whether the main program B and the check program B in the monitoring module B have been tampered with. Furthermore, check program B uses check information B to detect whether the main program A and the check program A in the monitoring module A have been tampered with. The monitoring modules thereby detect whether each other's main program and check program have been tampered with.

CITATION LIST

Patent Literature

Patent Literature 1: Japanese Patent No. 3056732
Patent Literature 2: WO2008/099682
Patent Literature 3: WO2009/118800

Non-Patent Literature

Non-Patent Literature 1: Tatsuaki OKAMOTO and Hirosuke YAMAMOTO, "Gendai Ango" (Modern Encryption), Sangyo Tosho, 1997.
Non-Patent Literature 2: ITU-T Recommendation X.509 (1997 E): Information Technology—Open Systems Interconnection—The Directory: Authentication Framework, 1997.
Non-Patent Literature 3: F. Preparata, G Metze and R. T. Chien, "On The Connection Assignment Problem of Diagnosable Systems," IEEE Trans. Electronic Computers, vol. 16, pp. 848-854, 1968.

SUMMARY OF INVENTION

As described in Patent Literature 1, by setting up a plurality of monitoring modules to monitor each other, if one of the monitoring modules is tampered with, the remaining monitoring modules that have not been tampered with can be used to detect the tampering, thus improving safety in the computer system.

However, if the number of monitoring modules increases, the number of monitoring results increases proportionally. For example, when n monitoring modules completely monitor each other, the number of monitoring results can be expressed as $n(n-1)/2$. In this case, the number of monitoring results increases dramatically faster than the number of monitoring modules. Therefore, when the number of monitoring modules increases and monitoring results are to be used to analyze whether tampering has occurred, the amount of calculation required for analysis grows quite large, causing the problem of an increased processing load on the device.

In order to solve this problem, it is an object of the present invention to provide a tampering monitoring system, a management device, a management method, an integrated circuit, a program, and a recording medium that identify tampering in a monitoring module without greatly increasing the amount of calculation required for analysis of monitoring results.

In order to achieve the above object, an aspect of the present invention is a management apparatus for managing an information security apparatus that includes a plurality of monitoring modules that monitor for tampering, the management apparatus comprising: a reception unit configured to receive, from the information security apparatus, a plurality of monitoring results each generated by a source monitoring module monitoring a target monitoring module, the source and the target each being one of the monitoring modules; a detection unit configured to detect an abnormality by referring to fewer than all of the monitoring results received by the reception unit; and an identification unit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

With this structure, an abnormality is detected by referring to fewer than all of the monitoring results, and a monitoring module that has been tampered with is identified from among (i) the monitoring module that generates the monitoring result related to the abnormality, and (ii) one or more monitoring modules identified by tracing back through a chain of monitoring modules consecutively from the target to the source, starting from the monitoring module that generates the monitoring result related to the abnormality. This achieves the highly advantageous effect of identifying a monitoring module that has been tampered with while not greatly increasing the amount of calculation necessary for analysis of monitoring results.

BRIEF DESCRIPTION OF DRAWINGS

These and the other objects, advantages and features of the invention will become apparent from the following description thereof taken in conjunction with the accompanying drawings which illustrate a specific embodiment of the invention.

FIG. 35 is a configuration diagram of a protection control module 120a.

FIG. 36 is a configuration diagram of a detection module 131a.

FIG. 56 shows an example of a data structure of a set of monitoring results C112 received from the information security apparatus 100c.

FIGS. 58A and 58B show another example of monitoring results received from the information security apparatus 100c, with FIG. 58A showing a monitoring result for time t=k, and FIG. 58B showing a monitoring result for time t=k+i.

FIG. 59 shows an example of a data structure of another set of monitoring results C120 received from the information security apparatus 100c.

FIGS. 60A and 60B show yet another example of monitoring results received from the information security apparatus 100c, with FIG. 60A showing a monitoring result for time t=k, and FIG. 60B showing a monitoring result for time t=k+i.

FIG. 61 shows an example of a data structure of yet another set of monitoring results C130 received from the information security apparatus 100c.

FIG. 64 shows an example of a data structure of a cyclic monitoring pattern D101, D102, . . . , D106.

DETAILED DESCRIPTION OF INVENTION

Figure 1:
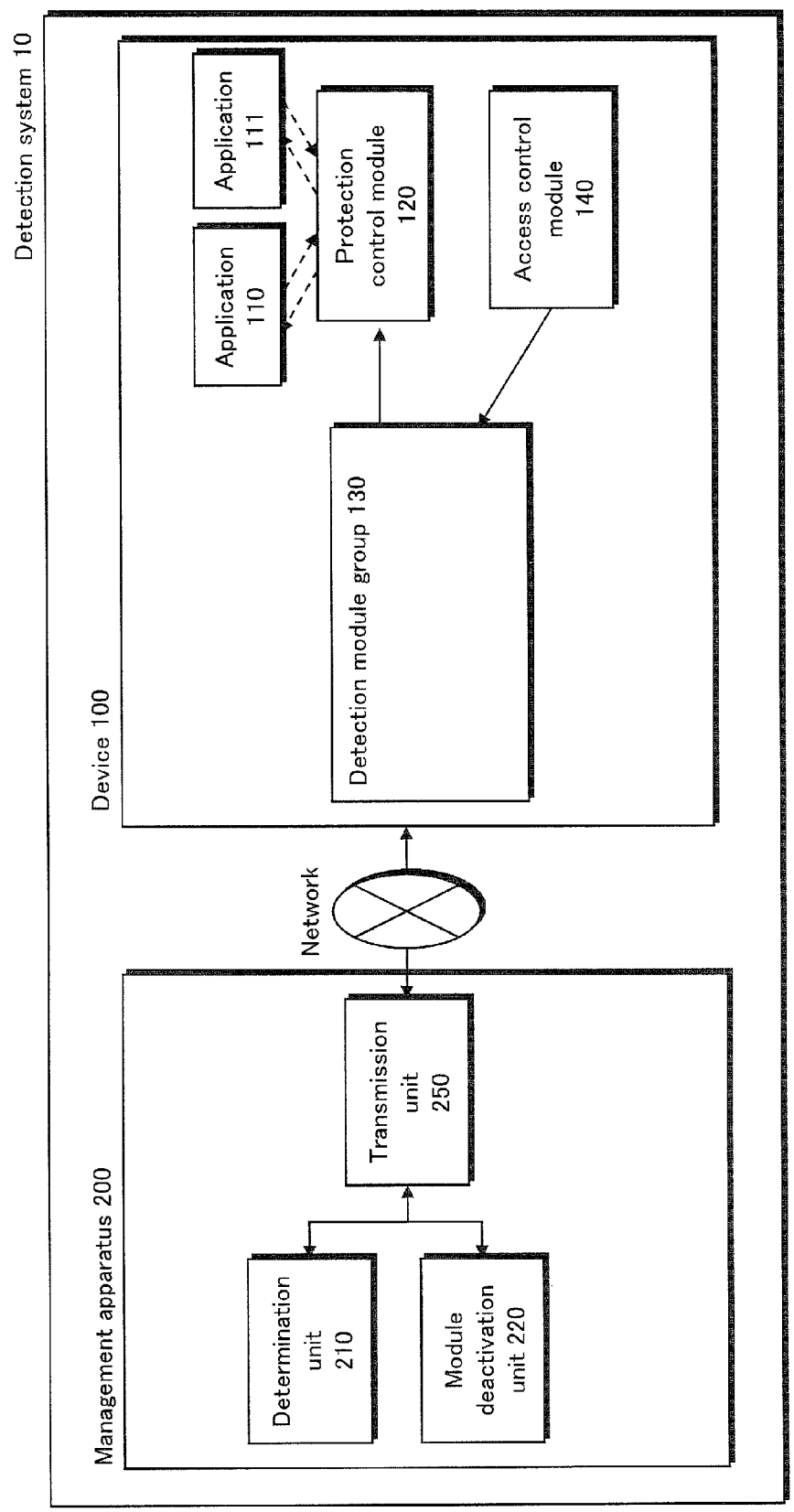
FIG. 1 is an overall structure diagram of a detection system 10 according to Embodiment 1 of the present invention.

An aspect of the present invention is a management apparatus for managing an information security apparatus that includes a plurality of monitoring modules that monitor for tampering, the management apparatus comprising: a reception unit configured to receive, from the information security apparatus, a plurality of monitoring results each generated by a source monitoring module monitoring a target monitoring module, the source and the target each being one of the monitoring modules; a detection unit configured to detect an abnormality by referring to fewer than all of the monitoring results received by the reception unit; and an identification unit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

The detection unit may detect, as the abnormality, an inconsistency between two or more monitoring results for one of the monitoring modules, and the identification unit may identify the monitoring module that has been tampered with by tracing back through chains of monitoring modules by referring to the two or more monitoring results.

The monitoring modules in the information security apparatus may each monitor one or more other monitoring modules for tampering at a point in time and transmit the monitoring results, the reception unit may receive the monitoring results for the point in time, the detection unit may detect the inconsistency by determining whether, among the monitoring results received by the reception unit, a first monitoring result and a second monitoring result for one of the monitoring modules match, and the identification unit may (i) consecutively trace back through chains of monitoring modules, respectively starting with the first monitoring result and the second monitoring result, by referring to other monitoring results that indicate no tampering, (ii) determine whether an identical monitoring module is arrived at, and (iii) when determining positively, identify the identical monitoring module as the monitoring module that has been tampered with.

The monitoring modules in the information security apparatus may each monitor one or more of the other monitoring modules for tampering at a first point in time and at a later second point in time and transmit the monitoring results at the respective points in time, the reception unit may receive the monitoring results for the first point in time and the monitoring results for the second point in time, the detection unit may detect, among the monitoring results received by the reception unit, the inconsistency when (i) a first monitoring result by a first monitoring module for a second monitoring module at the first point in time indicates that the second monitoring module has been tampered with, and (ii) a second monitoring result by the first monitoring module for the second monitoring module at the second point in time indicates that the second monitoring module has not been tampered with, and when the detection unit detects the inconsistency, the identification unit may identify the first monitoring module as the monitoring module that has been tampered with.

The monitoring modules in the information security apparatus may each monitor one or more of the other monitoring modules for tampering at a first point in time and at a later second point in time and transmit the monitoring results at the respective points in time, the reception unit may receive the monitoring results for the first point in time and the monitoring results for the second point in time, the detection unit may detect, among the monitoring results received by the reception unit, the abnormality when (i) a first monitoring result by a first monitoring module for a second monitoring module at the first point in time indicates that the second monitoring module has been tampered with, and (ii) a second monitoring result by the second monitoring module for the first monitoring module at the second point in time indicates that the first monitoring module has not been tampered with, and when the first monitoring result indicates that the second monitoring module has been tampered with and the second monitoring result indicates that the first monitoring module has not been tampered with, the identification unit may identify the second monitoring module as the monitoring module that has been tampered with.

Another aspect of the present invention is a management method used in a management apparatus for managing an information security apparatus that includes a plurality of monitoring modules that monitor for tampering, the management method comprising the steps of: a) receiving, from the information security apparatus, a plurality of monitoring results each generated by a source monitoring module monitoring a target monitoring module, the source and the target each being one of the monitoring modules; b) detecting an abnormality by referring to fewer than all of the monitoring results received in step a); and c) identifying, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is a computer-readable recording medium having recorded thereon a computer program for management used in a management apparatus for managing an information security apparatus that includes a plurality of monitoring modules that monitor for tampering, the computer program causing the management apparatus, which is a computer, to execute the steps of: a) receiving, from the information security apparatus, a plurality of monitoring results each generated by a source monitoring module monitoring a target monitoring module, the source and the target each being one of the monitoring modules; b) detecting an abnormality by referring to fewer than all of the monitoring results received in step a); and c) identifying, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is an integrated circuit for managing an information security apparatus that includes a plurality of monitoring modules that monitor for tampering, the integrated circuit comprising: a reception unit configured to receive, from the information security apparatus, a plurality of monitoring results each generated by a source monitoring module monitoring a target monitoring module, the source and the target each being one of the monitoring modules; a detection unit configured to detect an abnormality by referring to fewer than all of the monitoring results received by the reception unit; and an identification unit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is a monitoring system formed by an information security apparatus that includes a plurality of monitoring modules that monitor for tampering and a management apparatus for managing the information security apparatus, the management apparatus comprising: a reception unit configured to receive, from the information security apparatus, a plurality of monitoring results each generated by a source monitoring module monitoring a target monitoring module, the source and the target each being one of the monitoring modules; a detection unit configured to detect an abnormality by referring to fewer than all of the monitoring results received by the reception unit; and an identification unit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is a management apparatus for managing an information security apparatus that includes a plurality of monitoring modules that monitor for tampering, the management apparatus comprising: an identification unit configured to identify a monitoring module that has been tampered with among the monitoring modules; a generation unit configured to generate a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and a transmission unit configured to transmit the monitoring patterns for the normal monitoring modules to the information security apparatus, wherein upon receiving the monitoring patterns for the normal monitoring modules, the information security apparatus causes the normal monitoring modules each to store the corresponding monitoring pattern.

The monitoring patterns generated by the generation unit may form a cyclic monitoring pattern.

Another aspect of the present invention is a management method used in a management apparatus for managing an information security apparatus that includes a plurality of monitoring modules that monitor for tampering, the management method comprising the steps of: a) identifying a monitoring module that has been tampered with among the monitoring modules; b) generating a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and c) transmitting the monitoring patterns for the normal monitoring modules to the information security apparatus, wherein upon receiving the monitoring patterns for the normal monitoring modules, the information security apparatus causes the normal monitoring modules each to store the corresponding monitoring pattern.

Another aspect of the present invention is a computer-readable recording medium having recorded thereon a computer program for management used in a management apparatus for managing an information security apparatus that includes a plurality of monitoring modules that monitor for tampering, the computer program causing the management apparatus, which is a computer, to execute the steps of: a) identifying a monitoring module that has been tampered with among the monitoring modules; b) generating a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and c) transmitting the monitoring patterns for the normal monitoring modules to the information security apparatus, wherein upon receiving the monitoring patterns for the normal monitoring modules, the information security apparatus causes the normal monitoring modules each to store the corresponding monitoring pattern.

Another aspect of the present invention is an integrated circuit for managing an information security apparatus that includes a plurality of monitoring modules that monitor for tampering, the integrated circuit comprising: an identification unit configured to identify a monitoring module that has been tampered with among the monitoring modules; a generation unit configured to generate a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and a transmission unit configured to transmit the monitoring patterns for the normal monitoring modules to the information security apparatus, wherein upon receiving the monitoring patterns for the normal monitoring modules, the information security apparatus causes the normal monitoring modules each to store the corresponding monitoring pattern.

Another aspect of the present invention is a monitoring system formed by an information security apparatus that includes a plurality of monitoring modules that monitor for tampering and a management apparatus for managing the information security apparatus, the management apparatus comprising: an identification unit configured to identify a monitoring module that has been tampered with among the monitoring modules; a generation unit configured to generate a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and a transmission unit configured to transmit the monitoring patterns for the normal monitoring modules to the information security apparatus, wherein upon receiving the monitoring patterns for the normal monitoring modules, the information security apparatus causes the normal monitoring modules each to store the corresponding monitoring pattern.

EMBODIMENTS

1. Embodiment 1

With reference to the drawings, the following describes a detection system 10 as Embodiment 1 of the present invention.

1.1 Structure of Detection System 10

(1) Overall Structure

FIG. 1 is an overall structure diagram of the detection system 10. As shown in FIG. 1, the detection system 10 includes a device 100, which is an information processing apparatus, and a management apparatus 200. The device 100 and the management apparatus 200 are connected via a network.

(2) Structure of Device 100

The device 100 is a data processing apparatus that provides a user with a variety of functions that use the network, such as purchasing music, video, or other content from a content delivery server and playing back the content, accessing the system of a financial institution to perform Internet banking (balance inquiries, transfers, and the like), etc.

(a) Software Structure of Device 100

The device 100 includes application software (hereinafter, "applications") 110 and 111, a protection control module 120, and a detection module group 130.

The applications 110 and 111 are software providing a user of the device 100 with functions that use the network. Such software includes software for purchasing music, video, or other content from a content delivery server (not shown in the figures) on the network and playing back the purchased content, or software for accessing the system of a financial institution (not shown in the figures) on the network to perform Internet banking such as balance inquiries, transfers, etc.

The applications 110 and 111 may, for example, store confidential data such as an authentication key for performing authentication with the content delivery server or the system of the financial institution. It is necessary to protect this confidential data from being extracted from the application by an attacker and used fraudulently.

Since the device 100 handles confidential data, the device 100 is also referred to as an information security apparatus.

The protection control module 120 has a function for protecting the applications 110 and 111 so that an attacker cannot analyze the applications 110 and 111 to extract the confidential data, such as the authentication key. An example of the function to protect the applications is a decryption loading function, whereby application programs are encrypted and stored when not in use. Application programs are decrypted and loaded into memory only when used. Other examples include a tampering detection function to check whether an application has been tampered with, and an analysis tool detection function to check whether an analysis tool, such as a debugger, is operating. The protection control module 120 controls the operations of these functions in order to protect the applications 110 and 111.

The protection control module 120 prevents the confidential data from being divulged by stopping operations of the applications 110 and 111 and clearing the memory areas used by the applications 110 and 111, in particular the memory areas in which the confidential data was stored, when detecting an attack via the tampering detection function or the analysis tool detection function.

Figure 2:
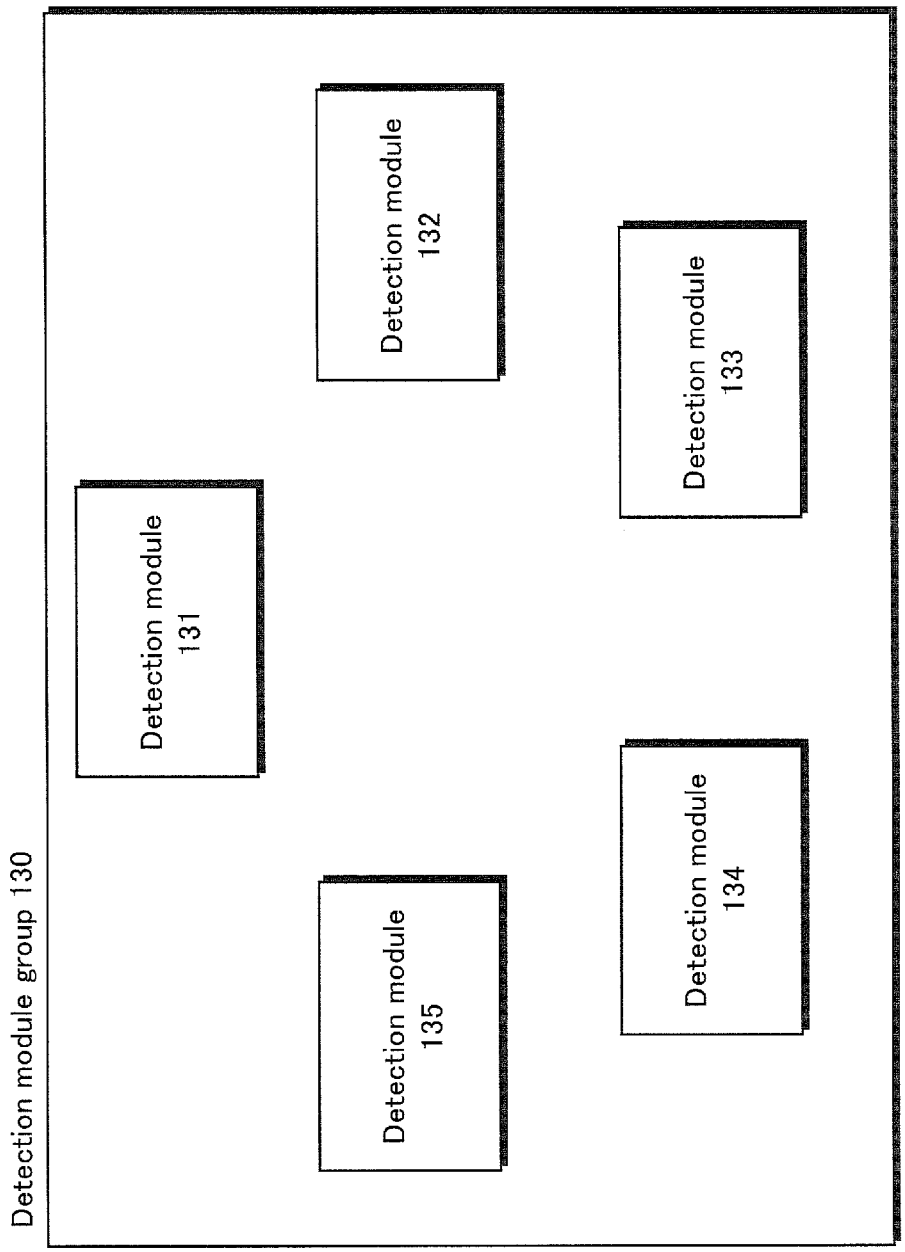
FIG. 2 is a configuration diagram of a detection module group 130 in a device 100.

The detection module group 130 is composed of a plurality of detection modules, 131, 132, 133, 134, and 135 (in this example, five detection modules are provided). FIG. 2 shows the structure of the detection module group 130. The detection modules 131, 132, 133, 134, and 135 each have a function to detect tampering in software (in this example, the protection control module 120) in the device 100.

The detection modules in the detection module group 130 also perform tampering detection on each other in order to prevent the detection modules from being tampered with by an attacker and used fraudulently. The detection modules transmit the tampering detection results to the management apparatus 200. When determining that a detection module has been tampered with, the management apparatus 200 transmits a deactivation instruction to another, normal detection module. Upon receiving this deactivation instruction, the other detection module deactivates the detection module that has been tampered with.

When one of the detection modules included in the detection module group 130 is attacked and tampered with, the above structure allows for detection of the tampering and response to the attack.

An access control module 140 stores access information necessary for the detection modules to remove other modules. The access information is, for example, an address assigned to the module that is to be removed, or a manual listing steps necessary for removal. Note that the access information is encrypted with an access information acquisition key that differs each time a module is to be removed.

(b) Structure of Protection Control Module 120

The following describes the protection control module 120 in detail.

Figure 3:
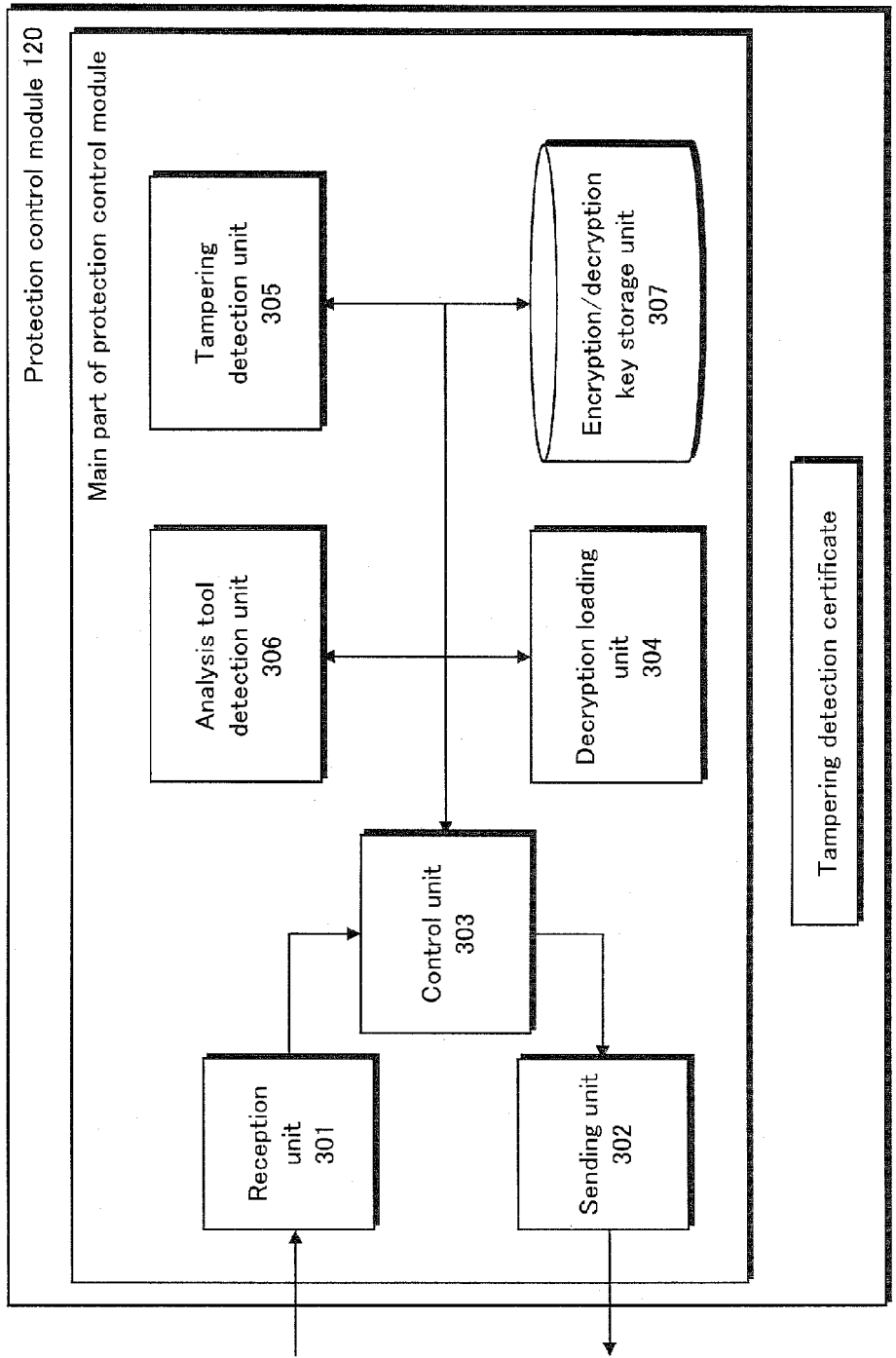
FIG. 3 is a configuration diagram of a protection control module 120 in the device 100.

FIG. 3 is a functional block diagram showing the functional structure of the protection control module 120. The protection control module 120 includes a main part and a tampering detection certificate. The tampering detection certificate is a certificate for detecting tampering in the main part of the protection control module 120 and is generated using a signature private key stored by the management apparatus 200.

As shown in FIG. 3, the main part of the protection control module 120 includes a reception unit 301, a sending unit 302, a control unit 303, a decryption loading unit 304, a tampering detection unit 305, an analysis tool detection unit 306, and an encryption/decryption key storage unit 307.

The reception unit 301 receives a variety of requests from the detection modules 131, 132, 133, 134, and 135.

The sending unit 302 transmits a variety of requests to the detection modules 131, 132, 133, 134, and 135.

By controlling the decryption loading unit 304, the tampering detection unit 305, and the analysis tool detection unit 306, the control unit 303 detects when the applications 110 and 111 have been attacked.

When the encrypted applications 110 and 111 are to be executed, the decryption loading unit 304 decrypts the applications 110 and 111 using the encryption/decryption key and loads them into memory. While the applications 110 and 111 are running and a context switch to another application occurs, the decryption loading unit 304 encrypts the data in memory with the encryption/decryption key. When a context switch occurs again to return to the applications 110 and 111, the decryption loading unit 304 decrypts the encrypted data. Note that the context switch refers to the process of saving and restoring the state (context) of the CPU so that a plurality of modules can share the same CPU.

The tampering detection unit 305 detects whether tampering has occurred in the applications 110 and 111. Methods for detecting tampering include using a verification certificate attached to the applications 110 and 111 and comparing MAC values.

The analysis tool detection unit 306 detects whether an analysis tool, such as a debugger or the like, has been installed and is operating. This is because it is assumed that, in order to attack the applications 110 and 111, a malicious attacker will install an analysis tool and cause the analysis tool to operate. The detection method may, for example, be to search for a file name, to check whether a special register used by a debugger is in use, or to detect an interrupt set by a debugger.

The encryption/decryption key storage unit 307 stores an encryption/decryption key for encrypting and decrypting the applications 110 and 111.

(c) Structure of Detection Modules

Next, the structure of the detection modules 131, 132, 133, 134, and 135 is described in detail.

Figure 4:
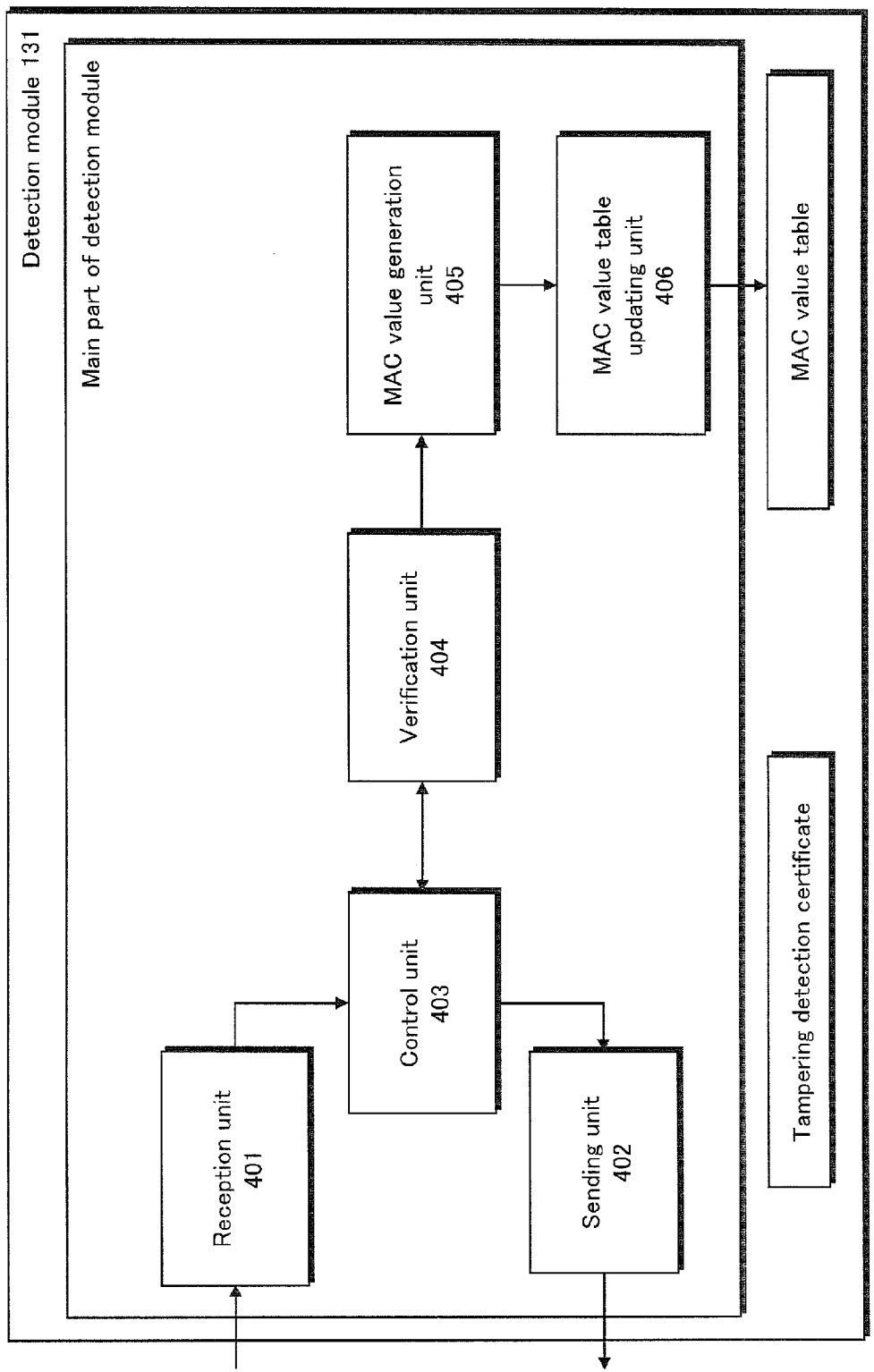
FIG. 4 is a configuration diagram of a detection module 131 in the detection module group 130.

FIG. 4 is a functional block diagram showing the functional structure of the detection module 131. The detection modules 132, 133, 134, and 135 have a similar structure. The detection module 131 includes a main part, a tampering detection certificate, and a MAC value table. The tampering detection certificate is a certificate for detecting tampering in the main part of the detection module 131 and is generated using a signature private key stored by the management apparatus 200.

The main part of the detection module 131 includes a reception unit 401, a sending unit 402, a control unit 403, a verification unit 404, a MAC value generation unit 405, and a MAC value table updating unit 406.

The reception unit 401 receives a variety of instructions from the management apparatus 200. The reception unit 401 also receives, from other detection modules, the main part of each detection module, the detection module tampering detection certificate, etc. which are necessary for tampering detection. Furthermore, the reception unit 401 receives, from other detection modules, the result of requested processing, the result of monitoring of the protection control module 120 by the other detection modules, etc.

The sending unit 402 transmits data, such as a variety of processing results, certificates, etc., to the management apparatus 200, the protection control module 120, the other detection modules, and the access control module 140.

The control unit 403 executes a variety of processes to control the verification unit 404 based on the instructions and notifications received by the reception unit 401.

Specifically, the control unit 403 performs processes such as the following: detection of tampering with the protection control module 120; detection of tampering with the detection modules 132, 133, 134, and 135; deactivation of the protection control module 120; deactivation of the detection modules 132, 133, 134, and 135; and updating of the monitoring pattern.

In response to control by the control unit 403, the verification unit 404 detects whether the protection control module 120 and the detection modules 132, 133, 134, and 135 have been tampered with.

The verification unit 404 may detect tampering using the tampering detection certificate attached to each module. The verification unit 404 may also use a Message Authentication Code (hereinafter, "MAC value") calculated in advance.

The management apparatus 200 provides the verification unit 404 in advance with information indicating when to perform tampering detection on which modules. When the management apparatus 200 indicates a change in the modules on which tampering detection is to be performed, or a change in the timing of tampering detection, the verification unit 404 operates in accordance with the indicated changes.

The MAC value generation unit 405 stores a verification key. When the verification unit 404 uses MAC values for tampering detection, the MAC value generation unit 405 generates a MAC value using the verification key.

The MAC value table updating unit 406 updates a MAC table that stores the MAC value for each module. The MAC value table stores a module identifier for identifying one of the modules in correspondence with the MAC value corresponding to that module.

The MAC value generation unit 405 acquires a module that is the target of tampering detection and calculates the MAC value of the acquired module. The verification unit 404 performs tampering detection by comparing the calculated MAC value with the MAC value stored in the MAC value table for the target module. When the calculated MAC value and the MAC value stored in the MAC value table for the target module do not match, the verification unit 404 determines that it has detected tampering in the target module. When the MAC values match, the verification unit 404 determines that it has not detected tampering.

(d) Structure of the Access Control Module 140

Figure 5:
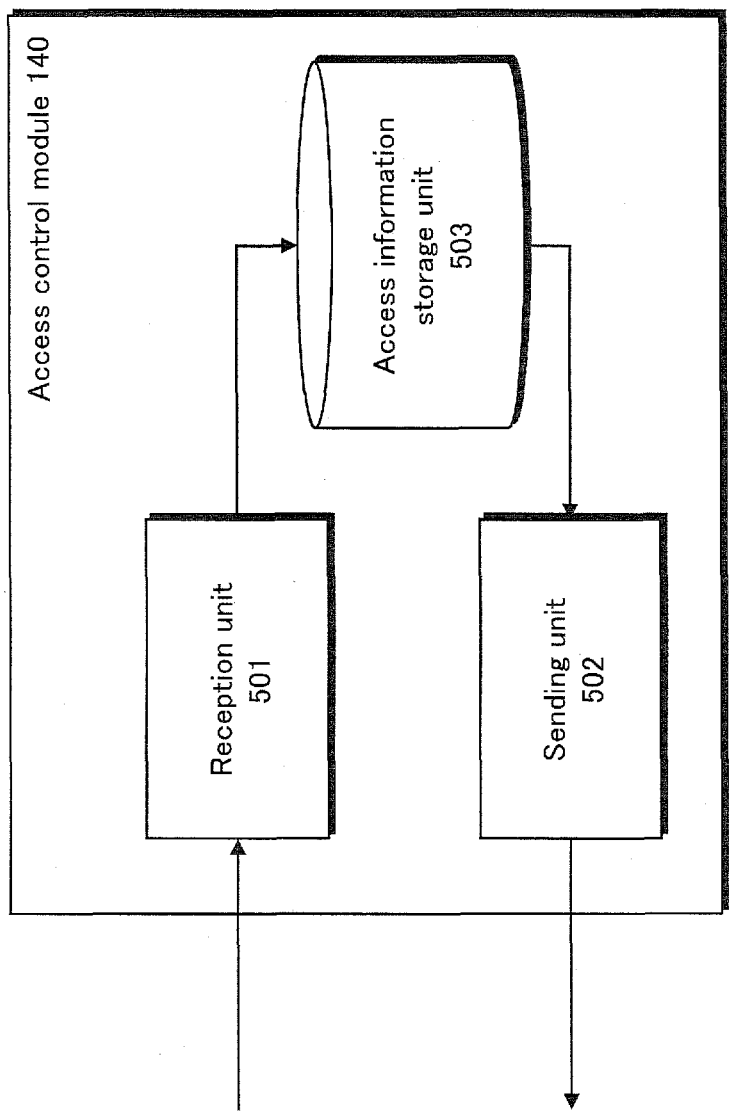
FIG. 5 is a configuration diagram of an access control module 140 in the device 100.

FIG. 5 is a functional block diagram showing the functional structure of the access control module 140. As shown in FIG. 5, the access control module 140 includes a reception unit 501, a sending unit 502, and an access information storage unit 503.

The reception unit 501 receives, from the detection modules 131, 132, 133, 134, and 135, a request for acquisition of access information, which is information necessary to remove a detection module that has been tampered with.

In response to the access information acquisition request, the sending unit 502 transmits access information to the detection module that issued the request.

The access information storage unit 503 stores pieces of access information respectively necessary to remove the detection modules 131, 132, 133, 134, and 135.

A detection module identifier for identifying the detection module to be removed is attached to each piece of access information. Each piece of access information is encrypted with an access information acquisition key.

Upon receiving an access information acquisition request from one of the detection modules 131, 132, 133, 134, and 135, the sending unit 502 transmits, to the requesting detection module, the piece of access information that is stored in the access information storage unit 503 and to which is attached the identifier for the detection module that is to be removed.

(e) Hardware Structure of Device 100

Next, the hardware structure of the device 100 is described with reference to FIG. 6.

Figure 6:
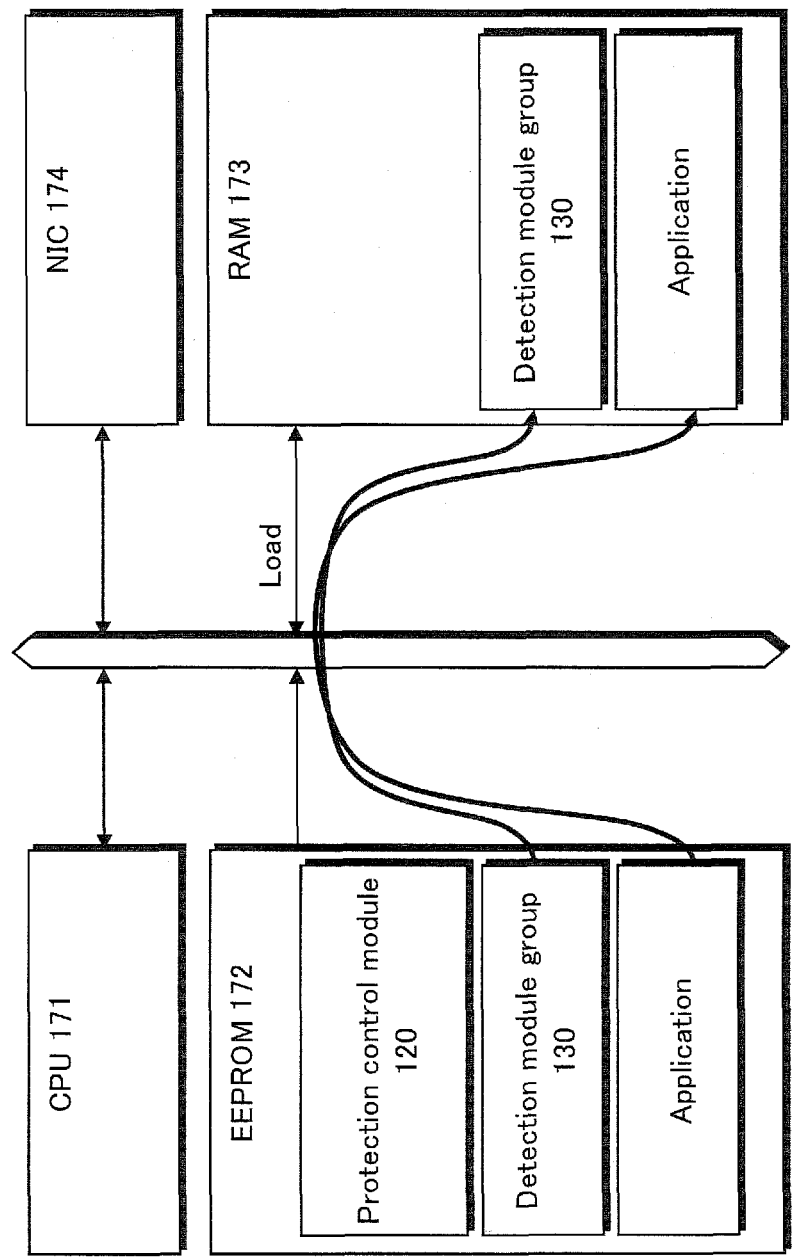
FIG. 6 is a hardware configuration diagram of the device 100.

As shown in FIG. 6, the device 100 includes a Central Processing Unit (CPU) 171; an Electrically Erasable and Programmable Read Only Memory (EEPROM) 172, which is a non-volatile memory; a Random Access Memory (RAM) 173; a Network Interface Card (NIC) 174; etc. These components are connected via a bus for inter-component transmission.

The EEPROM 172 stores the protection control module 120, the detection module group 130, the applications 110 and 111, etc.

The functional units of the modules stored in the EEPROM 172 are achieved by the CPU 171 executing the modules. Specifically, each functional unit is described as a computer program.

The RAM 173 is used by the CPU 171 as a work area. The detection module group 130 and the applications 110 and 111 are loaded into the RAM 173. The detection module that is the target of tampering detection or deactivation is one of the detection modules operating in the RAM 173.

The NIC 174 is an extension card for connecting to the network.

(f) Software Hierarchy

Next, the software hierarchy of the device 100 is described with reference to FIG. 7.

Figure 7:
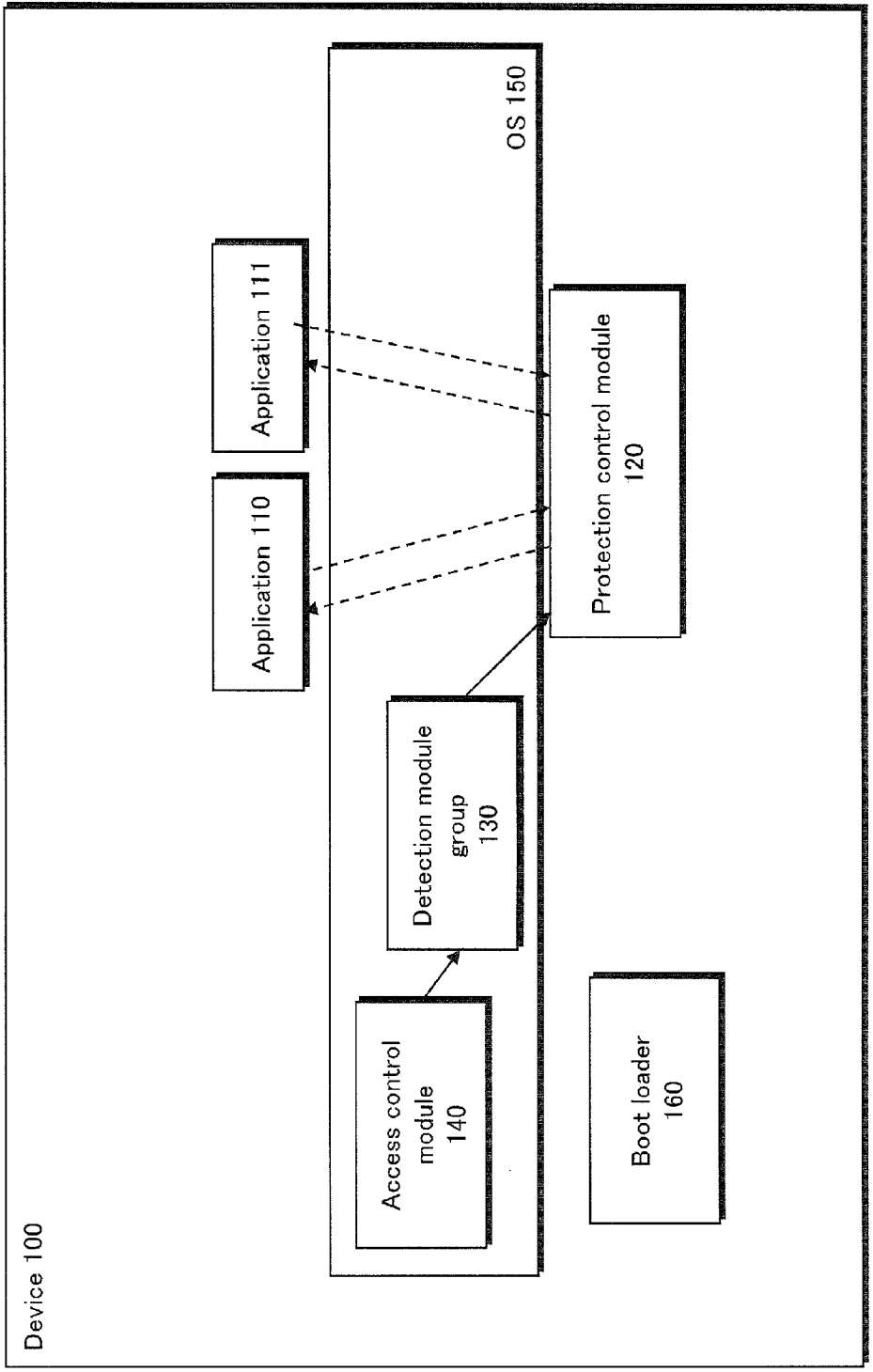
FIG. 7 is a software configuration diagram of the device 100.

As shown in FIG. 7, the access control module 140 and the detection module group 130 are included in the OS 150. The applications 110 and 111 operate in the OS 150, whereas the protection control module 120 and a boot loader 160 are external to management by the OS 150.

When the device 100 boots, applications are executed after the protection control module 120 and the detection module group 130 boot.

(3) Structure of Management Apparatus 200

The management apparatus 200 functions as an abnormal module identification device, receiving tampering detection results from the detection module group 130 in the device 100 and, based on the received tampering detection results, identifying an abnormal detection module that is to be deactivated.

(a) Overall Structure

As shown in FIG. 1, the management apparatus 200 includes a determination unit 210, a module deactivation unit 220, and a transmission unit 250. The management apparatus 200 is, specifically, a computer system provided with a CPU, a ROM, a RAM, a hard disk unit, etc. The management apparatus 200 achieves the above functions by the CPU operating in accordance with computer programs stored in the ROM or on the hard disk unit.

The determination unit 210 receives tampering detection results from the detection module group 130 in the device 100 and, based on the received tampering detection results, identifies an abnormal detection module that is to be deactivated.

Upon receiving an acquisition request from one of the detection modules 131, 132, 133, 134, and 135 for an access information acquisition key, the module deactivation unit 220 transmits the access information acquisition key to the requesting detection module.

The transmission unit 250 transmits information to and receives information from the device 100 and the units in the management apparatus 200. For example, the transmission unit 250 transmits, to the determination unit 210, the tampering detection results received from the device 100. Note that for transmission between the device 100 and the management apparatus 200, a secure transmission channel may be used, for example by encrypting data.

Next, the components of the management apparatus 200 are each described.

(b) Structure of Determination Unit 210

Figure 8:
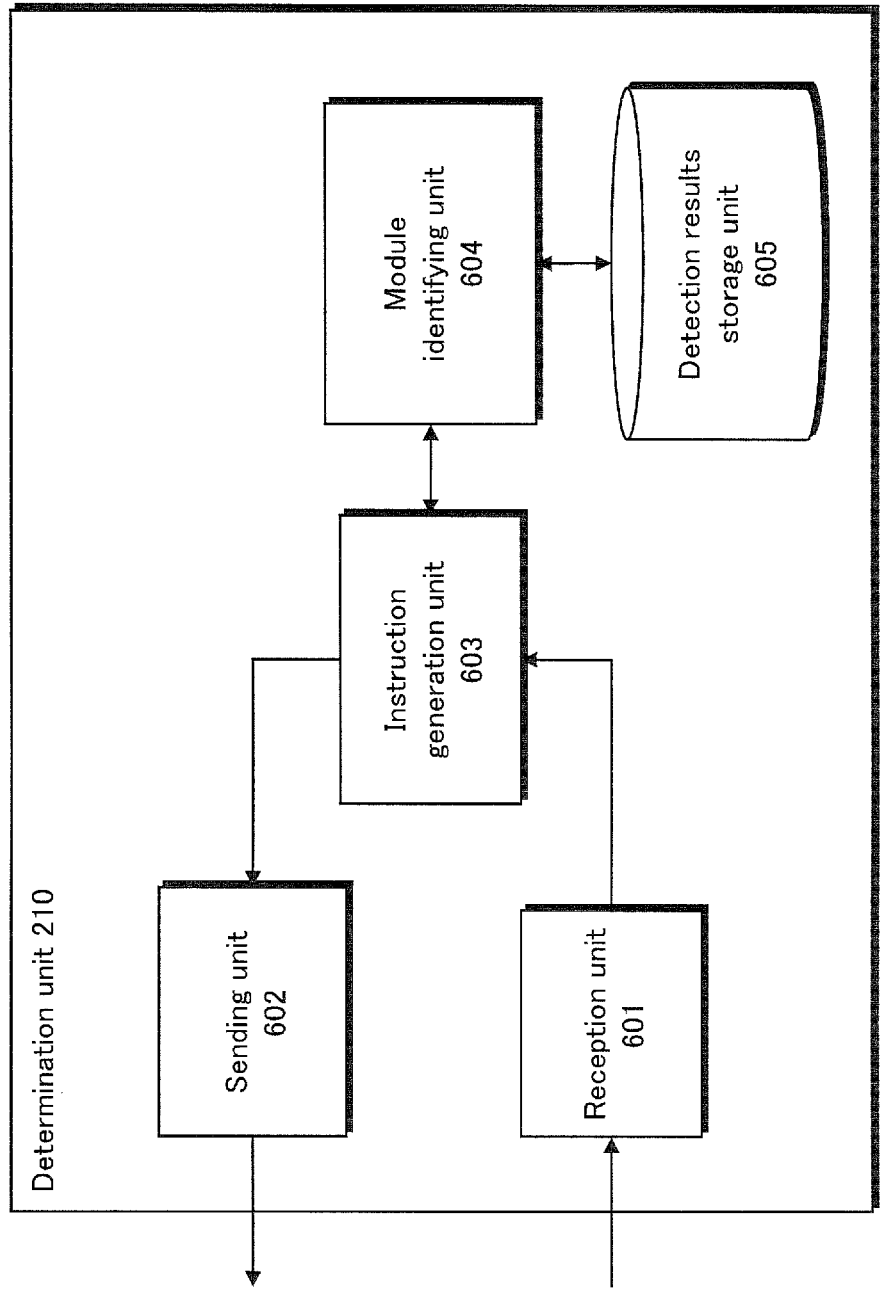
FIG. 8 is a configuration diagram of a determination unit 210 in a management apparatus 200.

FIG. 8 is a functional block diagram showing the functional structure of the determination unit 210.

As shown in FIG. 8, the determination unit 210 includes a reception unit 601, a sending unit 602, an instruction generation unit 603, a module identifying unit 604, and a detection results storage unit 605.

The reception unit 601 receives, from the detection modules 131, 132, 133, 134, and 135, the tampering detection results, a variety of requests, etc. and transmits these results, requests, etc. to the instruction generation unit 603. The reception unit 601 also receives notification that processing is complete from each of the units in the management apparatus 200 and transmits the notification to the instruction generation unit 603.

The sending unit 602 transmits the instructions generated by the instruction generation unit 603 to the units in the management apparatus 200.

The instruction generation unit 603 transmits, to the module identifying unit 604, the tampering detection results received from the detection modules 131, 132, 133, 134, and 135 (hereinafter, also referred to as "inter-monitoring results", or simply "monitoring results"). The instruction generation unit 603 acquires, from the module identifying unit 604, information identifying an abnormal detection module that has been tampered with and, based on the acquired information, generates instructions for the units in the management apparatus 200.

In order to identify abnormal detection modules that have been tampered with, the module identifying unit 604 determines whether each of the detection modules has been tampered with by using the inter-monitoring results received from the detection modules 131, 132, 133, 134, and 135. The module identifying unit 604 transmits the information identifying the abnormal detection module to the instruction generation unit 603.

From among the inter-monitoring results received from the detection modules 131, 132, 133, 134, and 135, the detection results storage unit 605 stores the tampering detection results obtained by determining that tampering has occurred.

(c) Module Deactivation Unit 220

Figure 9:
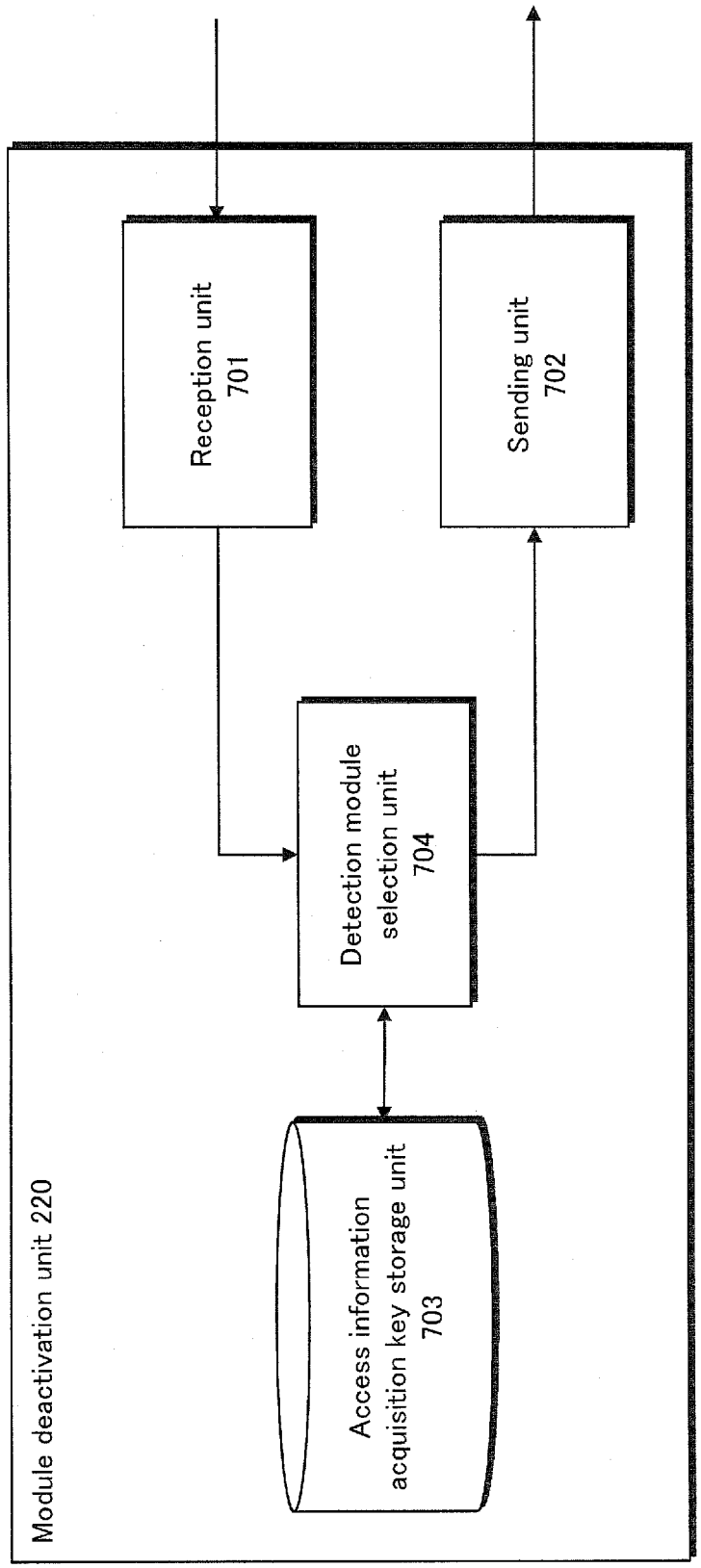
FIG. 9 is a configuration diagram of a module deactivation unit 220 in the management apparatus 200.

FIG. 9 is a functional block diagram showing the functional structure of the module deactivation unit 220.

As shown in FIG. 9, the module deactivation unit 220 includes a reception unit 701, a sending unit 702, an access information acquisition key storage unit 703, and a detection module selection unit 704.

The reception unit 701 receives an instruction from the determination unit 210 to deactivate an abnormal detection module that has been tampered with. The reception unit 701 also receives, from the detection modules 131, 132, 133, 134, and 135, a request for acquisition of the access information acquisition key.

In response to the request for acquisition of the access information acquisition key, the sending unit 702 transmits the access information acquisition key to the detection module that issued the request.

The access information acquisition key storage unit 703 stores the access information acquisition key for decrypting the pieces of access information stored by the access control module 140.

The detection module selection unit 704 selects a detection module to deactivate the abnormal detection module that has been tampered with and issues, to the selected detection module, an instruction to deactivate the abnormal detection module. The detection module selection unit 704 may select the detection module for deactivation after receiving an instruction from the determination unit 210 regarding which detection module to select.

Note that when a request for acquisition of the access information acquisition key is received from the detection module selected by the detection module selection unit 704, the sending unit 702 attaches, to the access information acquisition key, the identifier for the detection module to be removed and transmits the access information acquisition key to the selected detection module.

1.2 Operations of Detection System 10

Next, the operations of the detection system 10 are described.

(1) Overall Operations

Figure 10:
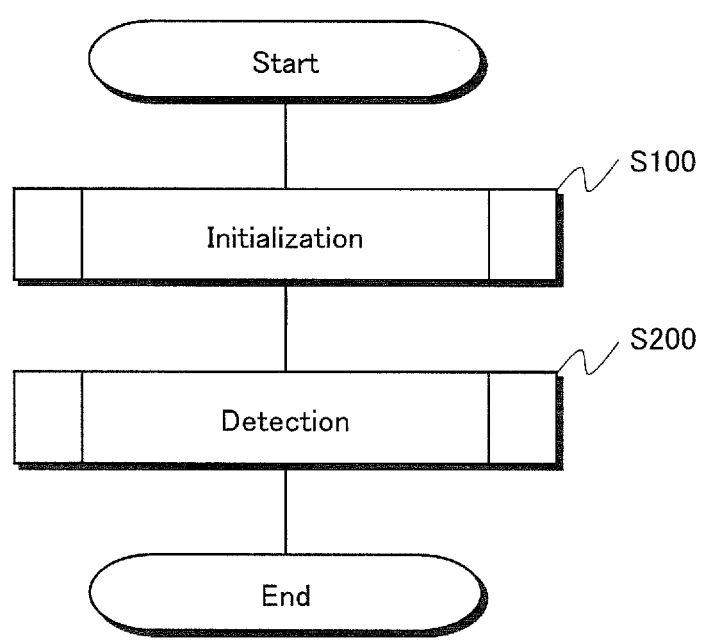
FIG. 10 is a flowchart showing overall operations of the detection system 10.

FIG. 10 is a flowchart showing the overall flow of processing in the detection system 10.

The detection system first performs initialization (S100).

Initialization refers to installing software (the protection control module 120, the detection module group, etc.) and to embedding data necessary for software detection in the detection modules 131, 132, 133, 134, and 135. Note that this initialization is performed when the device 100 is manufactured in a factory. Subsequently, the device 100 is shipped from the factory and provided to a user.

When the user uses the device 100, the protection control module 120 in the device 100 protects the applications 110 and 111 from attack. At the same time, the detection modules 131, 132, 133, 134, and 135 detect whether the protection control module 120 has been tampered with in order to check whether the protection control module 120 has been attacked. The detection modules also perform tampering detection on each other in order to prevent the detection modules from being tampered with by an attacker and used fraudulently (S200).

When the result of detection indicates that the protection control module 120 has been tampered with, the existence of tampering is indicated via a display unit (not shown in the figures) provided in the device 100, and the management apparatus 200 is notified.

Next, details are provided in order for the above two processes.

(2) Initialization Operations

Figure 11:
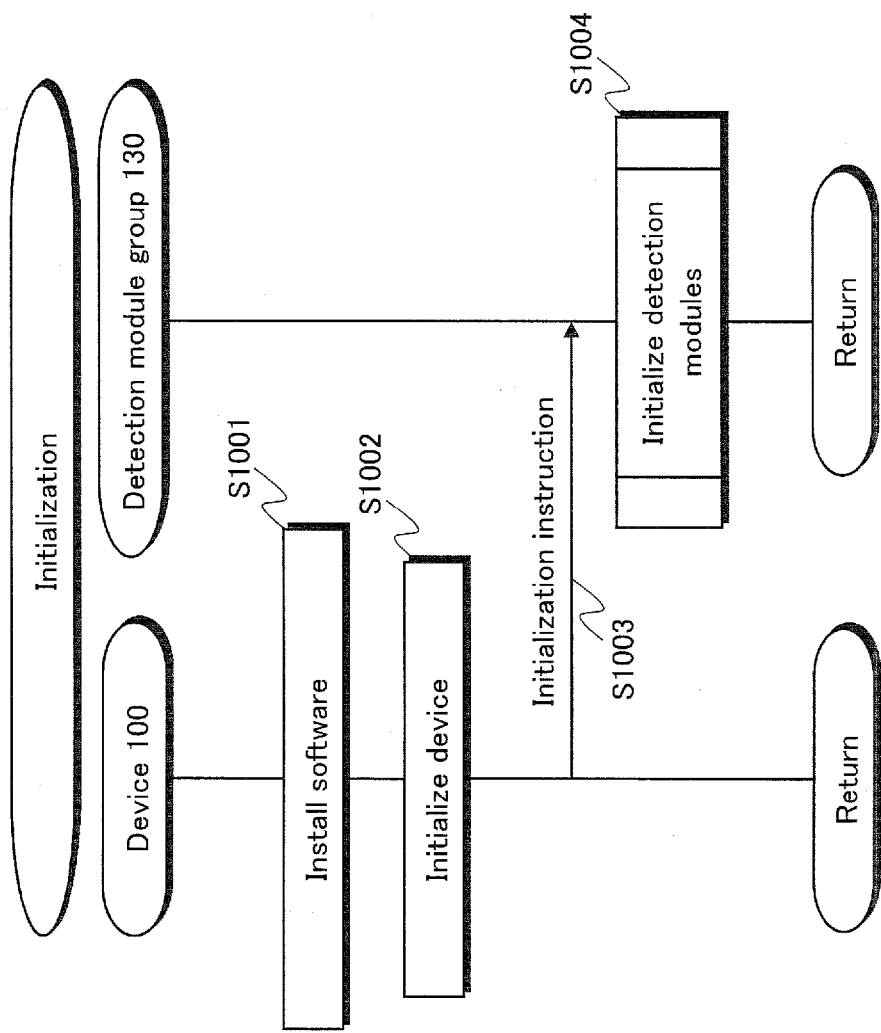
FIG. 11 is a sequence diagram showing initialization in the device 100.
Figure 12:
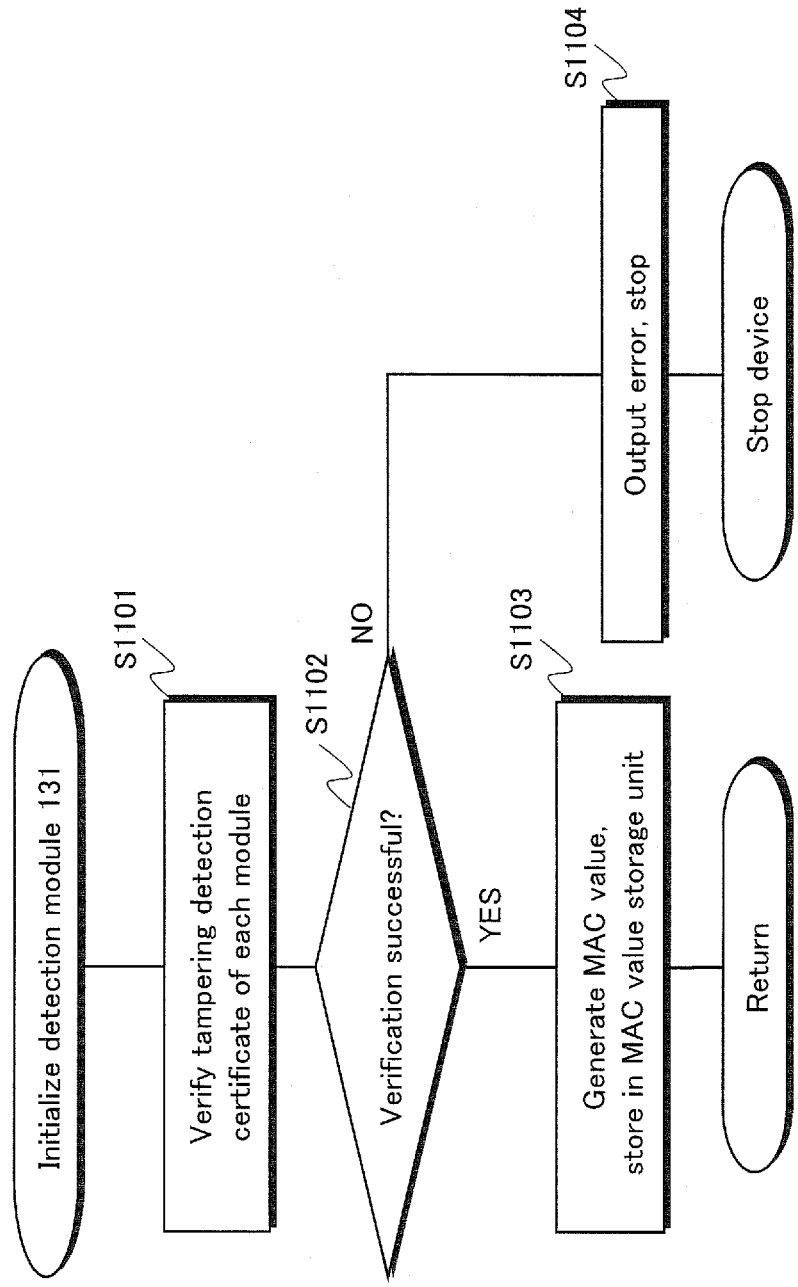
FIG. 12 is a flowchart showing initialization (detection module initialization) in the device 100.

The following describes initialization in the detection system 10 (S100 in FIG. 10) in detail with reference to FIGS. 11 and 12.

FIG. 11 is a sequence diagram showing the flow during initialization in the detection system 10. This sequence represents processing performed individually by the detection modules 131, 132, 133, 134, and 135 collectively as being performed by the detection module group 130.

When the device 100 is manufactured in the factory, the detection system 10 installs the applications (110 and 111), the protection control module 120, the detection modules (131, 132, 133, 134, and 135), etc. in non-volatile memory of the device 100 (S1001).

A tampering detection certificate is attached to each of these pieces of software for verification of whether tampering has occurred in the software. This tampering detection certificate is signed with a signature private key stored by the management apparatus 200. Note that in step S1001, software necessary for operations of the device 100 other than the above software is also installed.

The following describes the keys embedded in the device 100 during initialization.

The encryption/decryption key is embedded in the protection control module 120, and a signature public key and verification key are embedded in the detection modules 131, 132, 133, 134, and 135. Furthermore, detection module identifiers for identifying the detection modules 131, 132, 133, 134, and 135 are respectively embedded in the detection modules. The protection control module 120 and the detection modules 131, 132, 133, 134, and 135 are installed on the device 100 under these conditions.

The encryption/decryption key is a key for encrypting and decrypting the applications 110 and 111. The applications 110 and 111 are stored in non-volatile memory after encryption with the encryption/decryption key. When the applications 110 and 111 are to be executed, the protection control module 120 first decrypts the encrypted applications 110 and 111 with the encryption/decryption key.

When the device 100 executes a plurality of applications via context switching, data used by the applications 110 and 111 is encrypted and decrypted using the encryption/decryption key each time a context switch occurs in order to prevent data from being extracted by an analysis tool, such as a debugger, when the applications 110 and 111 are being executed.

Among the keys embedded in the detection modules 131, 132, 133, 134, and 135, the signature public key is shared by all of the detection modules. On the other hand, the verification key is unique to each detection module. This description now returns to FIG. 11. After installation of software in step S1001, the device 100 initializes itself by executing software for initialization and software for testing whether the device 100 operates normally (S1002). The device 100 also transmits an initialization instruction to the detection modules 131, 132, 133, 134, and 135 (S1003).

Upon receiving the initialization instruction, the detection module group 130 initializes the detection modules (S1004).

(a) Detection Module Initialization Operations

FIG. 12 is a flowchart showing detection module initialization operations (S1004 in FIG. 11).

Note that only the detection module 131 is described in this flowchart. Operations of the detection modules 132, 133, 134, and 135 are basically the same as the detection module 131, and thus a description thereof is omitted.

The detection module 131 verifies the tampering detection certificate of the detection modules 132, 133, 134, and 135, and the protection control module 120, which are the target of tampering detection (S1101). This verification is performed by generating a verification value from each detection module and comparing the generated verification value with the verification value listed in the corresponding tampering detection certificate. The verification value is a hash value or a signature. In the case of a signature, it is verified whether the signature is correct.

The detection module 131 determines whether the generated verification values match the respective verification values listed in the tampering detection certificates (S1102). If the verification values match the respective verification values listed in the tampering detection certificates (S1102: YES), the detection module 131 generates MAC values for the other detection modules and the protection control module 120 and stores the MAC values as a MAC value table in a MAC value storage unit within the other detection modules and the protection control module 120 (S1103). If in at least one case, the verification values do not match the verification respective verification values listed in the tampering detection certificates (S1102: NO), the detection module 131 outputs an error and stops the device (S1104).

(3) Detection Operations

Next, detection is described.

When initialization is complete, the device 100 is shipped from the factory to the user, who uses the device 100.

When the applications 110 and 111 operate on the device 100, the protection control module 120 in the device 100 controls the decryption loading function, the tampering detection function, the analysis tool detection function, etc. to protect the applications 110 and 111 from an attack.

Figure 13:
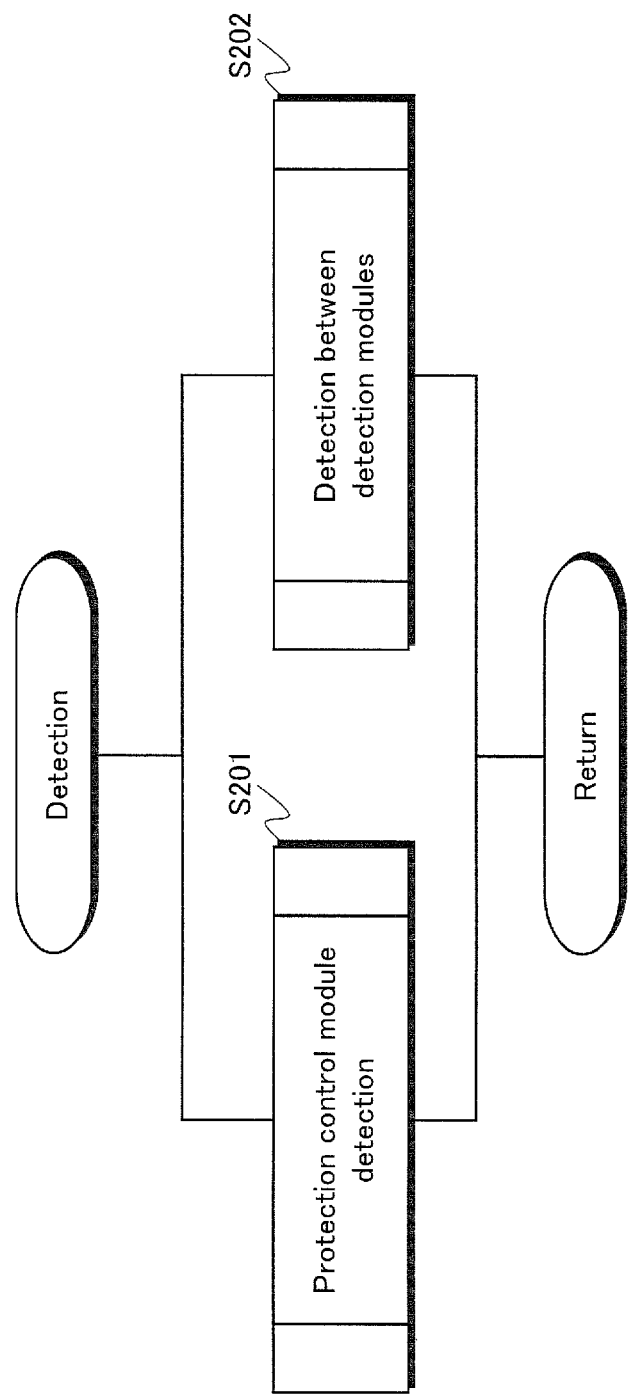
FIG. 13 is a flowchart showing detection in the device 100.

FIG. 13 is a flowchart of detection (S200 in FIG. 10). Detection includes protection control module detection to detect whether the protection control module 120 has been tampered with (S201) and detection between detection modules to detect whether the detection modules have been tampered with (S202).

(a) Protection Control Module Detection Operations

Figure 14:
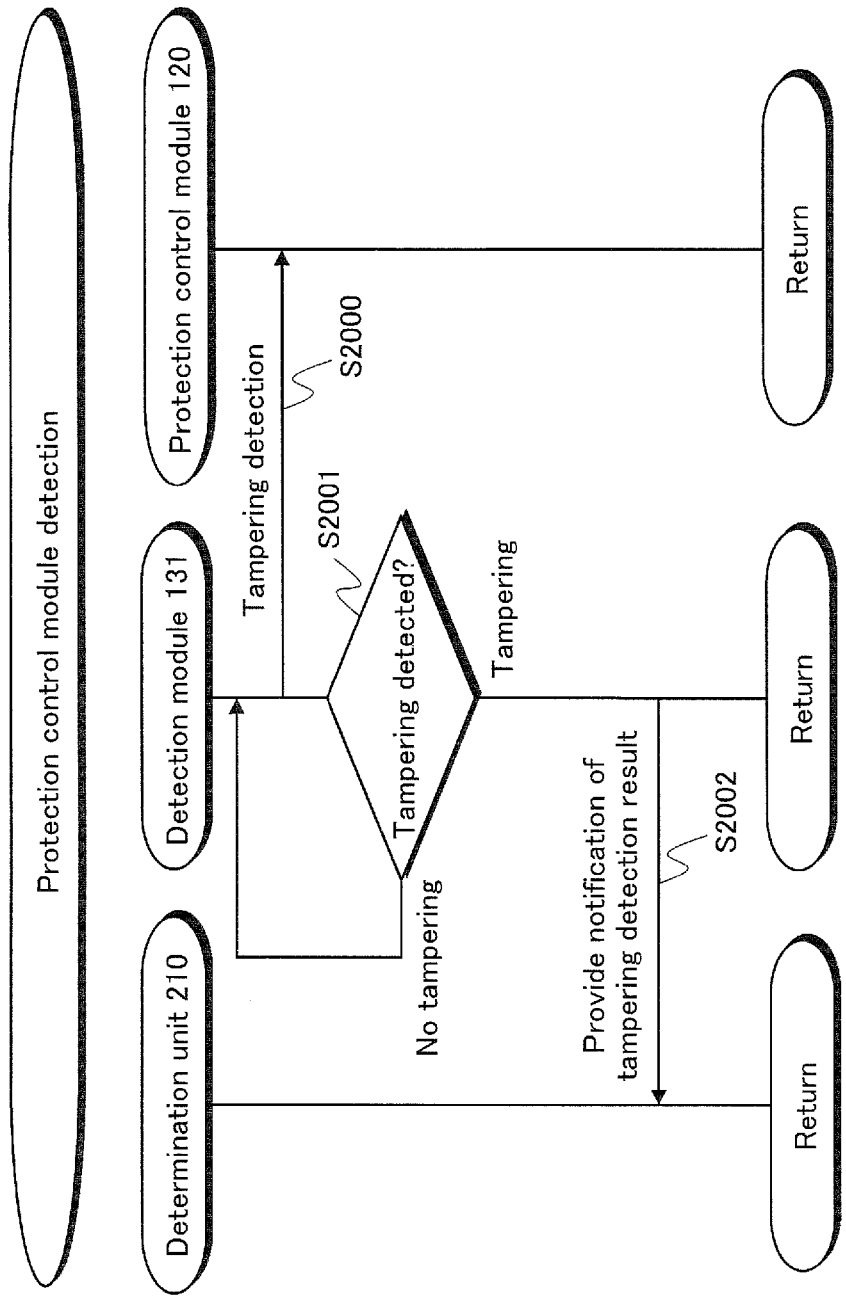
FIG. 14 is a sequence diagram showing detection (protection control module detection) in the device 100.

The following describes protection control module detection in detail with reference to FIG. 14.

During protection control module detection, the detection modules 131, 132, 133, 134, and 135 first detect whether the protection control module 120 has been tampered with. Tampering detection is performed by calculating the MAC value of the protection control module 120 using the verification key (S2000) and comparing the calculated MAC value with the MAC value stored in the MAC value table (S2001).

When the MAC values match (S2001: "No tampering"), the detection module 131 determines that the protection control module 120 has not been tampered with. On the other hand, when the MAC values do not match (S2001: "Tampering"), the detection module 131 determines that the protection control module 120 has been tampered with.

Note that FIG. 14 has been simplified to show only the detection module 131 detecting whether the protection control module 120 has been tampered with. The detection modules 132, 133, 134, and 135 of course perform similar processing.

The detection module 131 determines whether the protection control module 120 has been tampered with, i.e. whether the MAC values match (S2001), and when determining positively (S2001: "Tampering"), notifies the determination unit 210 in the management apparatus 200 (S2002).

When determining that the protection control module 120 has not been tampered with (S2001: "No tampering"), the detection module 131 returns to tampering detection processing without issuing notification to the determination unit 210.

The determination unit 210 receives tampering detection results from the detection modules 131, 132, 133, 134, and 135 (S2002).

(b) Detection Operations Between Detection Modules

Next, detection between detection modules is described in detail with reference to FIGS. 15 through 24.

During detection between detection modules, the detection modules perform tampering detection on each other in order to prevent the detection modules from being tampered with by an attacker and used fraudulently. The detection modules on which detection modules perform tampering detection are determined by a monitoring pattern.

Figure 15:
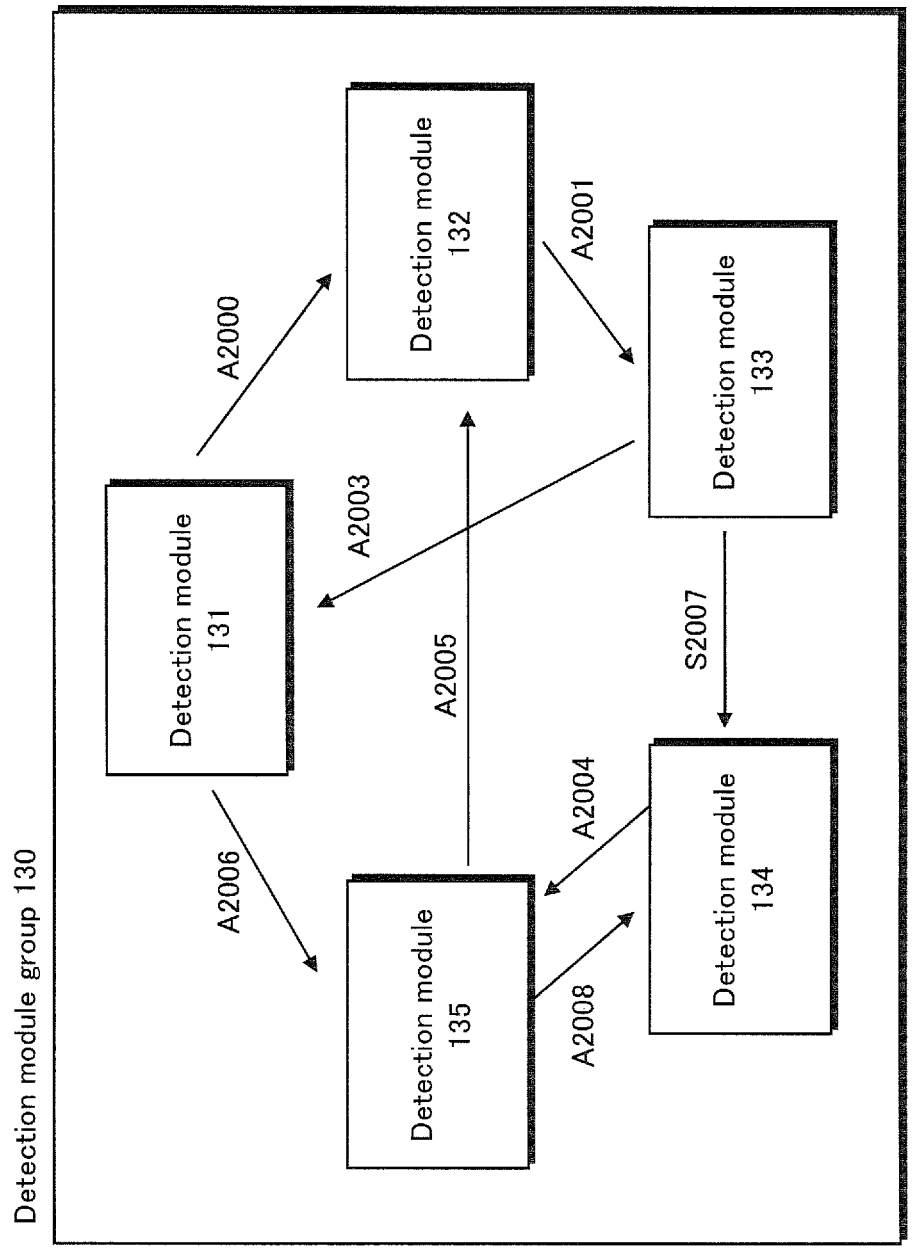
FIG. 15 illustrates a monitoring pattern in the detection module group 130 of the device 100.

The monitoring pattern according to Embodiment 1 is described using the specific example shown in FIG. 15. To simplify description of the monitoring pattern, the monitoring pattern in FIG. 15 is represented as a digraph. The arrows point from the monitoring (verifying) detection module (or source detection module) to the monitored (verified) detection module (or target detection module).

For example, the arrow A2000 points from the detection module 131 to the detection module 132, indicating that the detection module 131 detects whether the detection module 132 has been tampered with. Similarly, the arrow A2006 points from the detection module 131 to the detection module 135, indicating that the detection module 131 also detects whether the detection module 135 has been tampered with. Other arrows similarly indicate performance of tampering detection.

Figure 16:
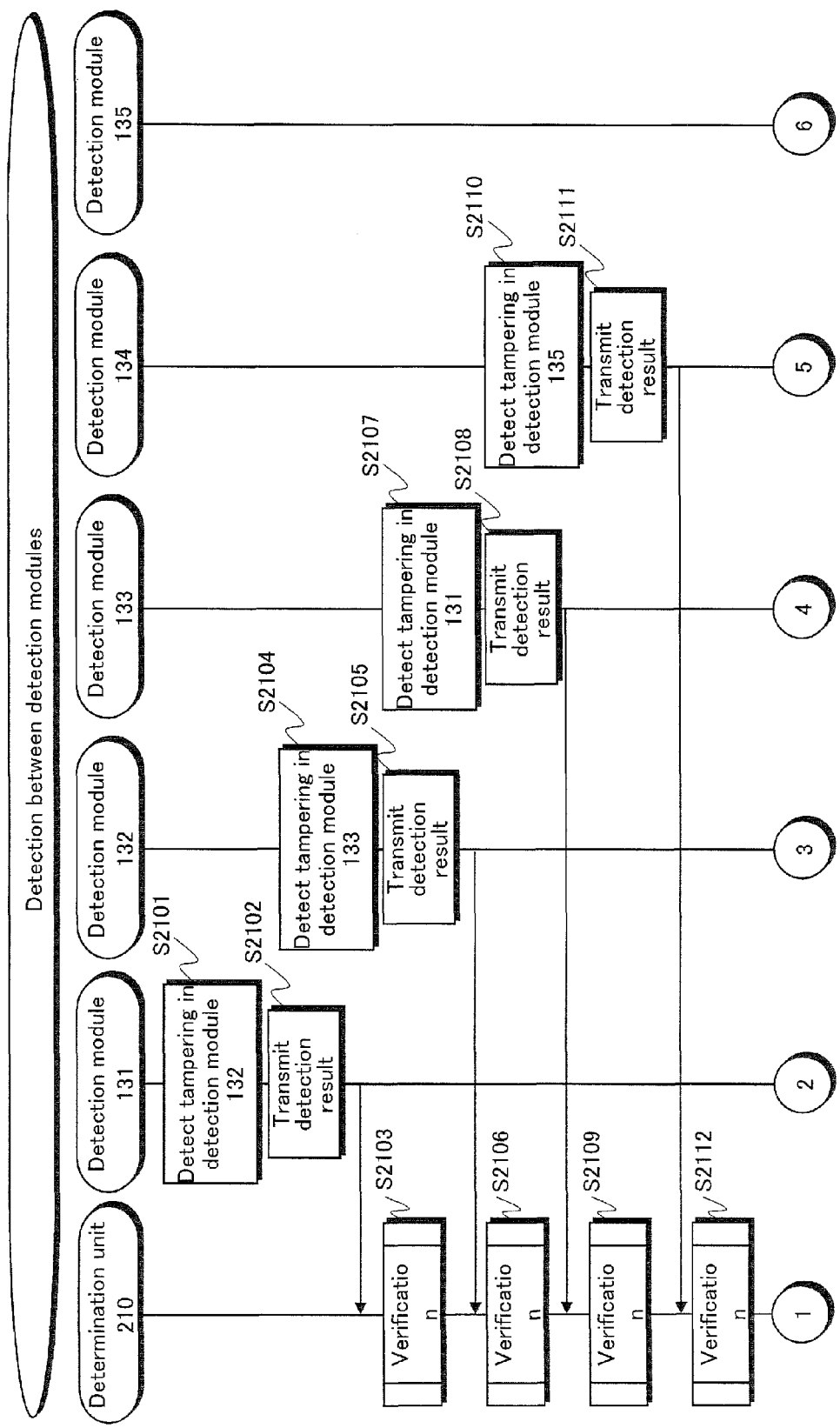
FIG. 16 is a sequence diagram showing detection (detection between detection modules) in the detection system 10 and is continued in FIG. 17.
Figure 17:
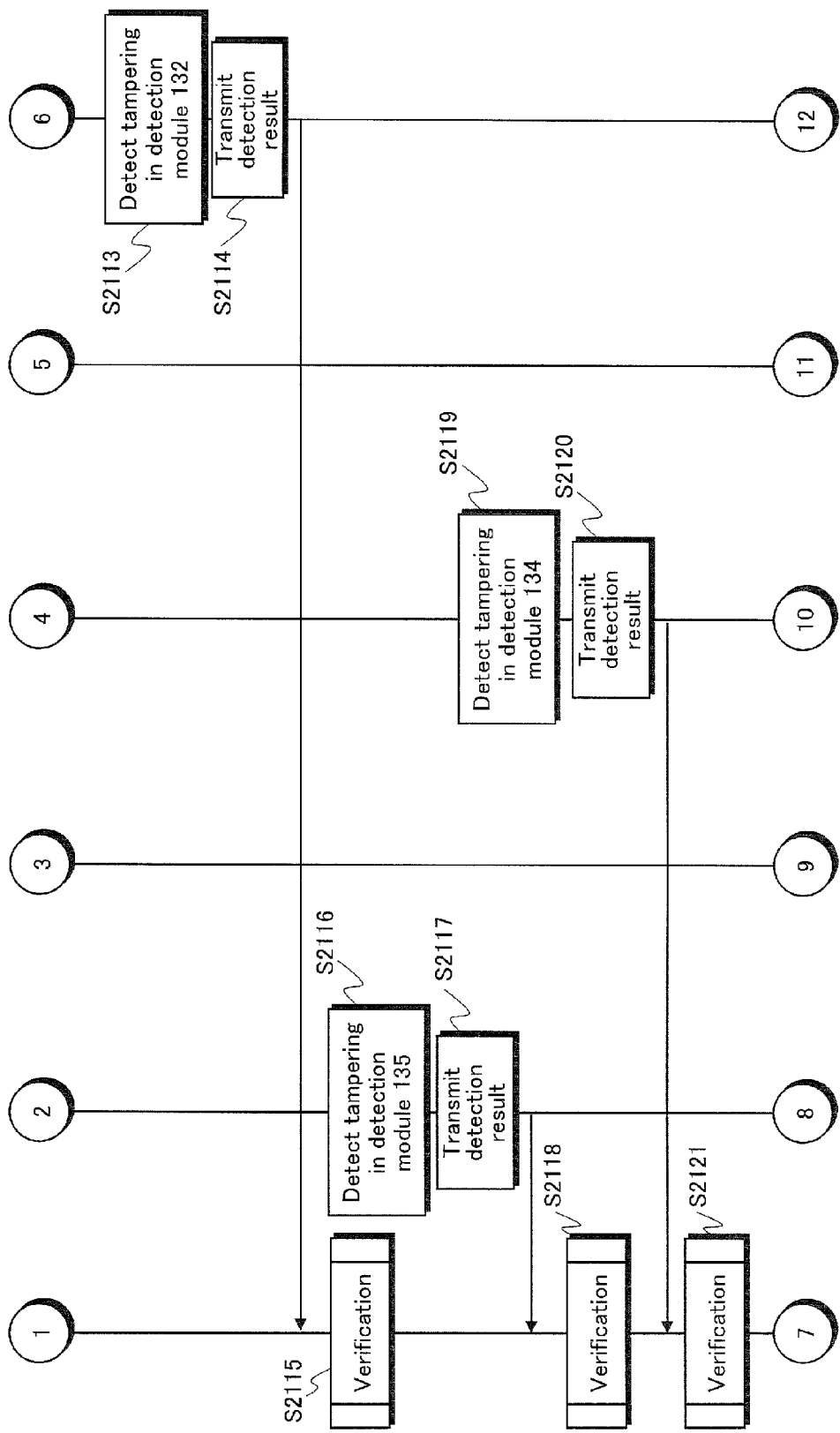
FIG. 17 is a sequence diagram showing detection (detection between detection modules) in the detection system 10 and is continued in FIG. 18.
Figure 18:
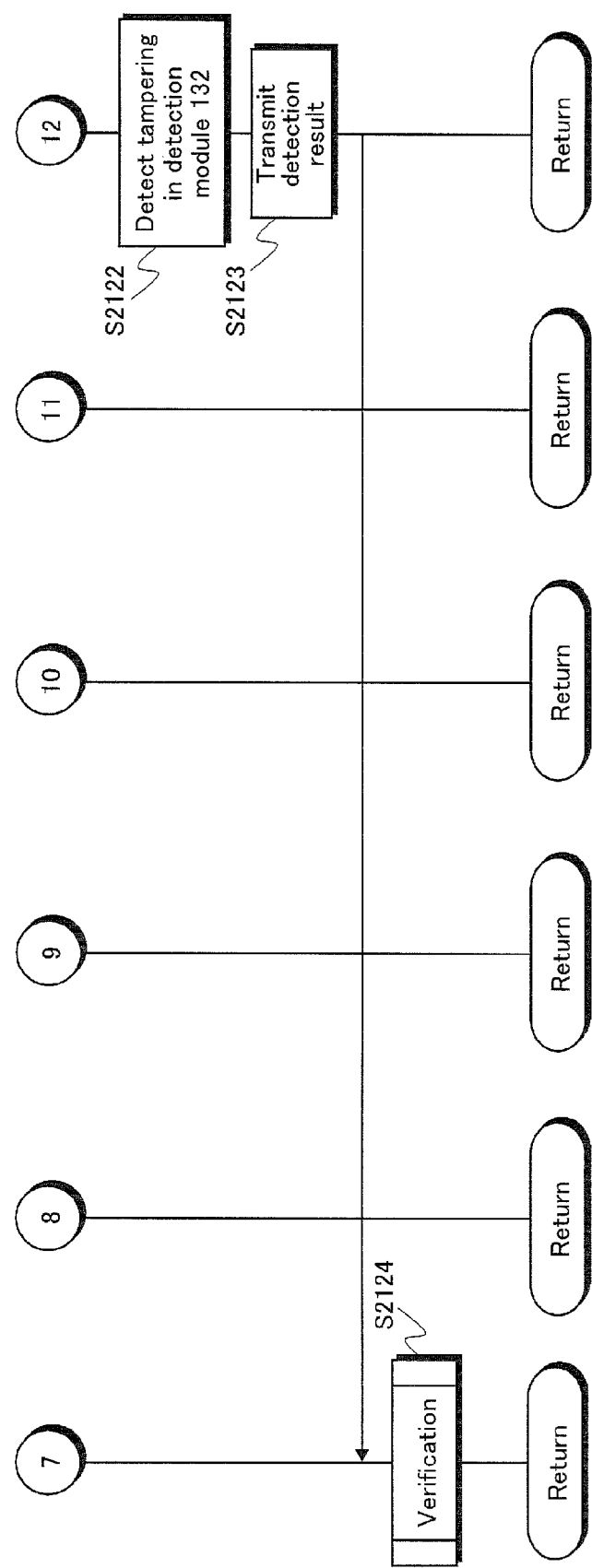
FIG. 18 is a sequence diagram showing detection (detection between detection modules) in the detection system 10 and is continued from FIG. 17.

Detection between detection modules is first described in detail with reference to the sequences shown in FIGS. 16 through 18.

The detection module 131 detects whether the detection module 132 has been tampered with in accordance with the example monitoring pattern shown in FIG. 15 (S2101). The detection module 131 transmits the detection result to the determination unit 210 (S2102).

Figure 19:
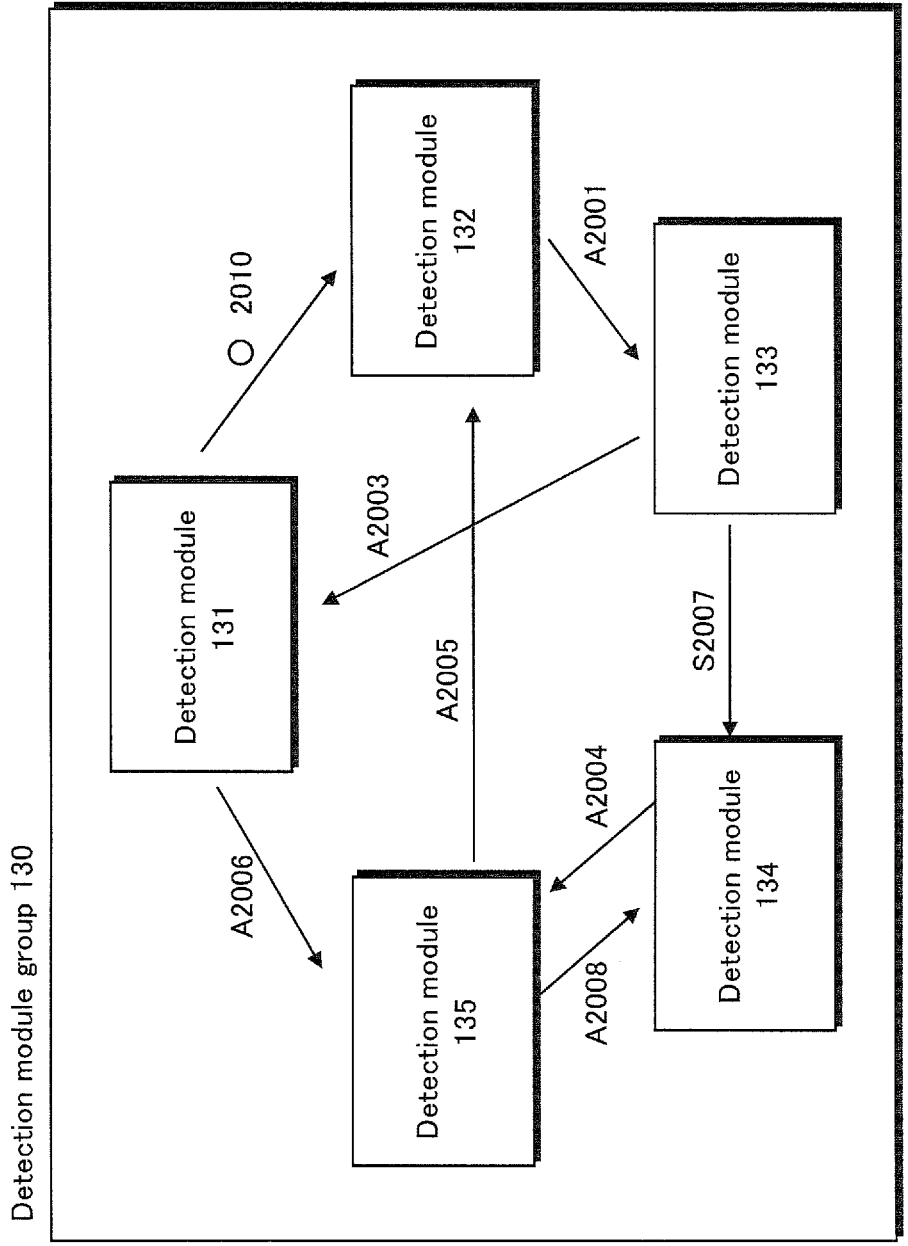
FIG. 19 illustrates a detection result received by the determination unit 210.

FIG. 19 shows the detection result received by the determination unit 210. In FIG. 19, the detection result "No tampering" is represented as a circle, "○", next to the corresponding arrow. The detection result "Tampering" is represented as an "X" next to the corresponding arrow.

For example, the circle ○ 2010 represents a result of "No tampering" for tampering detection performed by the detection module 131 on the detection module 132.

The determination unit 210 receives the detection result and performs verification (S2103). Verification operations are described below.

Next, the detection module 132 detects whether the detection module 133 has been tampered with in accordance with the example monitoring pattern shown in FIG. 15 (S2104). The detection module 132 transmits the detection result to the determination unit 210 (S2105).

The determination unit 210 receives the detection result and performs verification (S2106).

Next, the detection module 133 detects whether the detection module 131 has been tampered with in accordance with the example monitoring pattern shown in FIG. 15 (S2107). The detection module 133 transmits the detection result to the determination unit 210 (S2108).

The determination unit 210 receives the detection result and performs verification (S2109).

Next, the detection module 134 detects whether the detection module 135 has been tampered with in accordance with the example monitoring pattern shown in FIG. 15 (S2110). The detection module 134 transmits the detection result to the determination unit 210 (S2111).

The determination unit 210 receives the detection result and performs verification (S2112).

Next, the detection module 135 detects whether the detection module 132 has been tampered with in accordance with the example monitoring pattern shown in FIG. 15 (S2113). The detection module 135 transmits the detection result to the determination unit 210 (S2114).

The determination unit 210 receives the detection result and performs verification (S2115).

Next, the detection module 131 detects whether the detection module 135 has been tampered with in accordance with the example monitoring pattern shown in FIG. 15 (S2116). The detection module 131 transmits the detection result to the determination unit 210 (S2117).

The determination unit 210 receives the detection result and performs verification (S2118).

Next, the detection module 133 detects whether the detection module 134 has been tampered with in accordance with the example monitoring pattern shown in FIG. 15 (S2119). The detection module 132 transmits the detection result to the determination unit 210 (S2120).

The determination unit 210 receives the detection result and performs verification (S2121).

Next, the detection module 135 detects whether the detection module 134 has been tampered with in accordance with the example monitoring pattern shown in FIG. 15 (S2122). The detection module 135 transmits the detection result to the determination unit 210 (S2123).

The determination unit 210 receives the detection result and performs verification (S2124).

(c) Verification Operations

For verification during detection between detection modules, the determination unit 210 receives the detection results from the detection modules and identifies an abnormal detection module in which tampering has been detected.

Verification operations are described with reference to the flowchart in FIG. 20.

The determination unit 210 determines whether the tampering detection results received from the detection modules are normal (S2201). If the detection results are abnormal (S2201: NO), the determination unit 210 stores the detection results (S2202).

Figure 21:
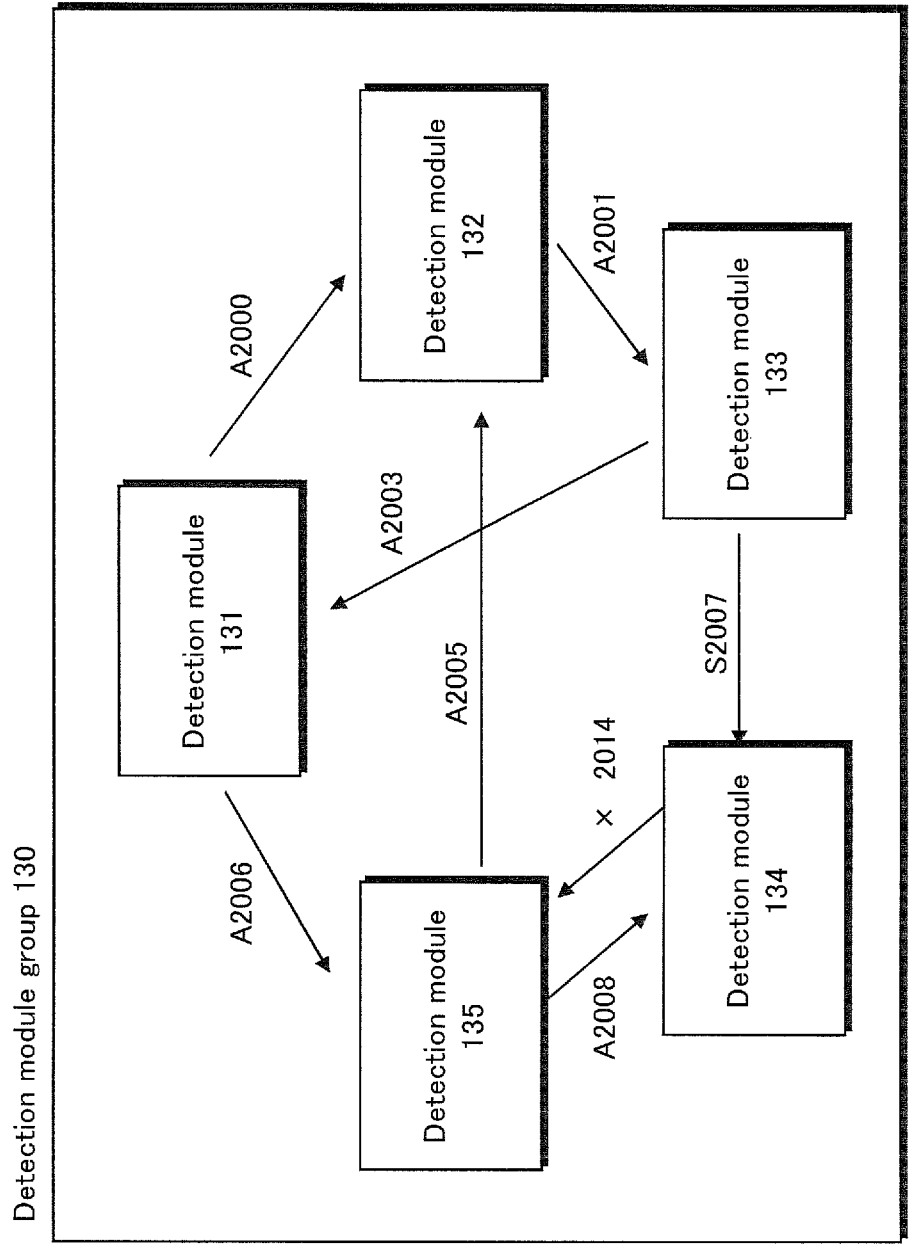
FIG. 21 illustrates a detection result in the detection module group 130.
Figure 22:
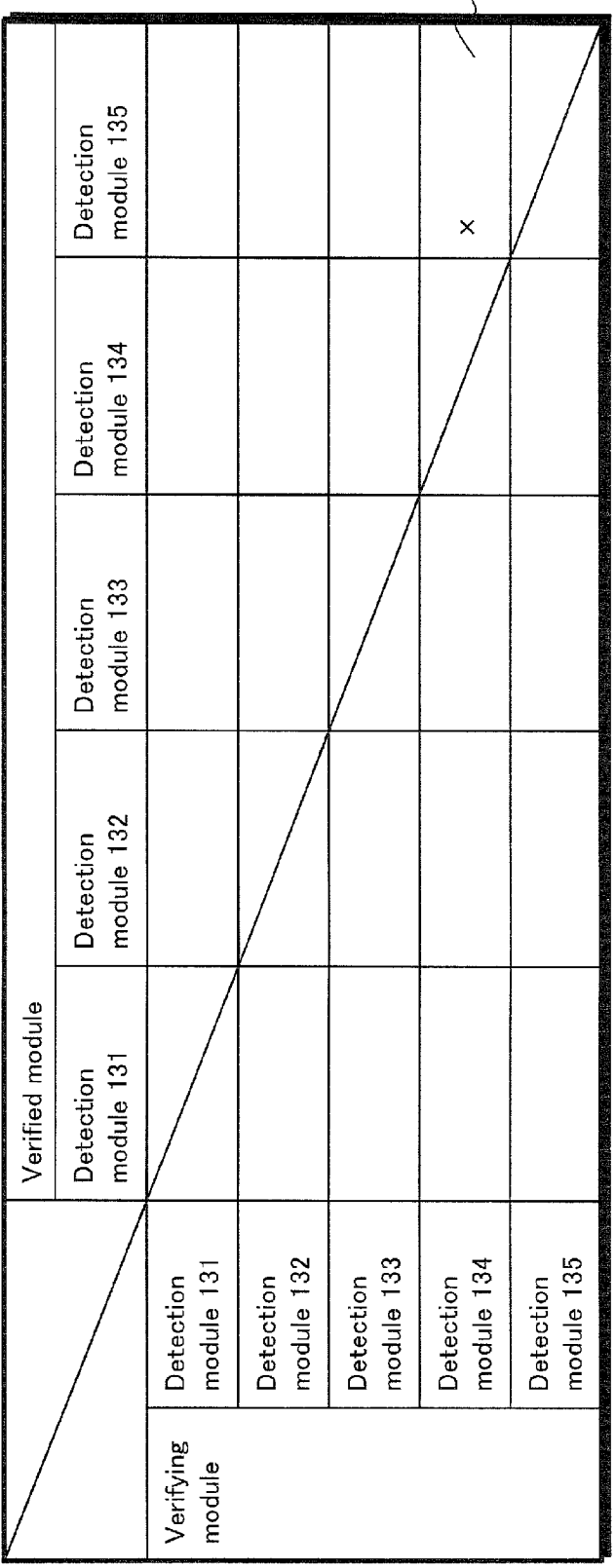
FIG. 22 shows an example of a data structure of a detection results list 6051.

FIG. 21 shows an example of detection results received by the determination unit 210 from the detection module 134. In FIG. 21, the X 2014 represents a result of "Tampering" for tampering detection performed by the detection module 134 on the detection module 135. At this point, the determination unit 210 stores the detection result "Tampering detected", as obtained by tampering detection performed by the detection module 134 on the detection module 135, in the detection results storage unit 605 as a detection results list 6051. FIG. 22 shows an example of a data structure of the detection results list 6051. When the detection module 134 transmits a detection result of "Tampering" as a result of performing tampering detection on the detection module 135, a detection result 6052 (indicated as an X in the figures) is recorded in the detection results list 6051 in the list entry having the detection module 134 as the verifying detection module and the detection module 135 as the verified detection module.

Returning to FIG. 20, the determination unit 210 determines whether the received detection result contradicts the detection results already stored in the detection results storage unit 605 (S2203). If there is no contradiction (S2203: NO), verification concludes. If the detection results are contradictory (S2203: YES), the abnormal detection module is identified (S2204).

Next, determination of the contradiction in step S2203 is described.

Figure 23:
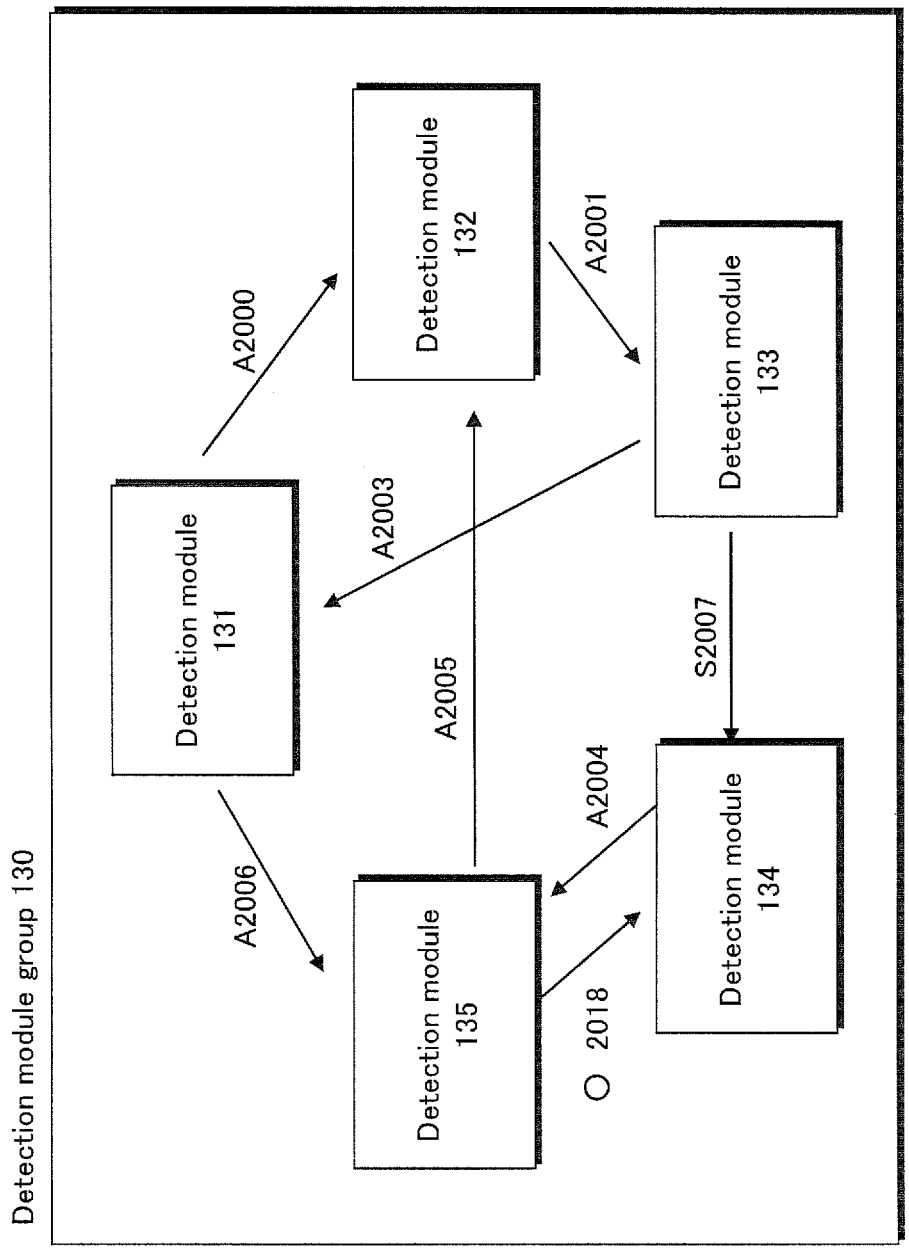
FIG. 23 illustrates a detection result.

As already shown in FIG. 22, the determination unit 210 stores a detection result 6052 (indicating that the detection module 135 has been tampered with) as received in step S2111 from the detection module 134. Subsequently, in step S2122, the determination unit 210 receives a detection result 2018 indicating "No tampering" for the detection module 134 as a result of tampering detection performed on the detection module 134 by the detection module 135, as shown in FIG. 23. In other words, whereas the detection module 134 detected tampering in the detection module 135, the detection module 135 detects no tampering in the detection module 134.

In this case, the determination unit 210 determines that the tampering detection results for the detection module 135 are contradictory. Since the tampering detection results are contradictory, the determination unit 210 identifies the detection module 135 as an abnormal detection module.

The reason for identifying the detection module 135 as an abnormal detection module is as follows.

Assume that at the time of step S2110, the detection module 134 has not been tampered with. The tampering detection result from the detection module 134 would therefore be correct, and the determination unit 210 would determine that the detection module 135 has been tampered with.

Conversely, assume that at the time of step S2110, the detection module 134 has already been tampered with by an attacker when transmitting an abnormal detection result to the determination unit 210. When the detection module 135 performs tampering detection on the detection module 134 in step S2122, the detection module 135 should therefore transmit a tampering detection result indicating "Tampering" in the detection module 134, assuming that the detection module 135 is a normal detection module that has not been tampered with. This is because once a detection module (in this case, the detection module 134) has been tampered with, the detection module does not return to being a normal detection module in which tampering has not occurred. However, the detection module 135 transmits a tampering detection result indicating "No tampering" for the detection module 134. Accordingly, it is determined that the detection module 135 has been tampered with.

The detection module 135 is therefore determined to be an abnormal detection module that has been tampered with.

Returning to FIG. 20, the determination unit 210 determines whether to deactivate a detection module that has been identified as an abnormal detection module (S2205). If it is determined that no deactivation is necessary (S2205: NO), verification is complete. If it is determined that deactivation is necessary, (S2205: YES), the abnormal detection module is deactivated (S2206).

(d) Deactivation Operations

Figure 24:
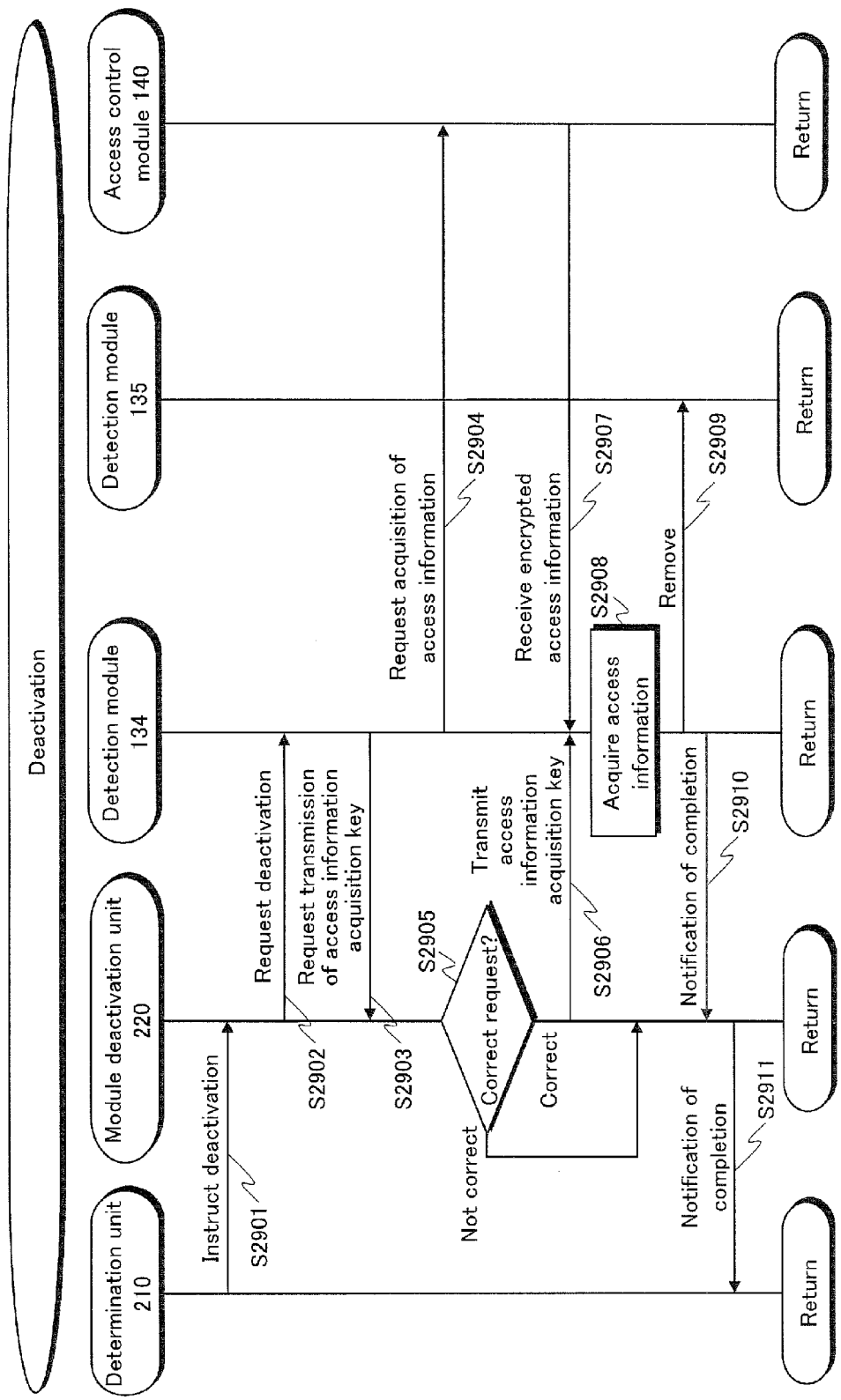
FIG. 24 is a sequence diagram showing deactivation in the detection system 10.

Deactivation is described in detail with reference to the sequence diagram in FIG. 24.

Deactivation operations are described in detail for an example in which the detection module 135 has been tampered with, and the detection module 134 has detected the tampering.

The determination unit 210 transmits the identifier for the detection module that has been tampered with along with a deactivation instruction to the module deactivation unit 220 (S2901).

The module deactivation unit 220 issues a request to the detection module 134 to deactivate the detection module 135 that has been tampered with (S2902).

Upon receiving the request to deactivate the detection module 135 from the module deactivation unit 220 (S2902), the detection module 134 requests that the module deactivation unit 220 issue an access information acquisition key for deactivating the detection module 135 (S2903). Furthermore, the detection module 134 issues a request to the access control module 140 to acquire the piece of access information for deactivating the detection module 135 (S2904).

Upon receiving the request for issuing the access information acquisition key (S2903), the module deactivation unit 220 confirms whether the detection module 134 is a detection module determined not to have been tampered with and whether the requested access information acquisition key is the access information acquisition key for deactivating the detection module 135 that is not authentic (i.e. tampered with) (S2905). The module deactivation unit 220 performs this confirmation using information on the detection module notified to the module deactivation unit 220 by the determination unit 210.

If confirmation indicates that the request is from the detection module 135, which has been tampered with, or that the acquisition request is for the access information acquisition key for detection module 131, 132, or 133, which have not been tampered with (S2905: "Not correct"), the module deactivation unit 220 terminates processing for deactivation.

If confirmation indicates that the request is correct (S2905: "Correct"), the module deactivation unit 220 transmits the access information acquisition key for deactivating the detection module 135 to the requesting detection module 134 (S2906).

The detection module 134 receives the access information acquisition key from the module deactivation unit 220 (S2906) and also receives an encrypted piece of access information from the access control module 140 (S2907). The detection module 134 acquires the access information from the access information acquisition key and the encrypted piece of access information (S2908). The acquired access information is a dedicated driver for removing the detection module 135. The detection module 134 removes the abnormal detection module 135, which has been tampered with, using the dedicated driver (S2909).

Upon completion of deactivation, the detection module 134 deletes the access information acquisition key, the encrypted piece of access information, the access information, etc., and transmits a notification of completion to the module deactivation unit 220 (S2910). Upon receiving the notification of completion from the detection module 134 (S2910), the module deactivation unit 220 transmits the notification of completion of deactivation to the determination unit 210 (S2911).

With the above structure, the plurality of detection modules in the detection module group 130 perform tampering detection on each other to detect an abnormal detection module that has been tampered with. This structure thus increases reliability of the detection system. Furthermore, deactivating an abnormal detection module that has been tampered with prevents unauthorized operations by the abnormal detection module. Accordingly, even if the detection module that has been tampered with attempts unauthorized operations, information in the protection control module 120 is not divulged, thereby further heightening system security. By storing, in the detection results storage unit 605, detection results that indicate tampering, an abnormal detection module can be identified based on whether detection results are contradictory, even if all of the detection modules in the detection module group 130 have not performed tampering detection. The processing load on the device is therefore reduced.

2. Embodiment 2

The following describes a detection system 11 as Embodiment 2 of the present invention.

In Embodiment 1, a detection module that has been determined not to have been tampered with is used to deactivate an abnormal detection module. However, even a detection module that has been determined not to have been tampered with may be abnormal and therefore may not always correctly deactivate an abnormal detection module.

Therefore, in Embodiment 2, in addition to an abnormal detection module, a normal detection module is also identified during verification.

2.1 Structure of Detection System 11

The following provides a more detailed description of the detection system 11.

(1) Overall Structure

Figure 25:
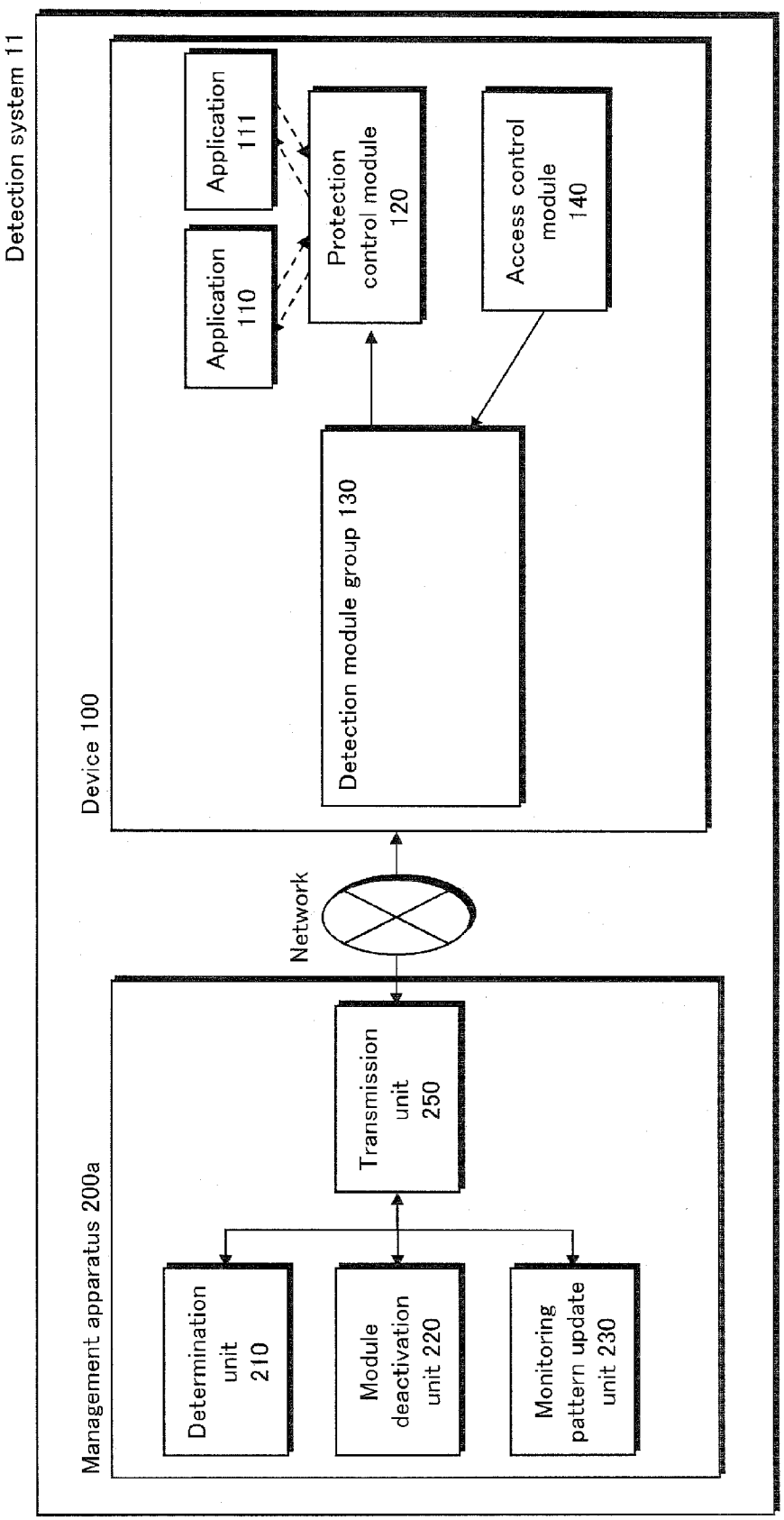
FIG. 25 is an overall structure diagram of a detection system 11 according to Embodiment 2 of the present invention.

With reference to FIG. 25, the following describes the structure of the detection system 11 according to Embodiment 2.

As shown in FIG. 25, the detection system 11 includes a device 100, which is an information processing apparatus, and a management apparatus 200*a*. The device 100 and the management apparatus 200*a* are connected via a network.

The management apparatus 200*a* includes a determination unit 210, a module deactivation unit 220, a monitoring pattern update unit 230, and a transmission unit 250.

In FIG. 25, constituent elements having the same functions as in Embodiment 1 are provided with the same reference signs as in FIG. 1, and a detailed description thereof is omitted. The following provides a detailed description of the characteristic constituent elements and processing in the detection system 11.

(2) Structure of the Monitoring Pattern Update Unit 230

When the monitoring pattern of the detection module group 130 in the device 100 is to be updated, the determination unit 210 issues an instruction for updating of the monitoring pattern. In response to the instruction, the monitoring pattern update unit 230 generates monitoring patterns for deactivation in order to update the monitoring pattern of each detection module in the detection module group 130 and transmits the generated monitoring patterns to the detection modules.

Figure 26:
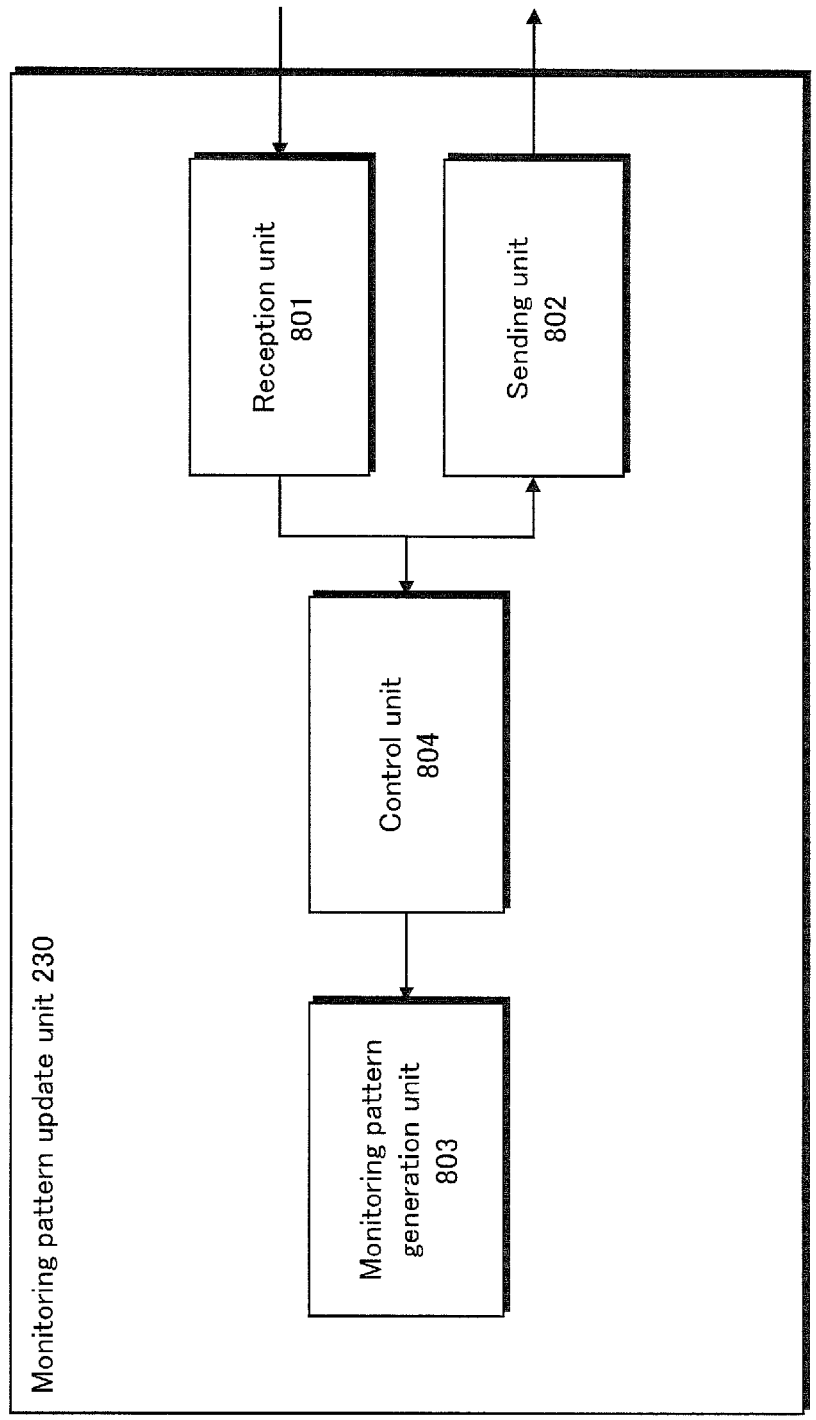
FIG. 26 is a configuration diagram of a monitoring pattern update unit 230.

As shown in FIG. 26, the monitoring pattern update unit 230 includes a reception unit 801, a sending unit 802, a monitoring pattern generation unit 803, and a control unit 804.

(a) Reception Unit 801

The reception unit 801 receives, from the determination unit 210, a generation instruction indicating generation of a monitoring pattern and a detection module list at the time of the instruction. The detection module list includes identification numbers for all of the detection modules in the detection module group 130 of the device 100. The reception unit 801 also receives the identification number for the detection module to deactivate.

The reception unit 801 transmits the received monitoring pattern generation instruction to the control unit 804. Via the control unit 804, the reception unit 801 also transmits the received detection module list and the identification number for the detection module to deactivate to the monitoring pattern generation unit 803.

(b) Monitoring Pattern Generation Unit 803

The monitoring pattern generation unit 803 receives the detection module list from the reception unit 801 via the control unit 804.

Upon receiving the detection module list, the monitoring pattern generation unit 803 refers to the received detection module list to determine which detection module will monitor which detection module, thereby generating an overall monitoring pattern for the detection module group 130 in the device 100.

In particular, the monitoring pattern generation unit 803 refers to the received identification number of the detection module to be deactivated to generate a cyclic monitoring pattern in which detection modules other than the detection module to be deactivated perform monitoring in a unidirectional cycle.

Note that a specific example of a cyclic monitoring pattern is described below.

Note also that the monitoring pattern generation unit 803 may select an overall monitoring pattern in which, for example, all of the detection modules monitor all of the other detection modules.

(c) Sending Unit 802

The sending unit 802 transmits the monitoring pattern for each detection module to the device 100 via the transmission unit 250 and the network. The sending unit 802 also notifies the determination unit 210 of generation of the monitoring patterns and of completion of transmission.

(d) Control Unit 804

The control unit 804 receives the monitoring pattern generation instruction from the reception unit 801.

Upon receiving the monitoring pattern generation instruction, the control unit 804 causes the monitoring pattern generation unit 803 to generate an overall monitoring pattern for the detection module group 130 in the device 100, to generate a monitoring pattern for each detection module, to transmit the monitoring patterns to the detection modules in the device 100, and to update the monitoring pattern in the device 100.

(3) Verification Operations

Figure 27:
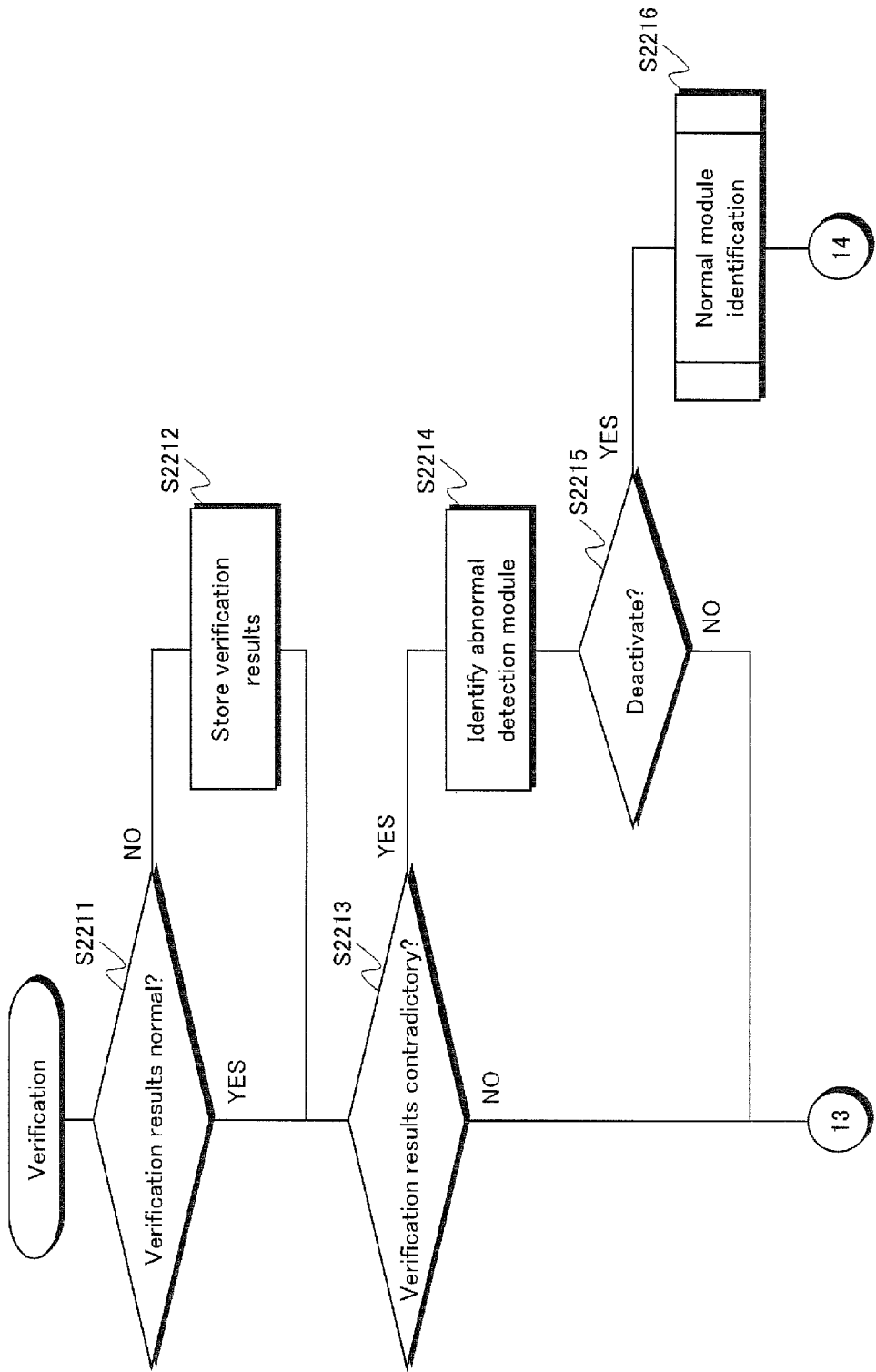
FIG. 27 is a flowchart showing verification in a management apparatus 200a and is continued in FIG. 28.
Figure 28:
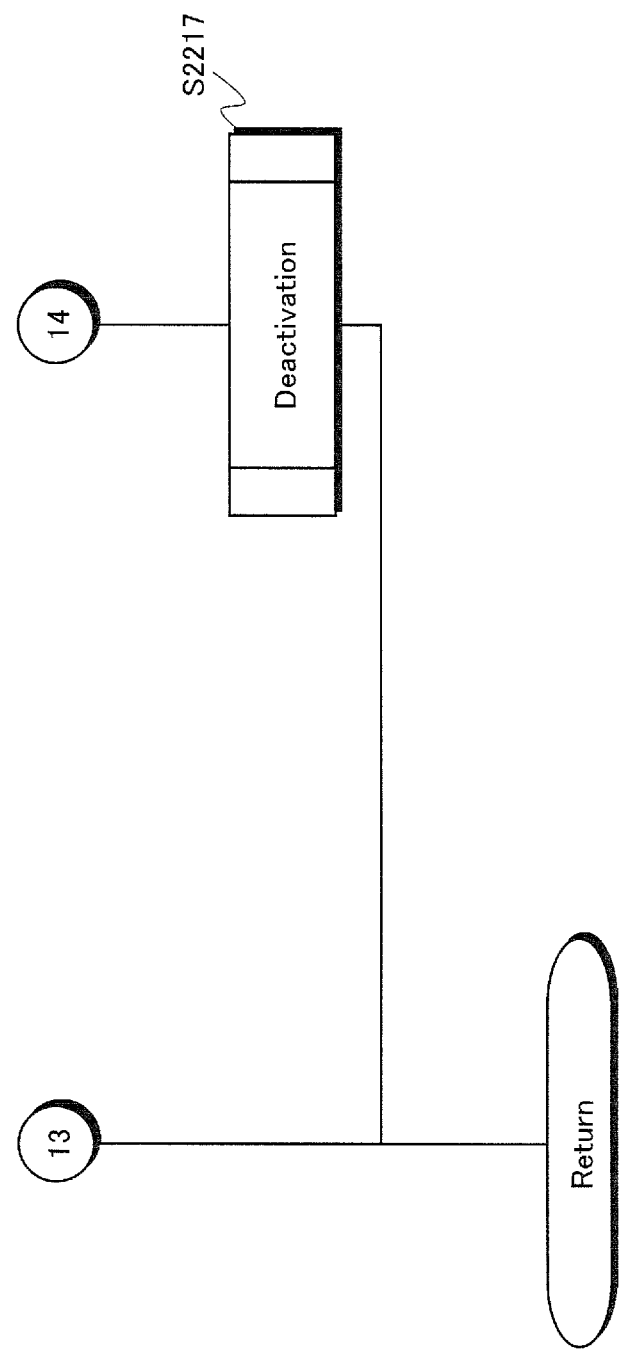
FIG. 28 is a flowchart showing verification in the management apparatus 200a and is continued from FIG. 27.

FIGS. 27 and 28 are flowcharts showing verification operations.

Figure 20:
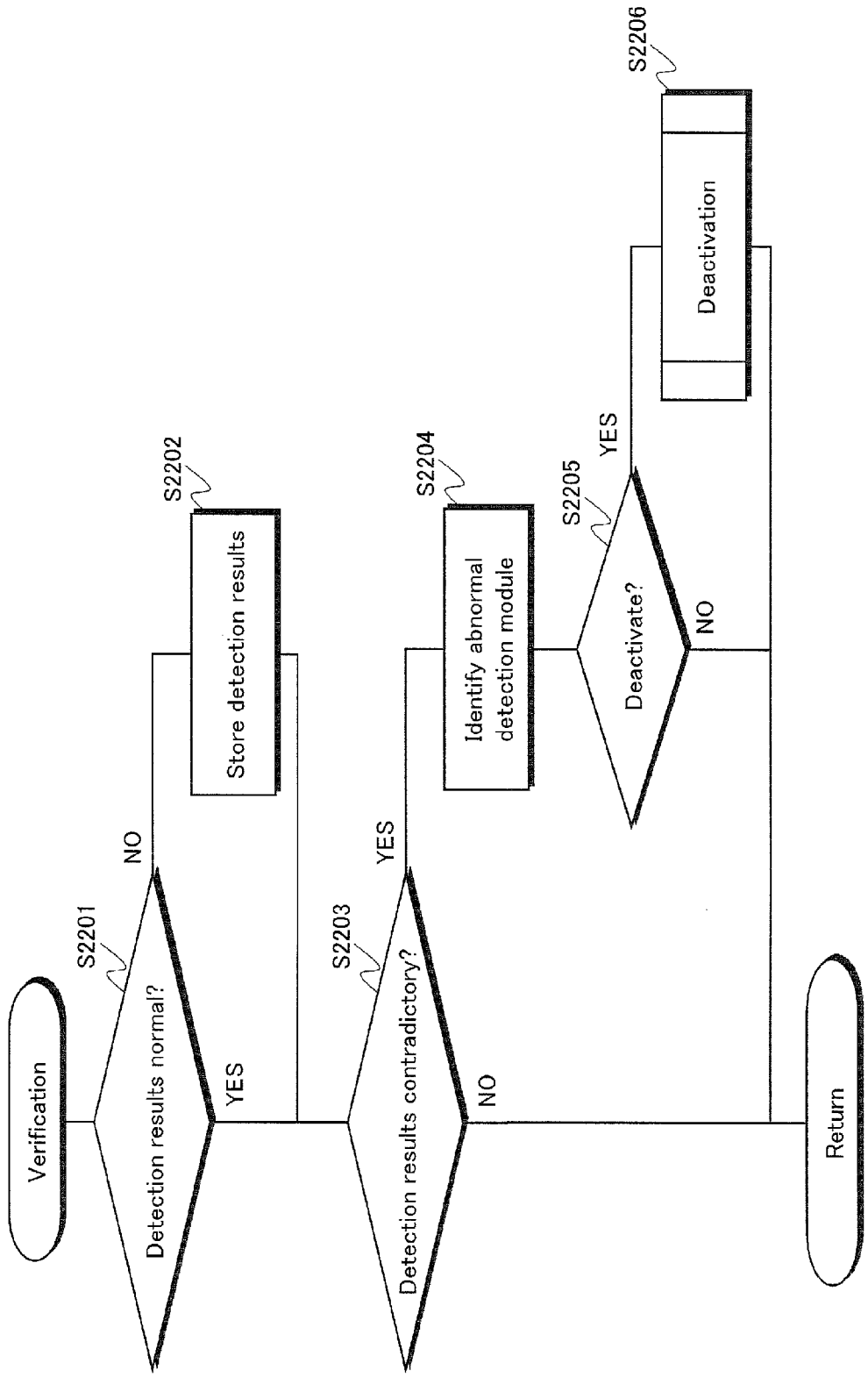
FIG. 20 is a flowchart showing verification in the management apparatus 200.

The operations from step S2211 to step S2215 in FIG. 27 respectively correspond to the operations in Embodiment 1 from step S2201 to step S2205 in FIG. 20, and deactivation (S2217) is the same operation as deactivation (S2206) in Embodiment 1. Therefore, a description of these operations is omitted. The following describes processing in step S2216.

The determination unit 210 determines whether to deactivate a detection module that has been identified as an abnormal detection module (S2215). If it is determined that no deactivation is necessary (S2215: NO), verification is complete. If it is determined that deactivation is necessary, (S2215: YES), then normal module identification to identify a normal detection module is performed (S2216).

(4) Normal Module Identification

Figure 29:
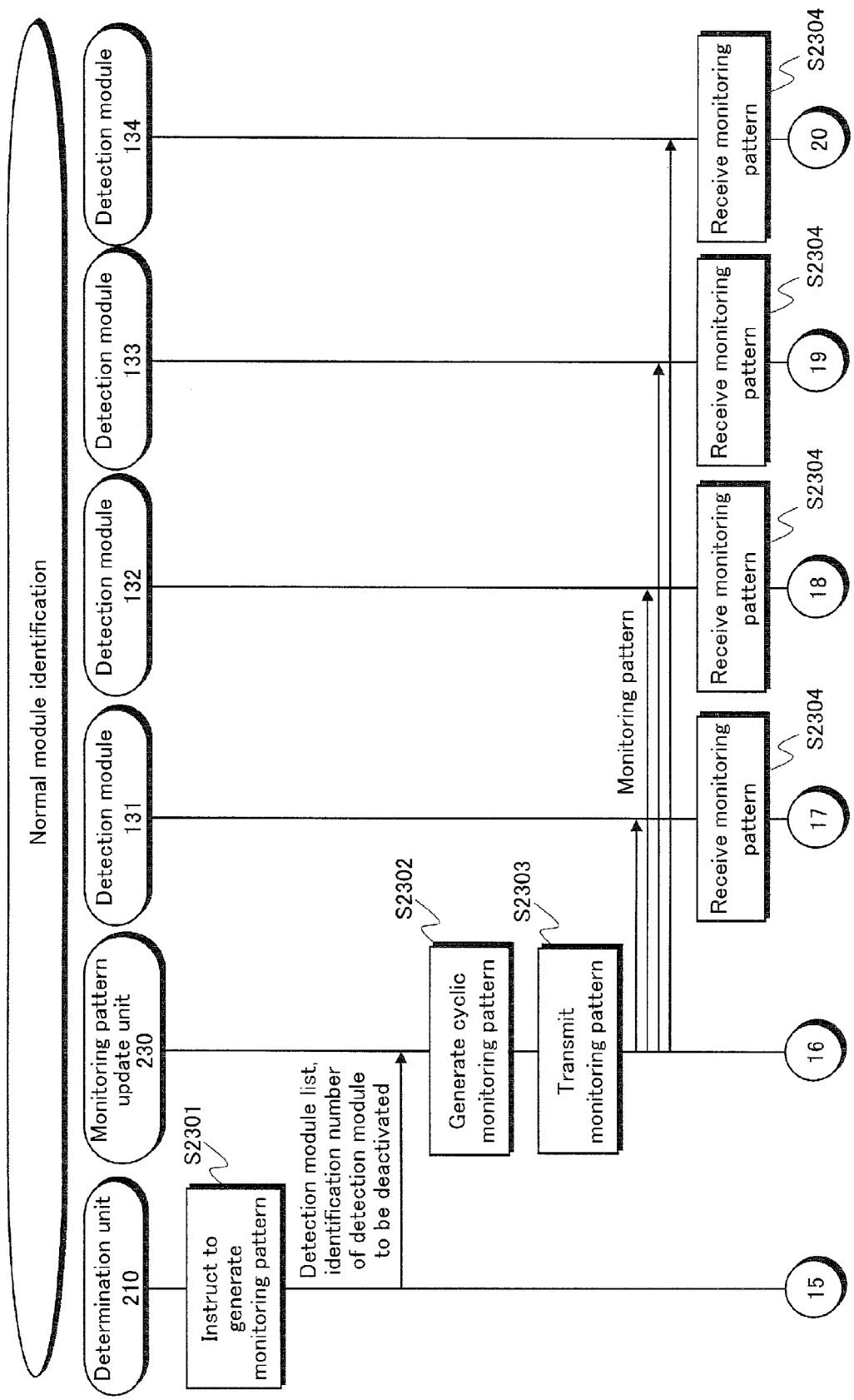
FIG. 29 is a sequence diagram showing normal module identification operations and is continued in FIG. 30.
Figure 30:
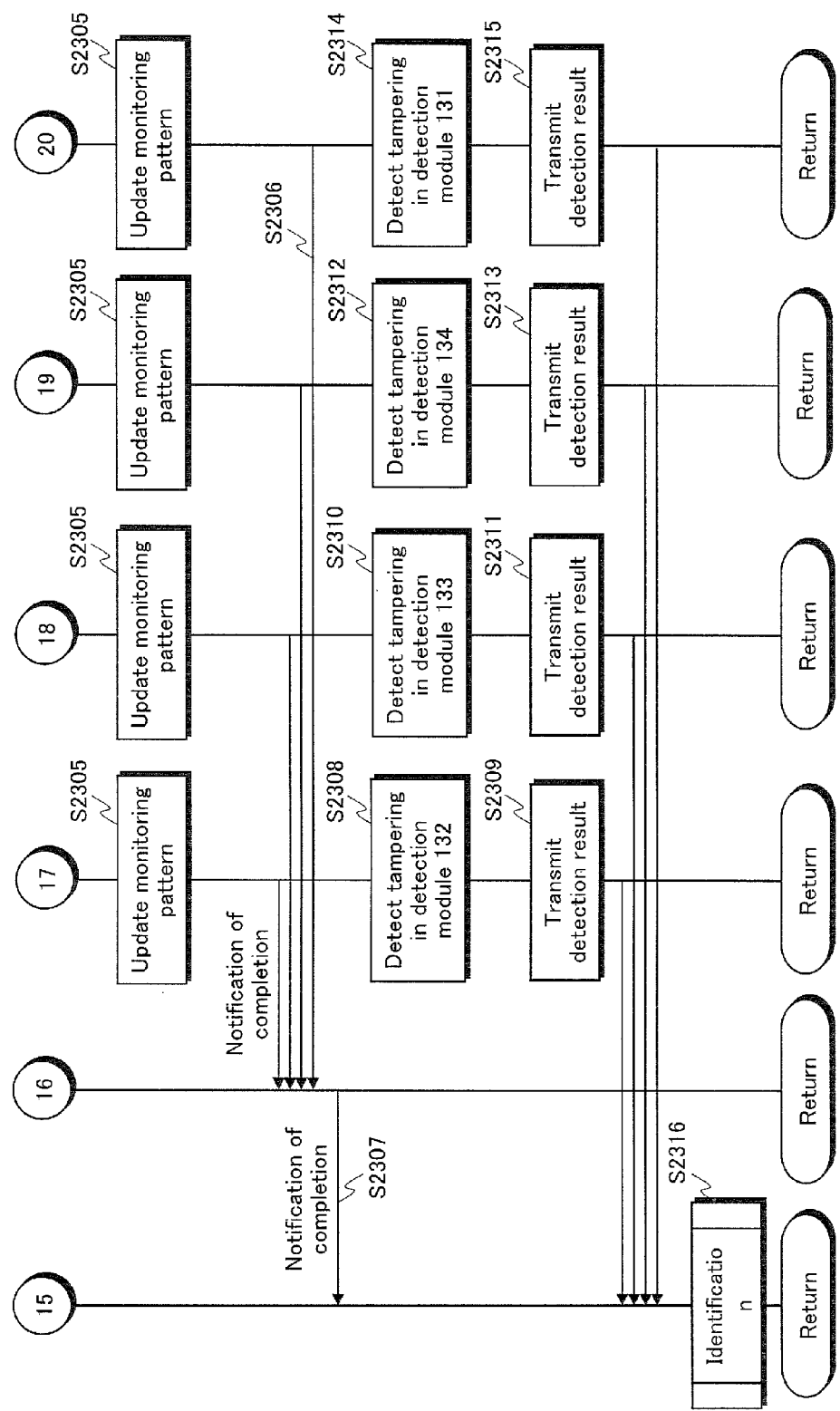
FIG. 30 is a sequence diagram showing normal module identification operations and is continued from FIG. 29.

FIGS. 29 and 30 are flowcharts showing normal module identification operations.

The determination unit 210 determines to deactivate a detection module and transmits the monitoring pattern generation instruction to the monitoring pattern update unit 230 along with the detection module list and the identification number of the detection module to be deactivated (S2301). In this example, it has been determined to deactivate the detection module 135.

The monitoring pattern update unit 230 receives, from the determination unit 210, the monitoring pattern generation instruction, the detection module list, and the identification number of the detection module to be deactivated (in this case, the identification number of the detection module 135). From the detection module list and the identification number of the detection module 135, the monitoring pattern update unit 230 generates a cyclic monitoring pattern among the detection modules other than the detection module 135 (S2302).

The cyclic monitoring pattern records, for a plurality of detection modules that perform tampering detection in a unidirectional cycle, information regarding the module to be monitored (verified). Specifically, the cyclic monitoring pattern lists a module identifier, a location in memory, a size, an address, a file name, etc. for each module.

Figure 31:
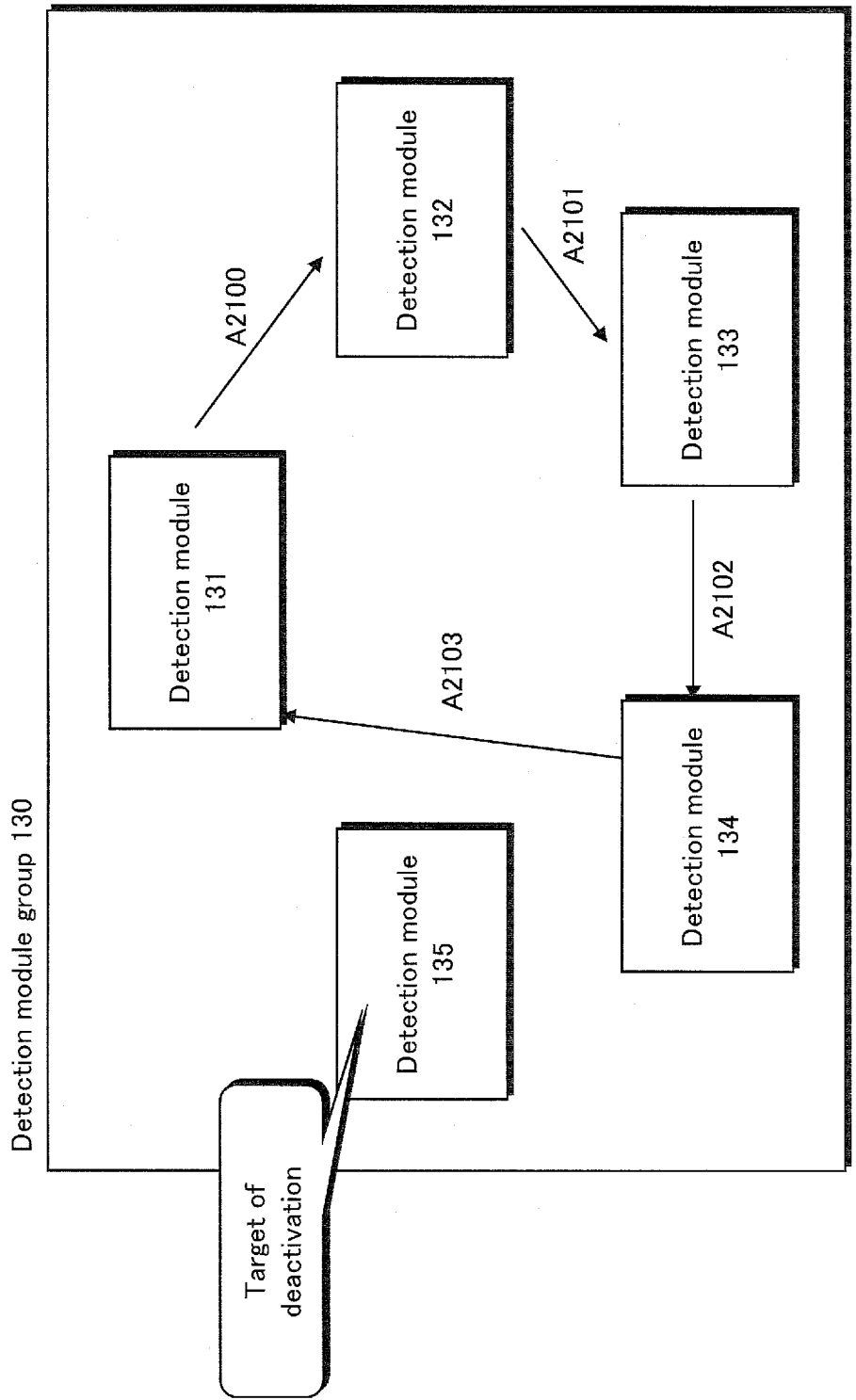
FIG. 31 illustrates a cyclic monitoring pattern.

The example shown in FIG. 31 is now described.

The example shown in FIG. 31 is a detection module group that performs tampering detection as a unidirectional cycle, the group consisting of the detection module 131, the detection module 132, the detection module 133, and the detection module 134. As shown by the arrows A2100, A2101, A2102, and A2103 in FIG. 31, the detection module 131 verifies the detection module 132, the detection module 132 verifies the detection module 133, the detection module 133 verifies the detection module 134, and the detection module 134 verifies the detection module 131.

The cyclic monitoring pattern is a description of inter-module monitoring by the detection modules 131, 132, 133, and 134.

Returning to FIG. 29, the monitoring pattern update unit 230 transmits the monitoring patterns to the detection modules (S2303).

Each detection module receives the corresponding monitoring pattern (S2304). Furthermore, each detection module updates its monitoring pattern with the received monitoring pattern by overwriting the monitoring pattern stored in the detection module (S2305). Upon completion of updating, each detection module transmits a notification of completion to the monitoring pattern update unit 230 (S2306).

Upon receiving the notification of completion from each detection module (S2306), the monitoring pattern update unit 230 transmits a notification of completion of monitoring pattern updating to the determination unit 210 (S2307).

Thereafter, each detection module that has updated its monitoring pattern performs tampering detection in accordance with the updated monitoring pattern.

The detection module 131 performs tampering detection on the detection module 132 (S2308) and transmits the tampering detection result to the determination unit 210 (S2309).

The detection module 132 performs tampering detection on the detection module 133 (S2310) and transmits the tampering detection result to the determination unit 210 (S2311).

The detection module 133 performs tampering detection on the detection module 134 (S2312) and transmits the tampering detection result to the determination unit 210 (S2313).

The detection module 134 performs tampering detection on the detection module 131 (S2314) and transmits the tampering detection result to the determination unit 210 (S2315).

The determination unit 210 receives the tampering detection results from the detection modules and performs processing for identification (S2316).

(a) Identification Operations

Figure 32:
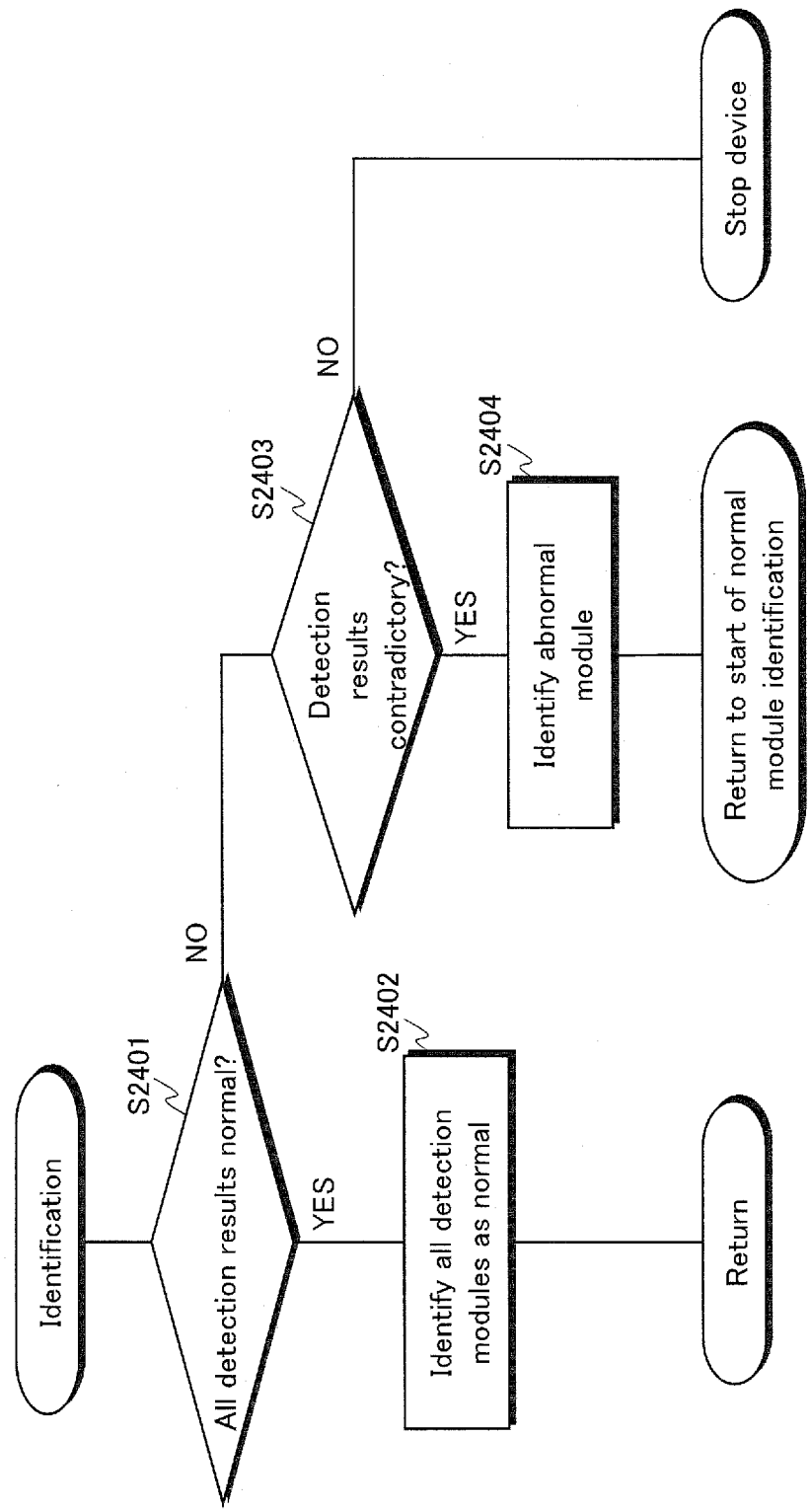
FIG. 32 is a flowchart showing the process of identification.

FIG. 32 is a flowchart showing identification operations.

The determination unit 210 determines whether all of the tampering detection results received from the detection modules are "No tampering (normal)" (S2401). If all of the tampering detection results are "No tampering (normal)" (S2401: YES), then all of the detection modules are determined to be normal detection modules that have not been tampered with (S2402), and identification processing terminates.

If not all of the tampering detection results are "No tampering (normal)" (S2401: NO), then the determination unit 210 determines whether the tampering detection results are contradictory (S2403). If the tampering detection results are not contradictory (S2403: NO), the device is stopped. If the tampering detection results are contradictory (S2403: YES), the detection module whose tampering detection results are contradictory is identified as an abnormal detection module (S2404).

Contradictory tampering detection results are described with reference to the example in FIG. 33.

Figure 33:
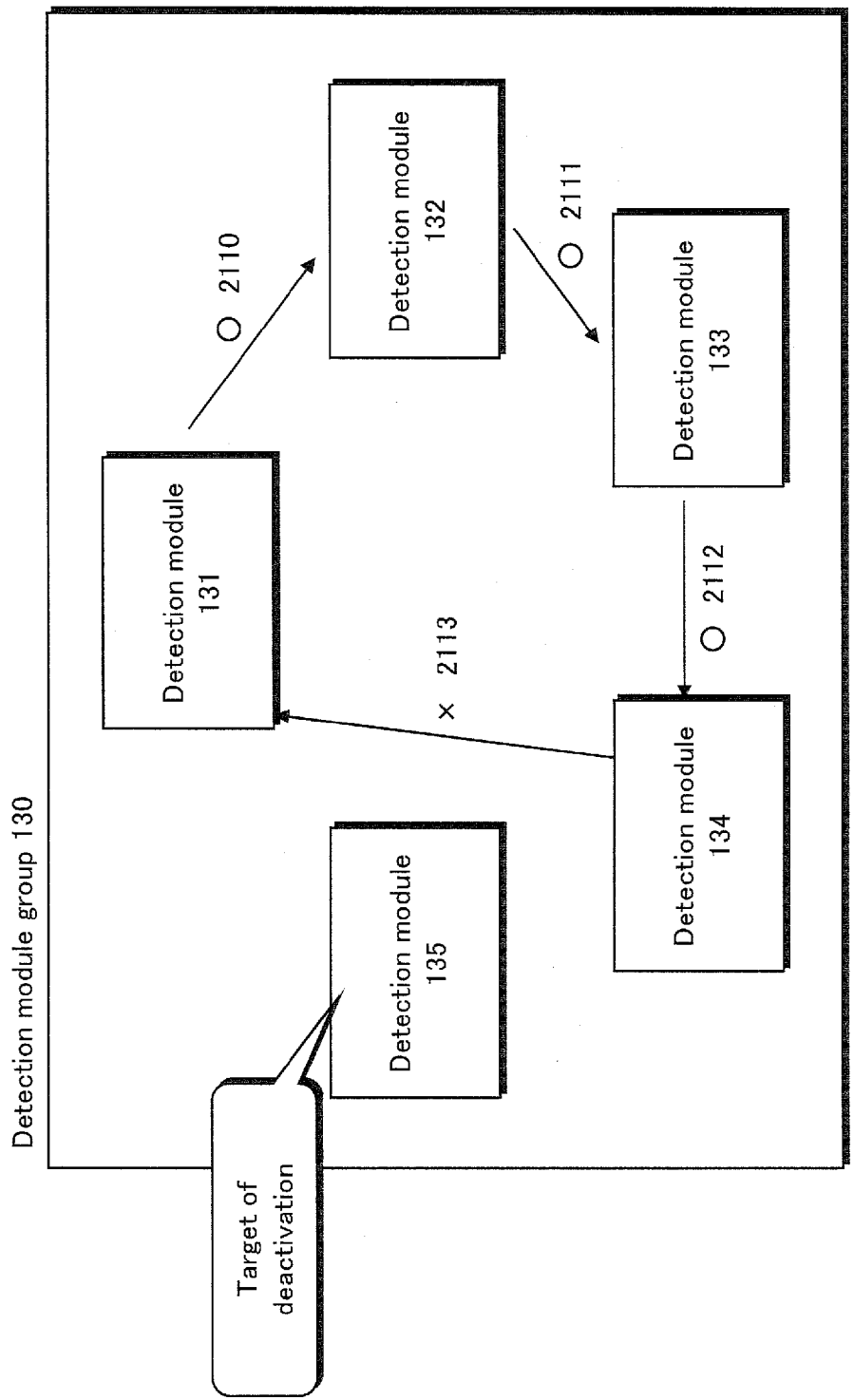
FIG. 33 illustrates detection results via the cyclic monitoring pattern.

In FIG. 33, the detection modules 131, 132, and 133 indicate "No tampering (normal)" respectively for the detection modules 132, 133, and 134, as represented by the circles ○ 2110, 2111, and 2112. As represented by the X 2113, however, the detection module 134 indicates "Tampering (abnormal)" for the detection module 131.

If the detection module 131 is assumed to be a normal detection module, then the detection module 132, for which the normal detection module 131 indicates "No tampering (normal)", is also normal. The detection module 133, for which the normal detection module 132 indicates "No tampering (normal)", is therefore also normal. The detection module 134, for which the normal detection module 133 indicates "No tampering (normal)", should therefore also be normal. However, the normal detection module 134 indicates "Tampering (abnormal)" for the detection module 131, which contradicts the assumption that the detection module 131 is a normal detection module. Therefore, the assumption that the detection module 131 is a normal detection module is incorrect, and the detection module 131 is identified as an abnormal detection module that has been tampered with.

After identifying an abnormal detection module, processing for normal module identification is performed again.

As described above, if all of the tampering detection results are "No tampering (normal)" using the cyclic monitoring pattern, then all of the detection modules are determined to be normal detection modules that have not been tampered with. Furthermore, detection modules can be monitored with a minimum amount of monitoring by using the cyclic monitoring pattern.

3. Embodiment 3

The following describes a software updating system 12 as Embodiment 3 of the present invention.

In the software updating system 12, when tampering is detected for the protection control module 120, the protection control module 120 is updated to a new protection control module 121. The method for updating the protection control module 120 in the software updating system applies the present invention to the method described in detail in Patent Literature 3. The detection modules in this Embodiment include the update function of the update module in Patent Literature 3.

3.1 Structure of Software Updating System 12

(1) Overall Structure

The structure of the software updating system 12 is described with reference to FIG. 34.

Figure 34:
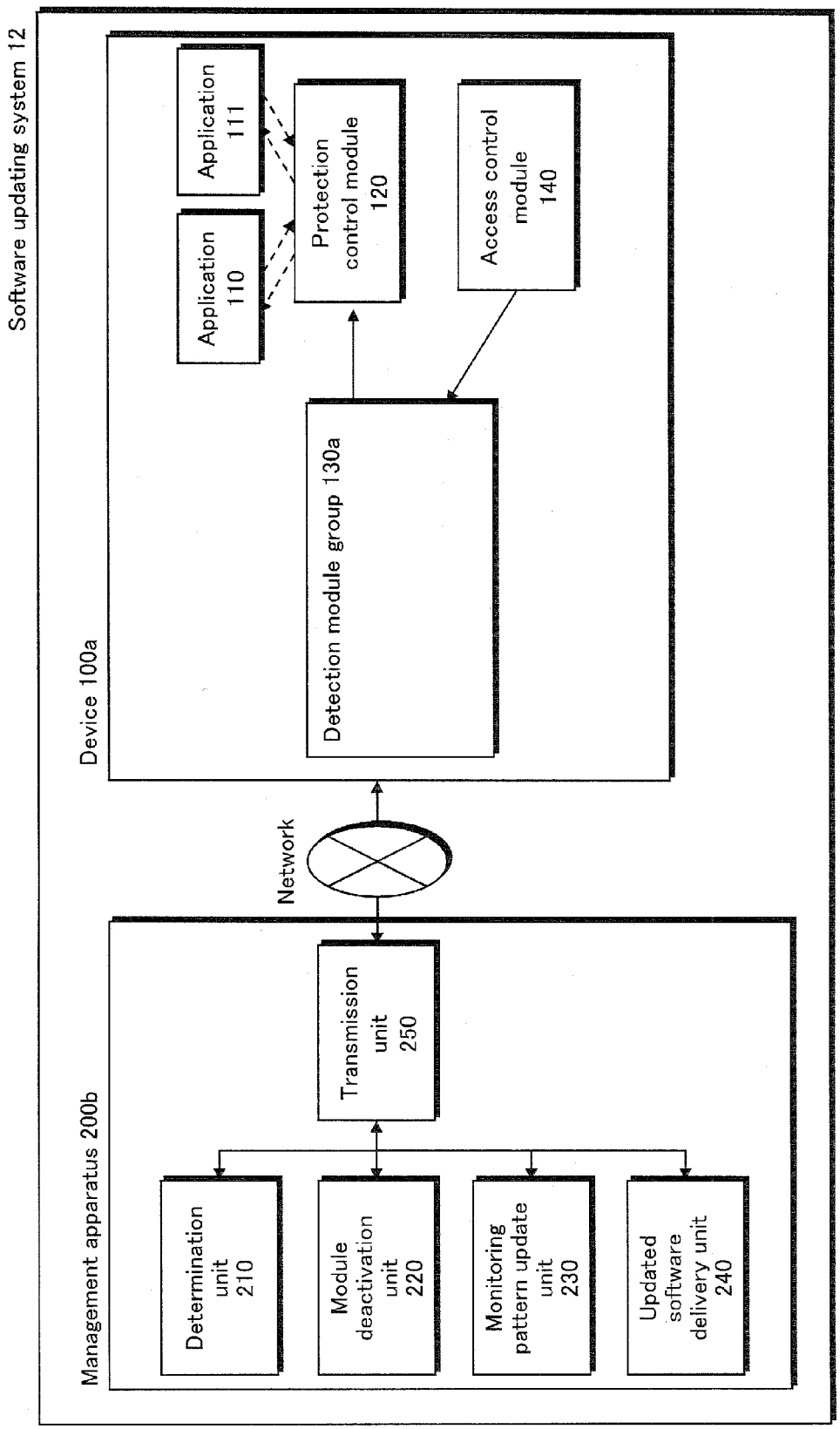
FIG. 34 is an overall structure diagram of a software updating system 12 according to Embodiment 3 of the present invention.

As shown in FIG. 34, the software updating system 12 includes a device 100a, which is an information processing apparatus, and a management apparatus 200b. The device 100a and the management apparatus 200b are connected via a network.

The management apparatus 200b includes a determination unit 210, a module deactivation unit 220, a monitoring pattern update unit 230, an updated software delivery unit 240, and a transmission unit 250. The device 100a also includes a detection module group 130a, a protection control module 120a, an access control module 140, and applications 110 and 111.

In FIG. 34, constituent elements having the same functions as in Embodiment 2 are provided with the same reference signs as in FIG. 2, and a detailed description thereof is omitted. The following provides a detailed description of the characteristic constituent elements and processing in the software updating system 12.

(2) Structure of Device 100a (a) Structure of Protection Control Module 120a

The following describes the protection control module 120a in detail.

Figure 35:
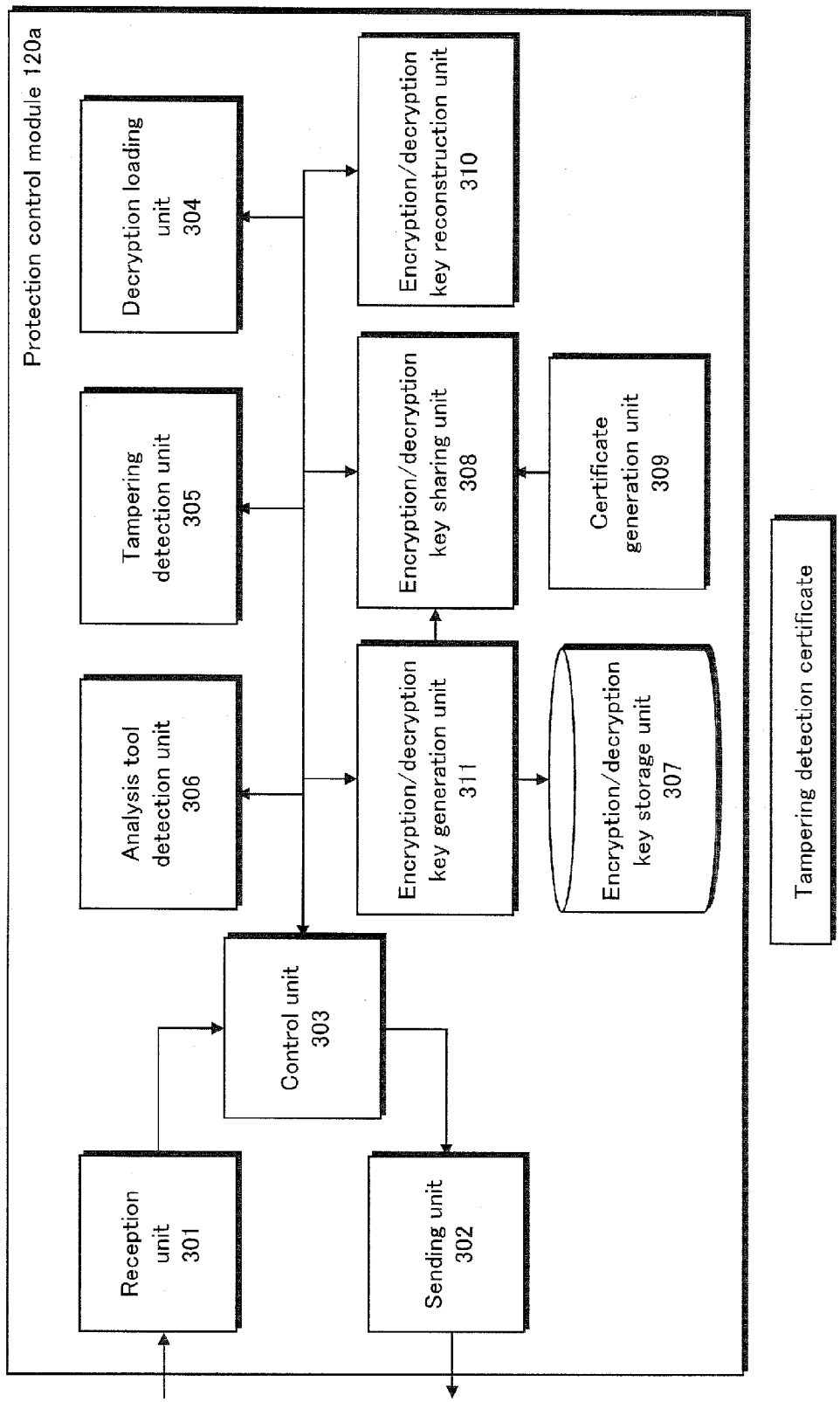

FIG. 35 is a functional block diagram showing the functional structure of the protection control module 120a.

As shown in FIG. 35, in addition to the structure of the protection control module 120 in FIG. 3, the protection control module 120a includes an encryption/decryption key sharing unit 308, a certificate generation unit 309, an encryption/decryption key reconstruction unit 310, and an encryption/decryption key generation unit 311.

The encryption/decryption key sharing unit 308 generates shares from the encryption/decryption key using a secret sharing scheme at the time of initialization and next round preparation.

The certificate generation unit 309 generates a certificate used to verify whether reconstruction succeeded correctly when the shares generated from the encryption/decryption key are reconstructed.

Based on distribution information, the encryption/decryption key reconstruction unit 310 acquires, from the detection modules, the shares distributed thereto. The encryption/decryption key reconstruction unit 310 reconstructs the encryption/decryption key from the acquired shares and transmits the reconstructed encryption/decryption key to the decryption loading unit 304.

The encryption/decryption key generation unit 311 generates an encryption/decryption key for encrypting and decrypting the applications 110 and 111.

(b) Structure of Detection Module Group 130a

The detection module group 130a includes detection modules 131a, 132a, 133a, 134a, and 135a. The following describes the detection module 131a in detail, omitting a description of the other detection modules 132a, 133a, 134a, and 135a.

Figure 36:
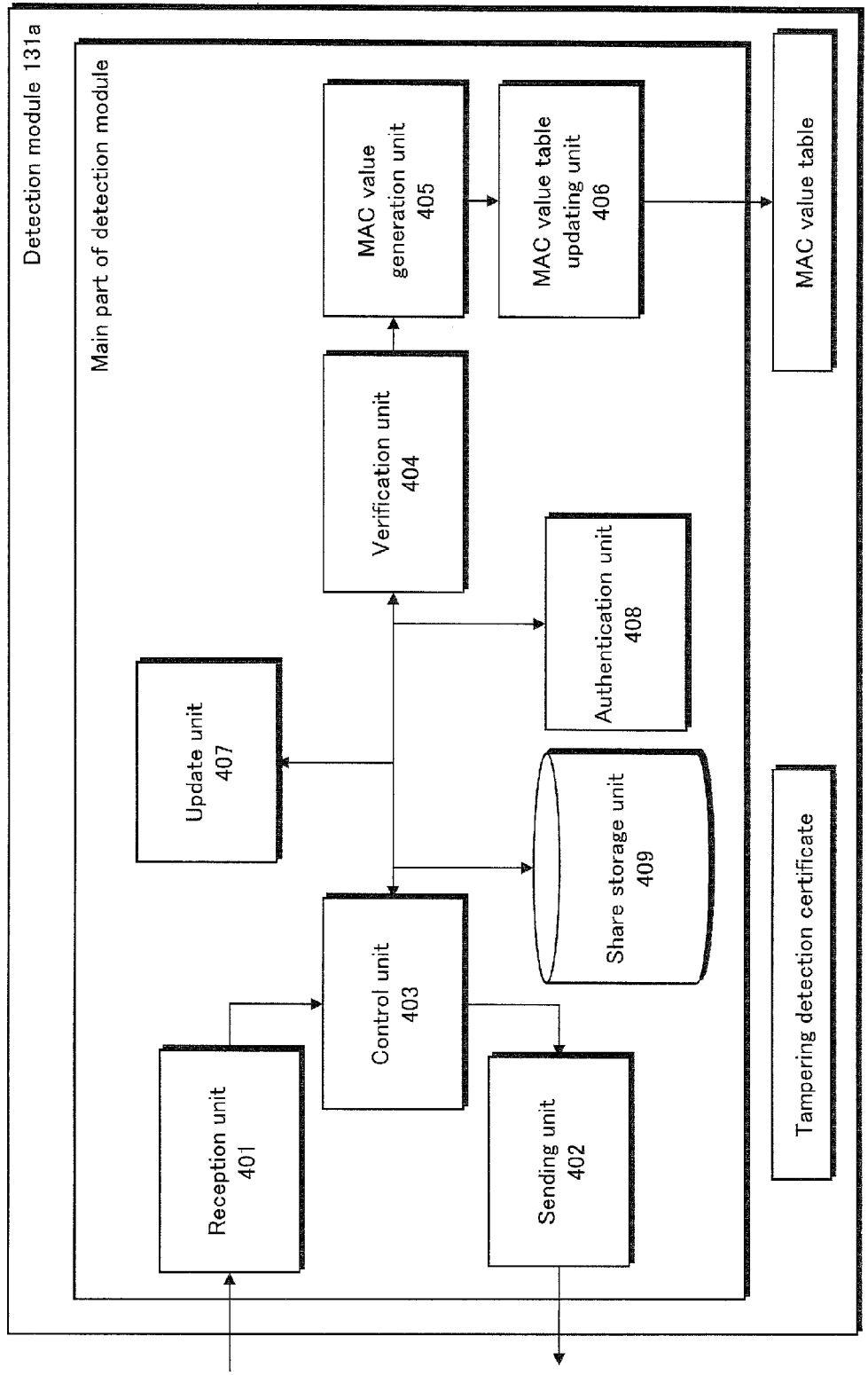

FIG. 36 is a functional block diagram showing the functional structure of the detection module 131a. The other detection modules have a similar structure.

As shown in FIG. 36, in addition to the structure of the detection module 131 in FIG. 4, the detection module 131a includes an update unit 407, an authentication unit 408, and a share storage unit 409.

A control unit 403 causes the update unit 407 to update the software in the device 100a in coordination with the management apparatus 200b. Specifically, the applications 110 and 111, the protection control module 120a, and the detection modules 131a, 132a, 133a, 134a, and 135a are updated.

The authentication unit 408 stores a pair of authentication keys for the detection module (an authentication private key and an authentication public key) and performs authentication on other modules.

The share storage unit 409 stores a share generated from the encryption/decryption key, which the protection control module 120a uses to encrypt and decrypt the applications 110 and 111, and distribution information regarding the shares distributed by the protection control module 120a. The distribution information indicates which shares were distributed to which detection modules.

A signature method is described on pages 171 to 187 of Non-Patent Literature 1, and certificates are described in detail in Non-Patent Literature 2. Furthermore, Patent Literature 2 describes shares in detail.

(c) Updated Software Delivery Unit 240

Figure 37:
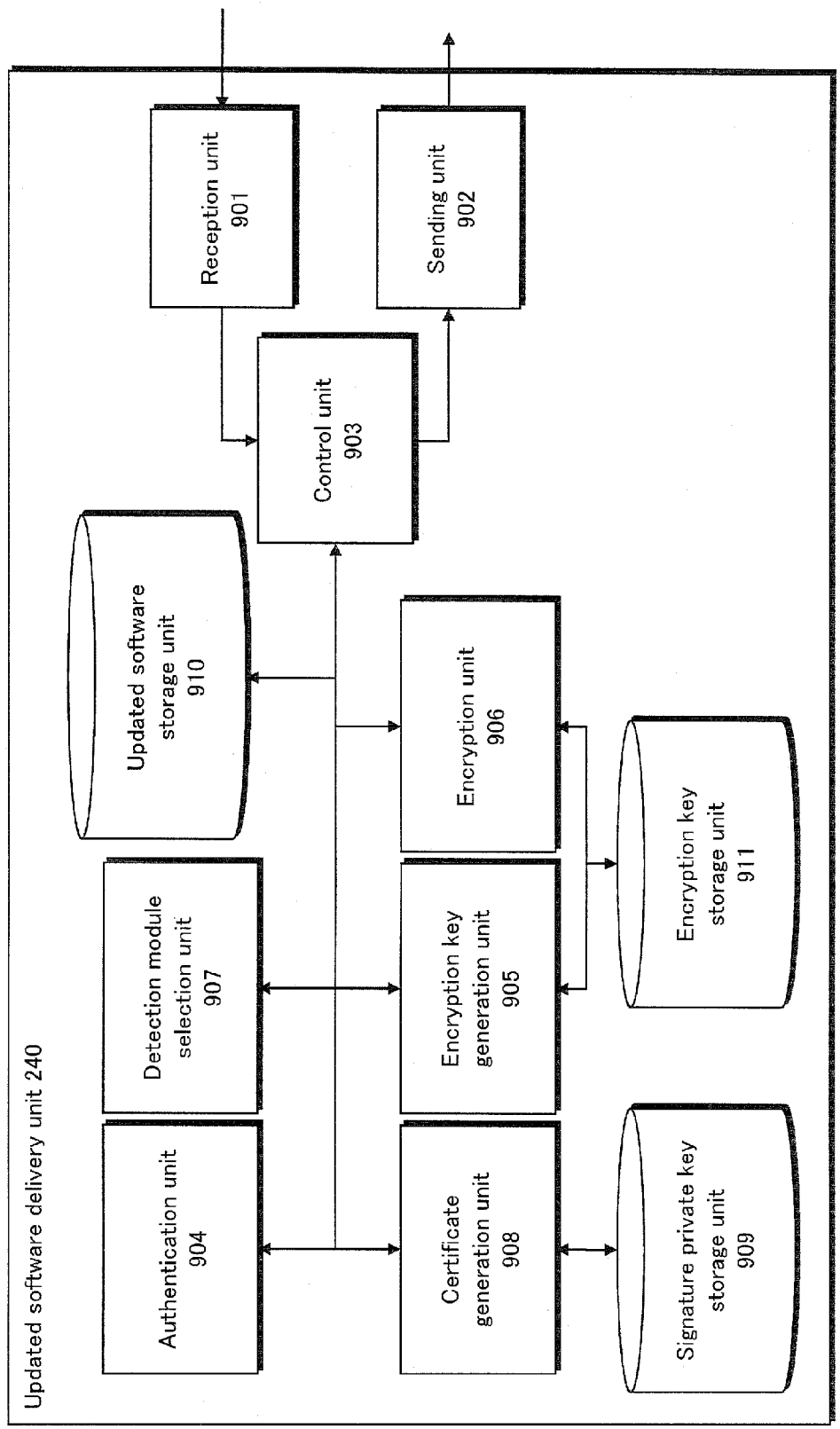
FIG. 37 is a configuration diagram of an updated software delivery unit 240.

FIG. 37 is a functional block diagram showing the functional structure of the updated software delivery unit 240.

As shown in FIG. 37, the updated software delivery unit 240 includes a reception unit 901, a sending unit 902, a control unit 903, an authentication unit 904, an encryption key generation unit 905, an encryption unit 906, a detection module selection unit 907, a certificate generation unit 908, a signature private key storage unit 909, an updated software storage unit 910, and an encryption key storage unit 911.

The reception unit 901 receives tampering detection results regarding the protection control module 120a and inter-monitoring results for monitoring between detection modules from the detection modules 131*a*, 132*a*, 133*a*, 134*a*, and 135*a*.

When it is necessary to update the applications 110 and 111 or the protection control module 120*a* in the device 100*a*, the sending unit 902 transmits an update request and data such as updated software, a key necessary for decryption, etc. to the detection modules 131*a*, 132*a*, 133*a*, 134*a*, and 135*a*.

The control unit 903 controls the constituent elements in the updated software delivery unit 240.

The authentication unit 904 performs mutual authentication with the detection modules 131*a*, 132*a*, 133*a*, 134*a*, and 135*a*, and with the protection control module 120*a*.

The encryption key generation unit 905 generates the encryption key used when transmitting updated software to the detection modules 131*a*, 132*a*, 133*a*, 134*a*, and 135*a*.

The encryption unit 906 encrypts the updated software using the encryption key generated by the encryption key generation unit 905. The encryption unit 906 also encrypts the encryption key using a key unique to each detection module.

The encryption keys and updated software are not transmitted to the detection modules 131*a*, 132*a*, 133*a*, 134*a*, and 135*a* all at once. Rather, data is transferred to each detection module when the data becomes necessary during the updating process.

When the protection control module 120*a* is to be updated, the detection module selection unit 907 selects the detection module used for updating. The encryption unit 906 encrypts the encryption key used to encrypt the updated protection control module with the key unique to the detection module selected by the detection module selection unit 907. The sending unit 902 transmits the encryption key and the updated protection control module to the detection module selected by the detection module selection unit 907.

The certificate generation unit 908 generates an authentication certificate for the authentication public key stored by each of the detection modules 131*a*, 132*a*, 133*a*, 134*a*, and 135*a* using a signature private key. The certificate generation unit 908 also generates, using the signature private key for the updated protection control module, an update verification certificate for verifying that the protection control module in the device 100 has been correctly updated.

The signature private key storage unit 909 stores the signature private key used when the certificate generation unit 908 generates certificates.

The updated software storage unit 910 stores an updated protection control module for updating the protection control module 120*a* when the protection control module 120*a* is attacked.

The encryption key storage unit 911 stores the encryption key generated by the encryption key generation unit 905 and the encryption key encrypted by the encryption unit 906.

3.2 Operations of Software Updating System 12

Next, the operations of the software updating system 12 are described.

(1) Overall Operations

Figure 38:
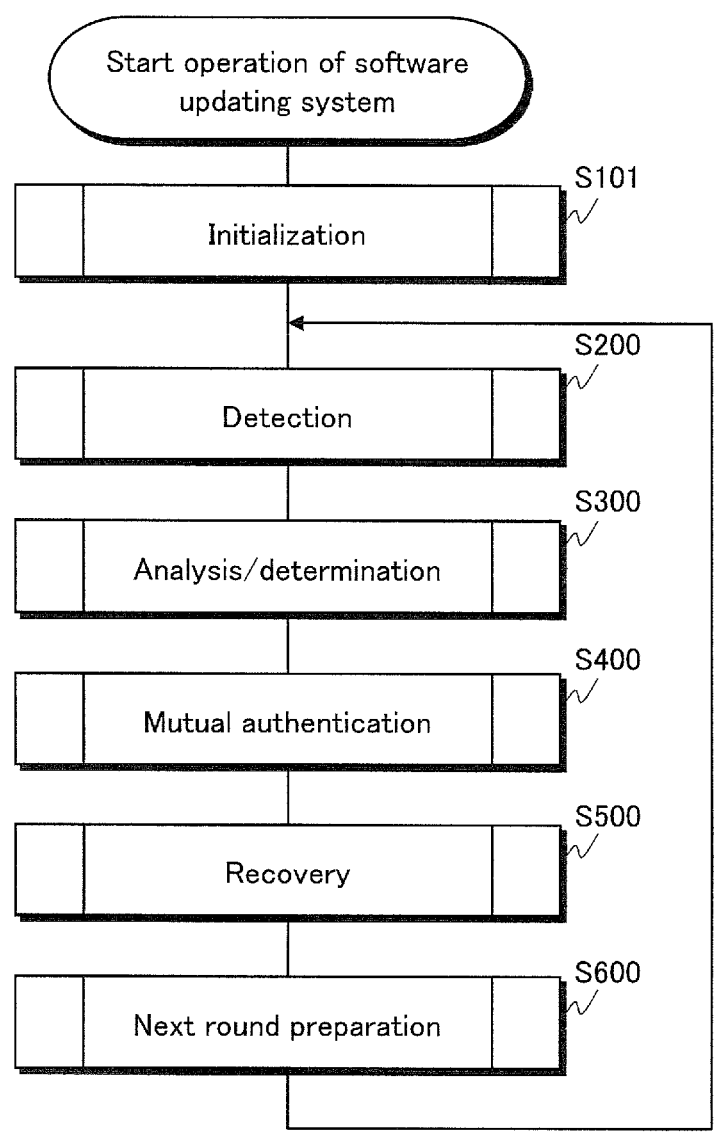
FIG. 38 is a flowchart showing operations of the software updating system 12.

In addition to the initialization (S100 in FIG. 10) and detection (S200 in FIG. 10) in the above embodiments, the software updating system 12 performs the following four processes: analysis/determination, mutual authentication, recovery, and next round preparation. FIG. 38 is a flowchart showing operations of the software updating system 12.

The software updating system 12 performs initialization (S101) and detection (S200).

Next, when tampering is detected in the protection control module 120*a* during step S201 in FIG. 13, the software updating system 12 performs analysis/determination to analyze the protection control module 120*a* and determine whether updating is necessary (S300).

In the software updating system 12, the detection modules 131*a*, 132*a*, 133*a*, 134*a*, and 135*a* and the updated software delivery unit 240 then perform mutual authentication to confirm each other as authentic software (S400).

The software updating system 12 then performs recovery (S500).

Recovery refers to (i) installing an updated protection control module in the device 100*a* after detection of tampering during detection between detection modules included in the detection module group 130*a* and (ii) updating the protection control module in the device 100*a* using shares embedded in the detection modules 131*a*, 132*a*, 133*a*, 134*a*, and 135*a*.

Subsequently, the software updating system 12 performs next round preparation in preparation for the next time the protection control module will need to be updated, generating key data and shares necessary for updating and embedding the generated information in the detection modules (S600). The software updating system 12 then returns to the detection in step S200 and continues processing.

(2) Initialization Operations

Figure 39:
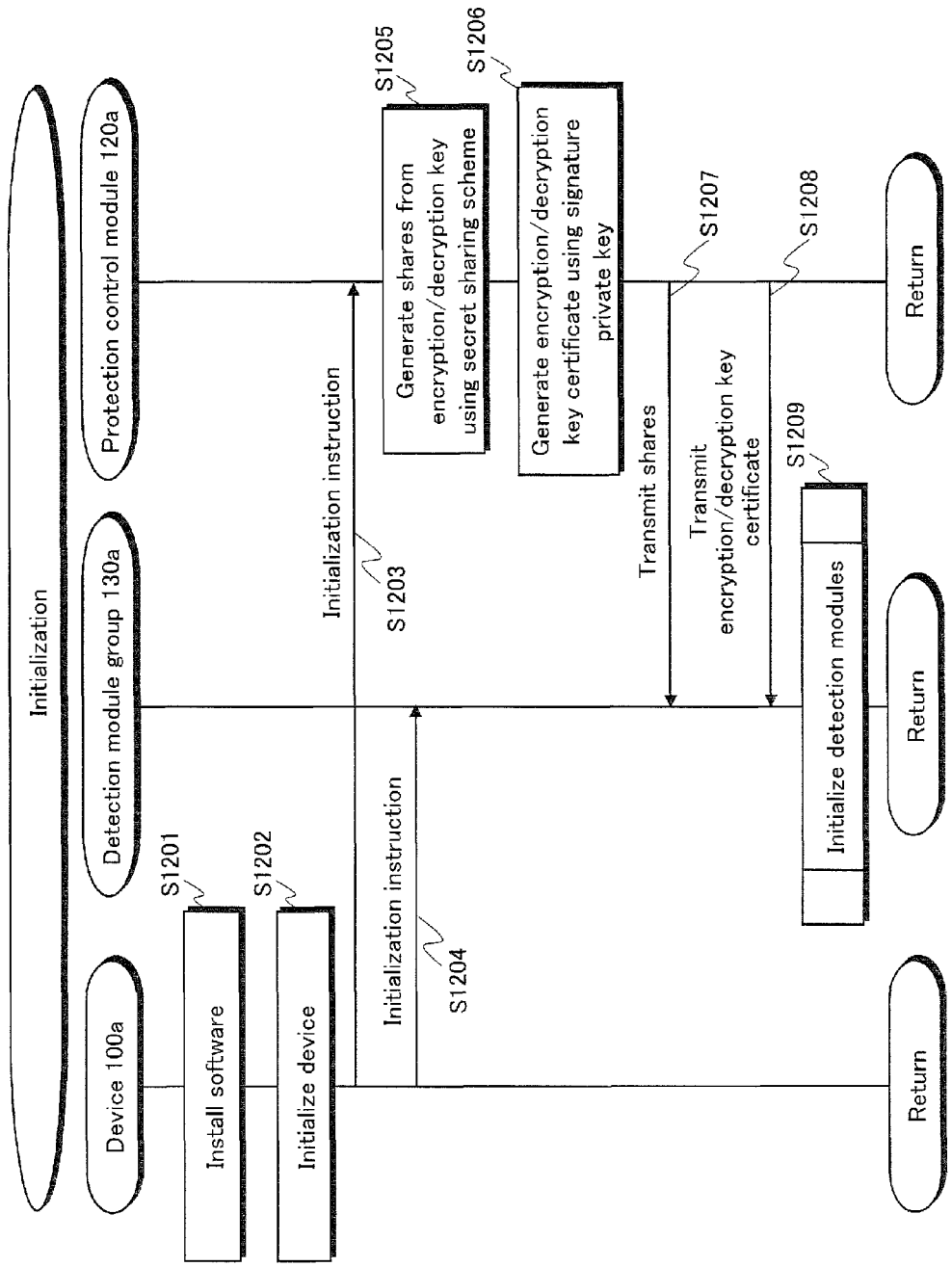
FIG. 39 is a sequence diagram showing initialization.
Figure 40:
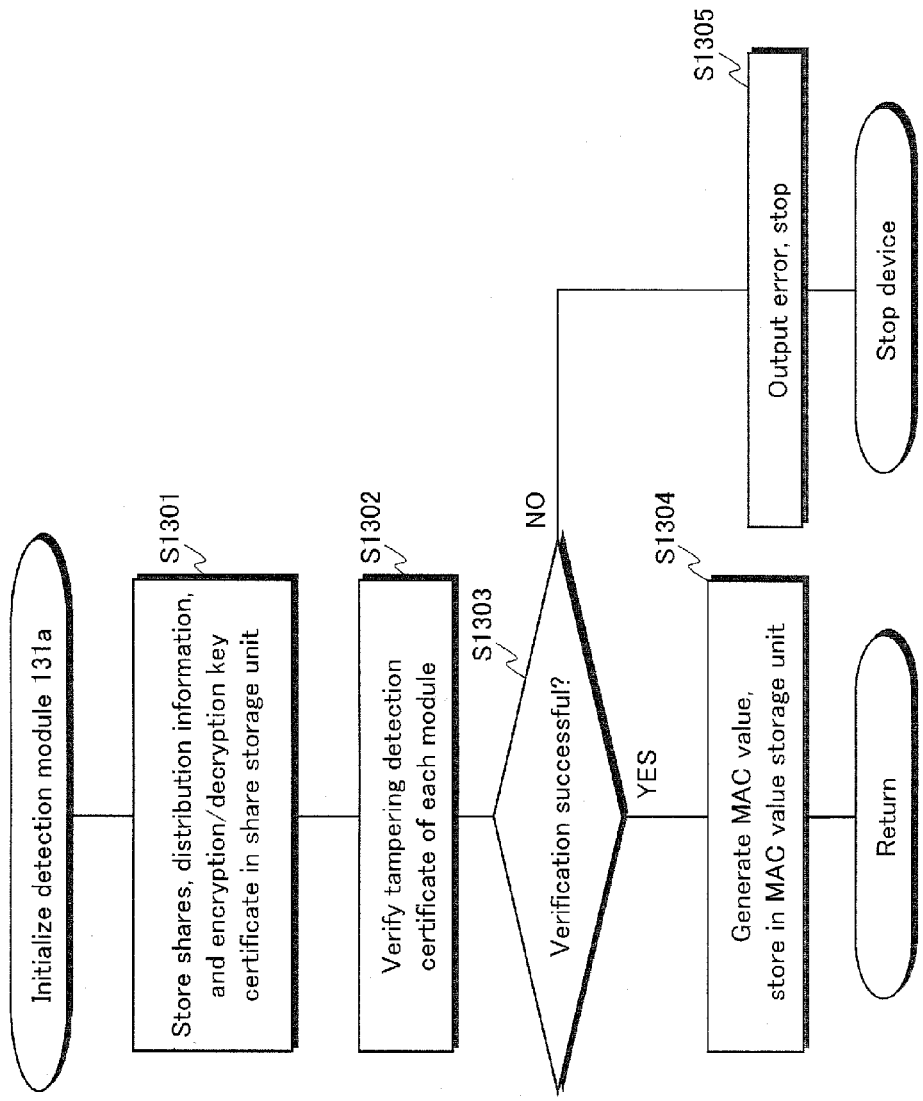
FIG. 40 is a flowchart showing initialization (detection module initialization).

The following describes initialization in the software updating system 12 (S101 in FIG. 38) in detail with reference to the sequence diagram in FIG. 39 and the flowchart in FIG. 40.

The operations from step S1201 to step S1202 in FIG. 39 respectively correspond to the operations in Embodiment 1 from step S1001 to step S1002 in FIG. 11, and therefore a description of these operations is omitted.

After initialization of the device 100*a*, the device 100*a* issues an initialization instruction to the protection control module 120*a* and to the detection modules 131*a*, 132*a*, 133*a*, 134*a*, and 135*a* (S1203, S1204).

The protection control module 120*a* generates shares from the encryption/decryption key using the secret sharing scheme (S1205). Note that the protection control module 120*a* generates the same number of shares as the number of detection modules provided with the share storage unit 409. When all of the detection modules 131*a*, 132*a*, 133*a*, 134*a*, and 135*a* are provided with the share storage unit 409, the protection control module 120*a* generates five shares.

Furthermore, the protection control module 120*a* generates the encryption/decryption key certificate using the signature private key (S1206). The encryption/decryption key certificate is for confirming, after reconstruction of the encryption/decryption key, that the encryption/decryption key has been correctly reconstructed.

The protection control module 120*a* transmits the generated shares and encryption/decryption key certificate to the detection modules 131*a*, 132*a*, 133*a*, 134*a*, and 135*a* (S1207, S1208).

Note that the protection control module 120*a* transmits a combination of shares to each of the detection modules 131*a*, 132*a*, 133*a*, 134*a*, and 135*a* so that each detection module stores a different combination of shares. Furthermore, the protection control module 120*a* transmits, to each detection module, distribution information indicating which shares were distributed to which detection modules. The same distribution information is transmitted to each detection module.

Pages 47 to 49 of Patent Literature 2 contain a detailed description of both the method for generating the shares from the encryption/decryption key using the secret sharing scheme, as well as the method for transmitting the shares to the detection modules. In order to employ the same method as in Patent Literature 2, the encryption/decryption key in Embodiment 3 can be made to correspond to the private key d, the protection control module 120a to the authentication authority device, and the detection modules 131a, 132a, 133a, 134a, and 135a to the share storing devices in Patent Literature 2.

After receiving the shares, the distribution information, and the encryption/decryption key certificate from the protection control module 120a, detection module initialization is performed (S1209).

(a) Detection Module Initialization Operations

FIG. 40 is a flowchart showing operations for detection module initialization (S1209 in FIG. 39).

The operations from step S1302 to step S1305 in FIG. 40 respectively correspond to the operations in Embodiment 1 from step S1101 to step S1104 in FIG. 12, and therefore a description of these operations is omitted.

The detection module 131a receives the shares, the distribution information, and the encryption/decryption key certificate from the protection control module 120a, storing the received information in the share storage unit 409 (S1301).

(3) Detection Operations

Detection operations in step S200 of FIG. 38 are the same as the detection in Embodiments 1 and 2, and therefore a description thereof is omitted.

(4) Analysis/Determination Operations

Figure 41:
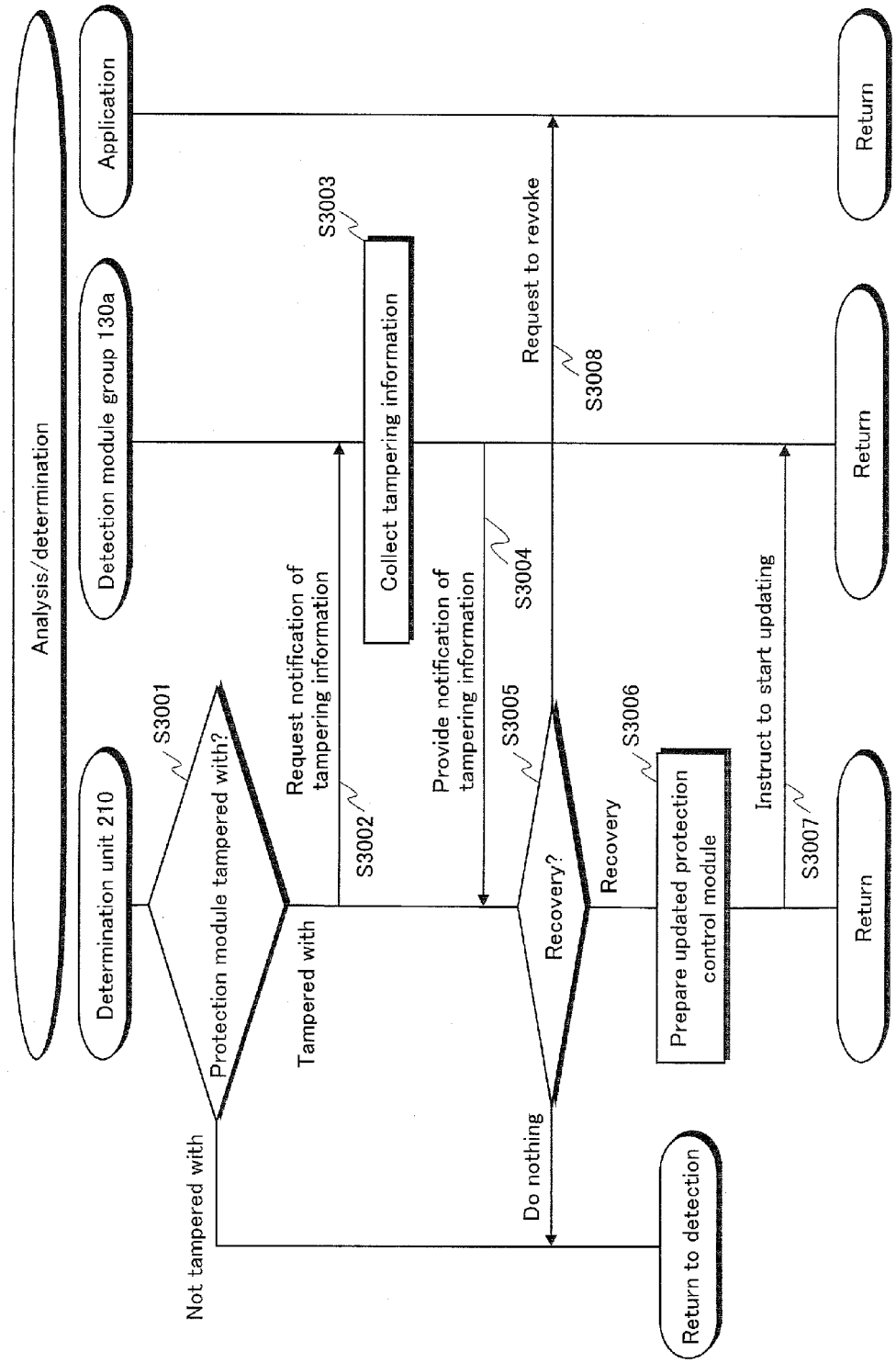
FIG. 41 is a sequence diagram showing analysis and determination.

Next, analysis/determination (S300 in FIG. 38) is described in detail with reference to the sequence diagram in FIG. 41. Note that FIG. 41 represents processing performed individually by the detection modules 131a, 132a, 133a, 134a, and 135a collectively as being performed by the detection module group 130a.

When the determination unit 210 receives tampering detection results for the protection control module 120a from the detection modules during detection, the determination unit 210 determines whether the protection control module 120a is normal or abnormal (whether the protection control module 120a has been tampered with) based on the received tampering detection results (S3001).

An example of the method of determination is to determine that the protection control module 120a is abnormal (has been tampered with) when at least a predetermined number of detection modules detect tampering, and to determine that the protection control module 120a is normal (has not been tampered with) when less than the predetermined number of detection modules detect tampering. The predetermined number may be a majority of the detection modules included in the detection module group 130a. An alternative method of determination is to perform the same normal module identification as detection in step S2216, determining the protection control module 120a to be abnormal (tampered with) when a detection module identified as normal detects tampering in the protection control module 120a, and determining the protection control module 120a to be normal (not tampered with) when the detection module identified as normal does not detect tampering in the protection control module 120a.

When determining the protection control module 120a to have been tampered with (S3001: "Tampering"), the determination unit 210 requests notification of tampering information, such as the part of the protection control module 120a that was tampered with, from the detection module group 130a in order to determine whether it is necessary to recover the protection control module 120a (S3002).

Upon receiving a request for notification of tampering information, the detection module group 130a collects the tampering information (S3003) and notifies the determination unit 210 of the collected tampering information (S3004).

Based on the tampering information, the determination unit 210 determines whether to recover the protection control module 120a, to revoke the device 100a, or to do nothing (S3005).

When the protection control module 120a is to be recovered (S3005: "Recovery"), the determination unit 210 prepares an updated protection control module (S3006) and instructs the detection module group 130a to start updating (S3007). When the device 100a is to be revoked (S3005: "Request to revoke"), the determination unit 210 issues a request to the server providing service to the applications 110 and 111 to revoke the device 100a (S3008). When the determination unit 210 determines to do nothing (S3005: "Do nothing"), processing returns to detection.

When the determination unit 210 determines "No tampering" in step S3001, i.e. that the protection control module 120a is normal (not tampered with), processing returns to detection.

(5) Mutual Authentication Operations

Next, mutual authentication by the software updating system 12 (S400 in FIG. 38) is described in detail with reference to the sequence diagrams in FIGS. 42 and 43.

When determining, during analysis/determination, that it is necessary to recover the protection control module 120a, the determination unit 210 of the management apparatus 200b instructs the updated software delivery unit 240 to recover the protection control module 120a.

After being instructed by the updated software delivery unit 240 to start updating, the detection modules 131a, 132a, 133a, 134a, and 135a perform mutual authentication with each other on a one-to-one basis. This prevents the device 100a from connecting to a malicious management apparatus and prevents the management apparatus 200b from connecting to a malicious device. Note that during mutual authentication, the updated software delivery unit 240 uses the signature private key and the signature public key, and the detection modules use the pair of authentication keys (authentication private key and authentication public key).

Figure 42:
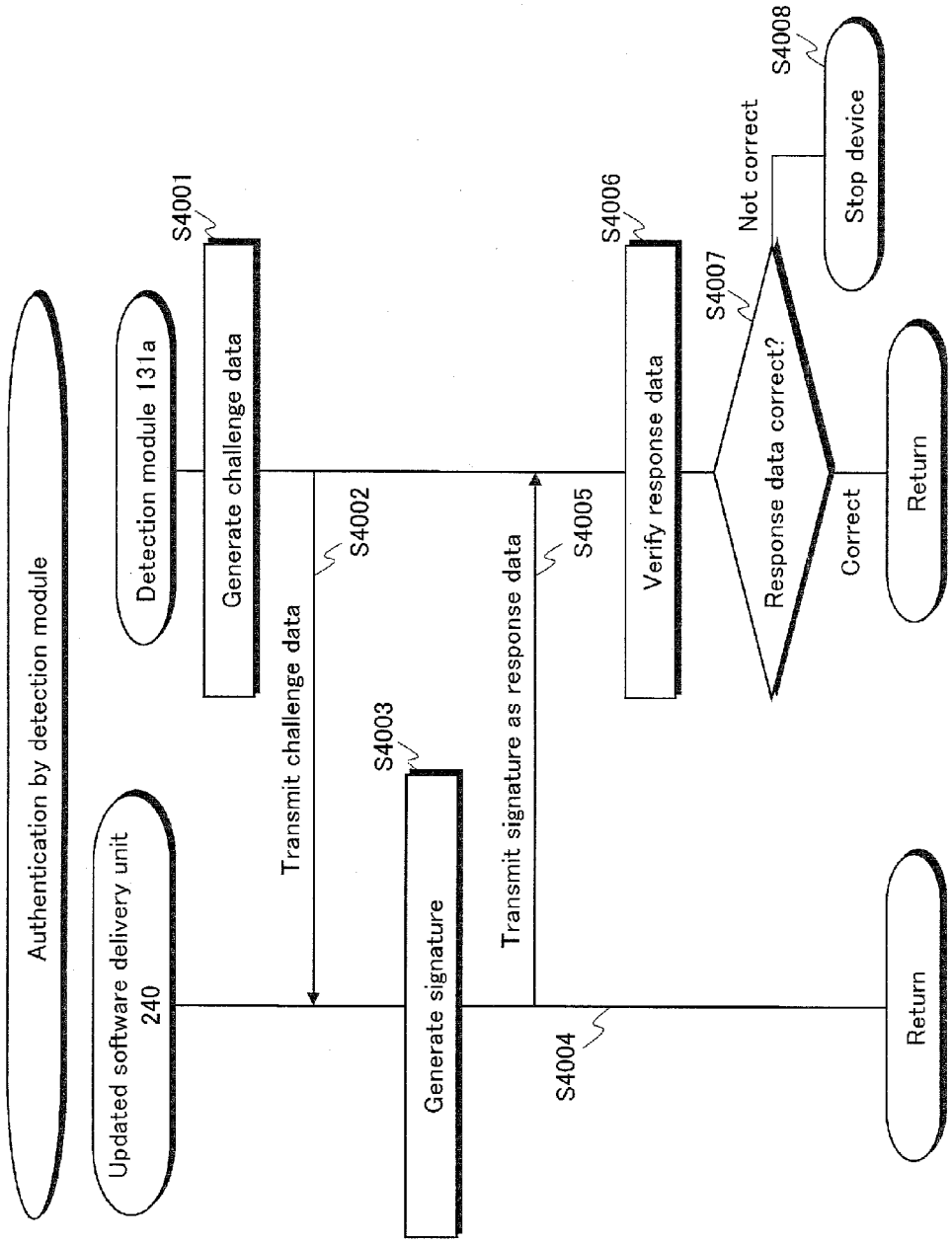
FIG. 42 is a sequence diagram showing mutual authentication, showing the sequence when the detection module 131a performs authentication on the updated software delivery unit 240.

FIG. 42 is a sequence diagram of when the detection module 131a performs authentication on the updated software delivery unit 240. Note that the detection modules 132a, 133a, 134a, and 135a also operate similarly to the detection module 131a in FIG. 42 to perform authentication on the updated software delivery unit 240.

The detection module 131a generates a random number (challenge data) using a random number generator (S4001) and transmits the generated challenge data to the updated software delivery unit 240 (S4002). Along with the challenge data, the detection module 131a also transmits a detection module identifier for identifying the detection module 131a. The updated software delivery unit 240 generates signature data for the received challenge data using the signature private key (S4003) and returns the generated signature data to the detection module 131a as response data (S4004).

The detection module 131a receives the response data from the updated software delivery unit 240 (S4005) and verifies whether the response data matches the signature data for the challenge data using the signature public key (S4006).

If verification indicates that the response data is correct, and therefore that the updated software delivery unit 240 is an authentic module (S4007: "Correct"), the detection module 131a continues processing. If verification indicates that the response data is not correct, and therefore that the updated software delivery unit 240 is not an authentic module (S4007: "Not correct"), the detection module 131a outputs an error and terminates processing (S4008).

Next, the updated software delivery unit 240 performs authentication on the detection modules 131a, 132a, 133a, 134a, and 135a.

Figure 43:
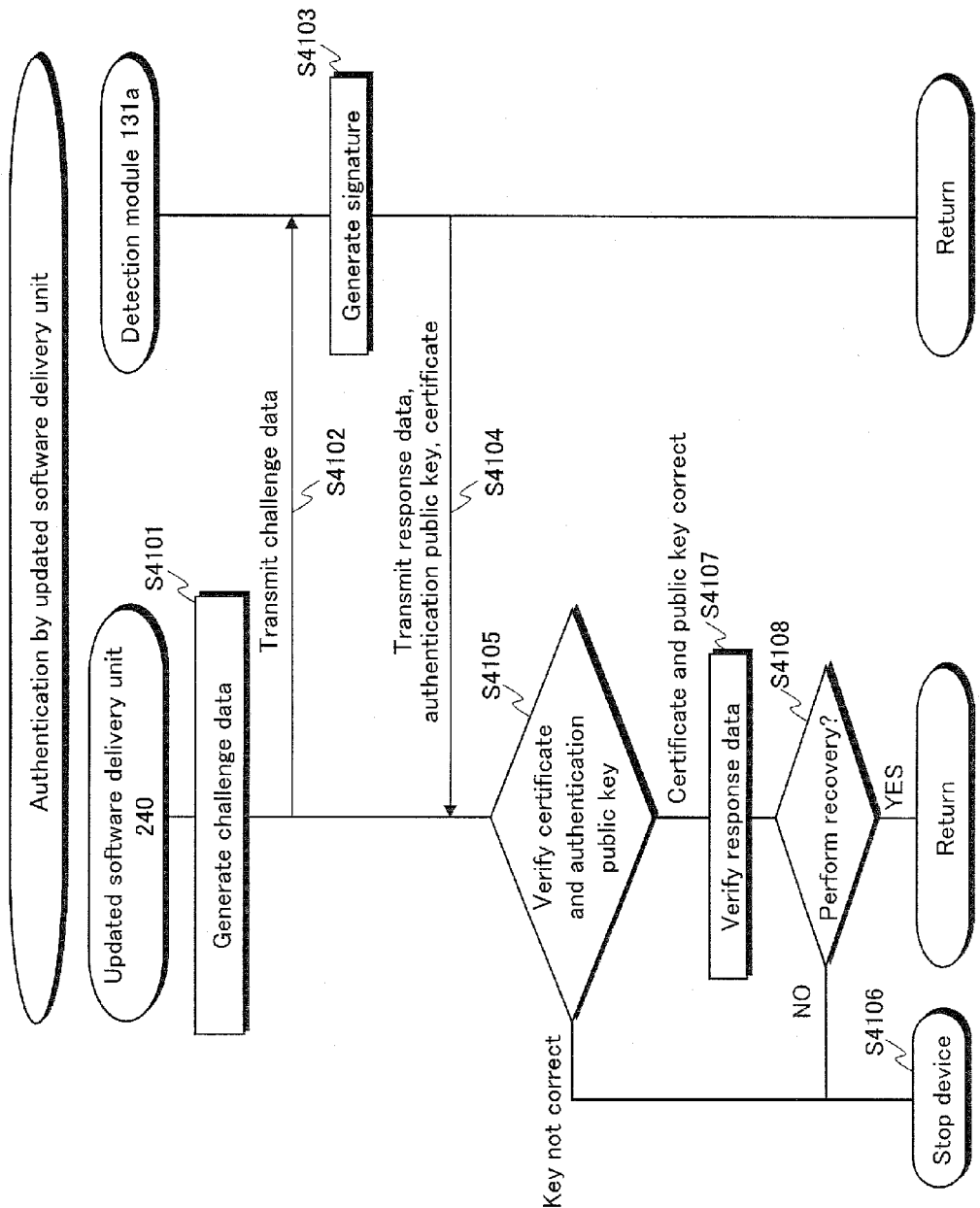
FIG. 43 is a sequence diagram showing mutual authentication, showing the sequence when the updated software delivery unit 240 performs authentication on each of the detection modules.

FIG. 43 is a sequence diagram of when the updated software delivery unit 240 performs authentication on the detection modules (as an example, on the detection module 131a).

Using the random number generator, the updated software delivery unit 240 generates a different random number (challenge data) for each of the detection modules that transmitted challenge data (S4101) and transmits each piece of challenge data to the corresponding detection module (S4102).

The detection modules generate signature data for the received challenge data using the authentication private key (S4103) and return the generated signature data to the updated software delivery unit 240 as response data (S4104).

Along with the response data, the detection modules also transmit the authentication public key and the authentication key certificate to the updated software delivery unit 240.

The updated software delivery unit 240 receives the response data, the authentication public key, and the authentication key certificate from each detection module (S4104). The updated software delivery unit 240 verifies whether each authentication key certificate is the certificate that the updated software delivery unit 240 itself issued and also verifies authenticity of the authentication public key using the authentication key certificate (S4105).

When the authentication key certificate and the authentication public key are not correct (S4105: "Key not correct"), the updated software delivery unit 240 terminates processing (S4106).

If the authentication key certificate and the authentication public key are correct (S4105: "Certificate and key correct"), the updated software delivery unit 240 verifies whether the received response data matches the signature data for the challenge data using the authentication public key (S4107).

Next, the updated software delivery unit 240 determines whether to perform recovery using the detection modules that return correct response data (i.e. authentic detection modules) (S4108). At this point, it is determined whether the number of detection modules that return correct response data (i.e. authentic detection modules) is at least a preset number necessary for recovery.

When recovery is not to be performed (S4108: NO), the updated software delivery unit 240 terminates processing (S4106). When recovery is to be performed (S4108: YES), mutual authentication concludes, and processing proceeds to recovery.

The updated software delivery unit 240 also creates an authentication list that lists detection module identifiers for all of the detection modules confirmed to be authentic during mutual authentication. During subsequent recovery, only the detection modules whose identifier is listed in the authentication list are used.

(6) Recovery Operations

Next, recovery (S500 in FIG. 38) is described in detail with reference to FIGS. 44 to 51. Recovery is processing to update the protection control module 120a that has been tampered with to a new, updated protection control module when the above described mutual authentication is successful.

Figure 44:
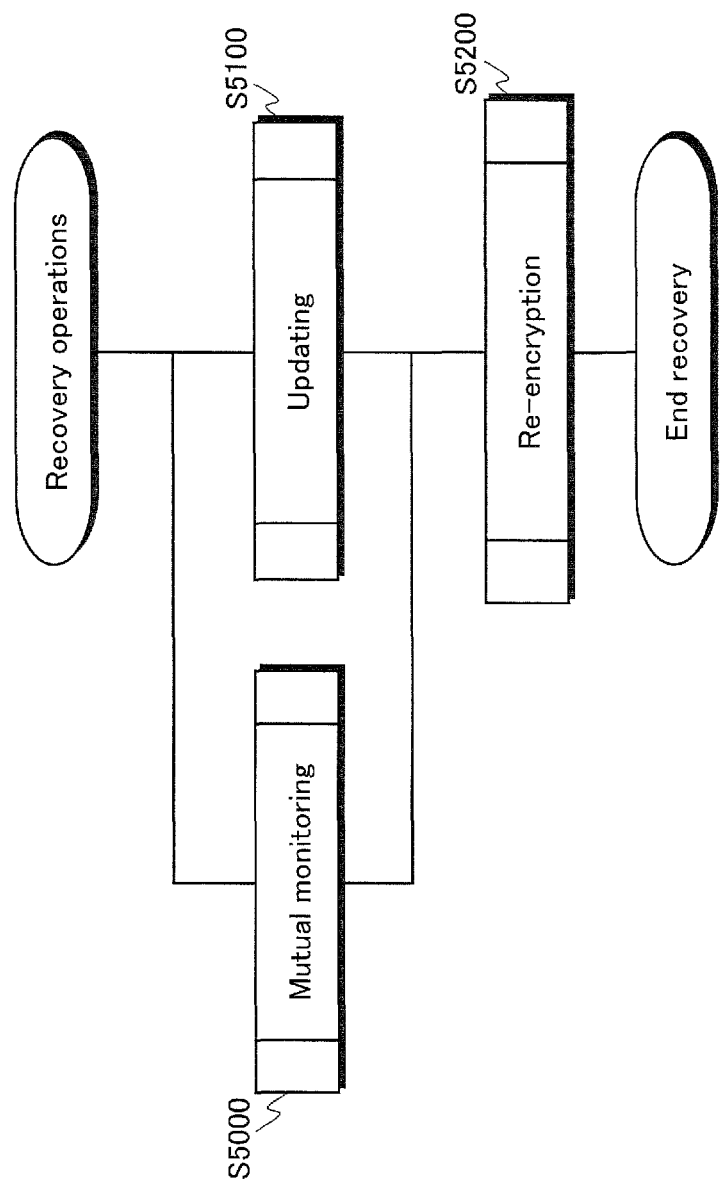
FIG. 44 is a flowchart showing recovery.

FIG. 44 is a flowchart showing recovery operations.

First, the detection modules 131a, 132a, 133a, 134a, and 135a perform mutual monitoring (S5000). During mutual monitoring, each detection module performs tampering detection on another detection module.

Furthermore, processing to update the protection control module 120a is performed using the updated protection control module (S5100).

Re-encryption processing to re-encrypt the encrypted applications 110 and 111 is then performed (S5200).

(a) Mutual Monitoring

Figure 45:
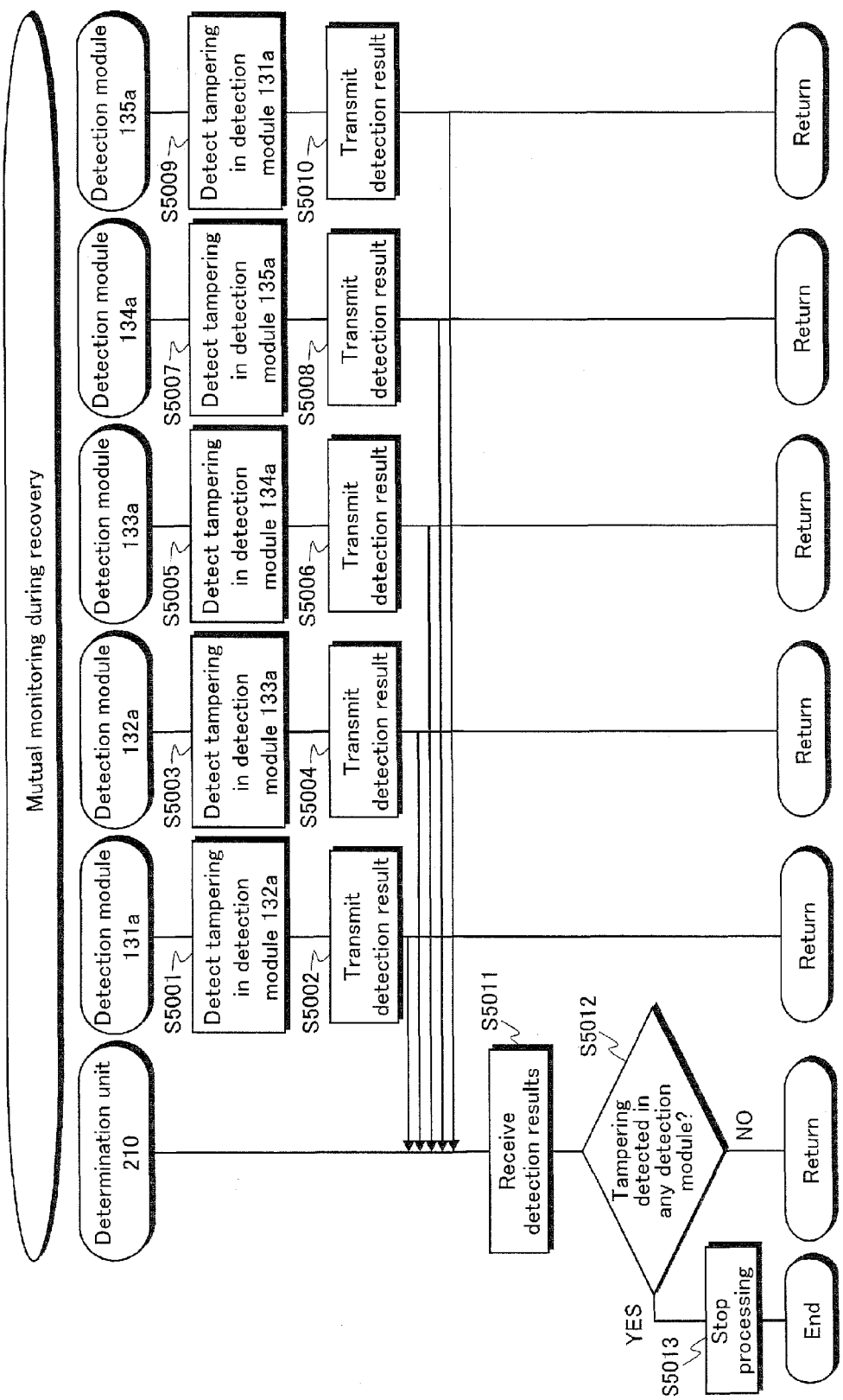
FIG. 45 is a sequence diagram showing recovery (mutual monitoring).
Figure 46:
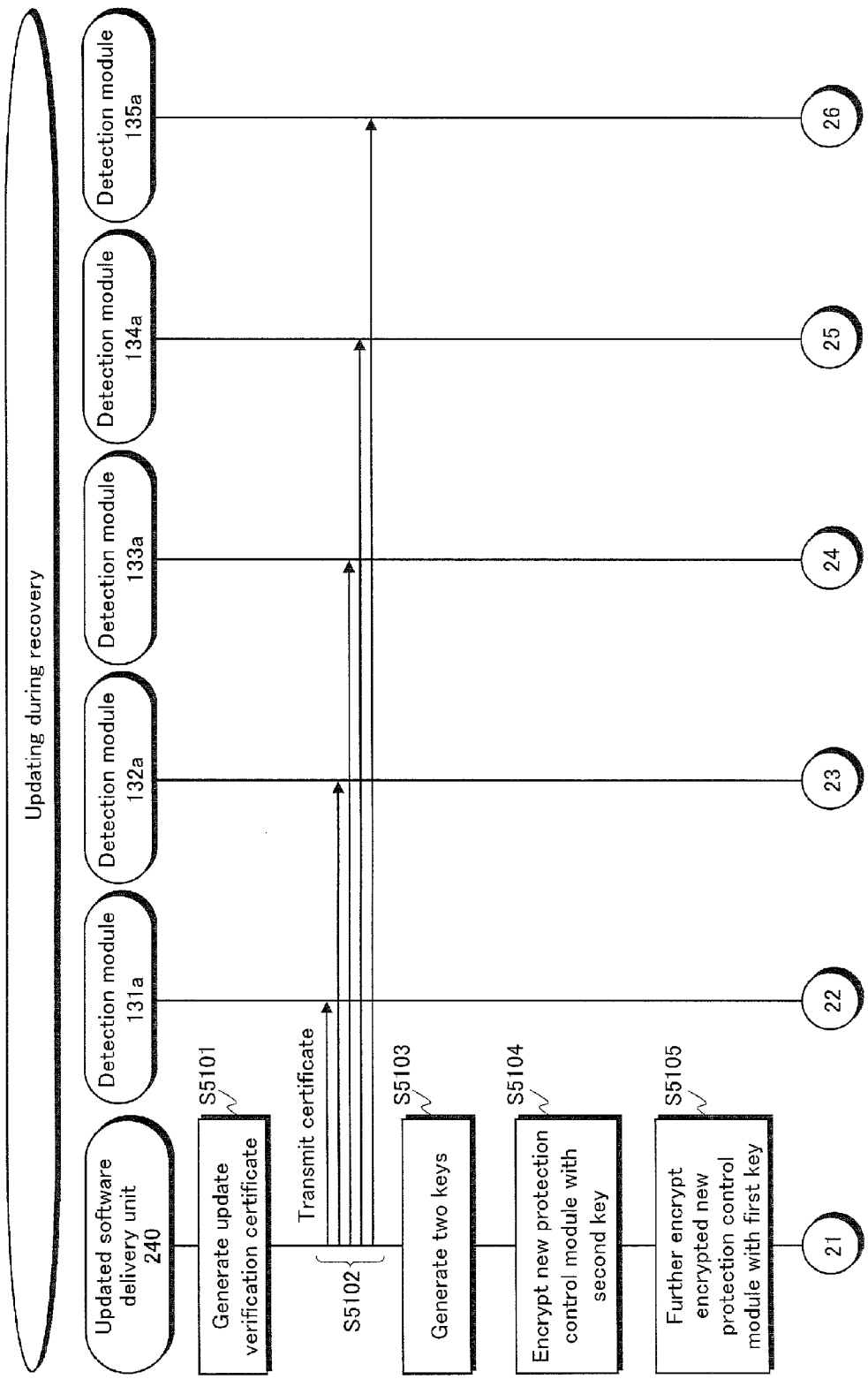
FIG. 46 is a sequence diagram showing recovery (updating) and is continued in FIG. 47.
Figure 47:
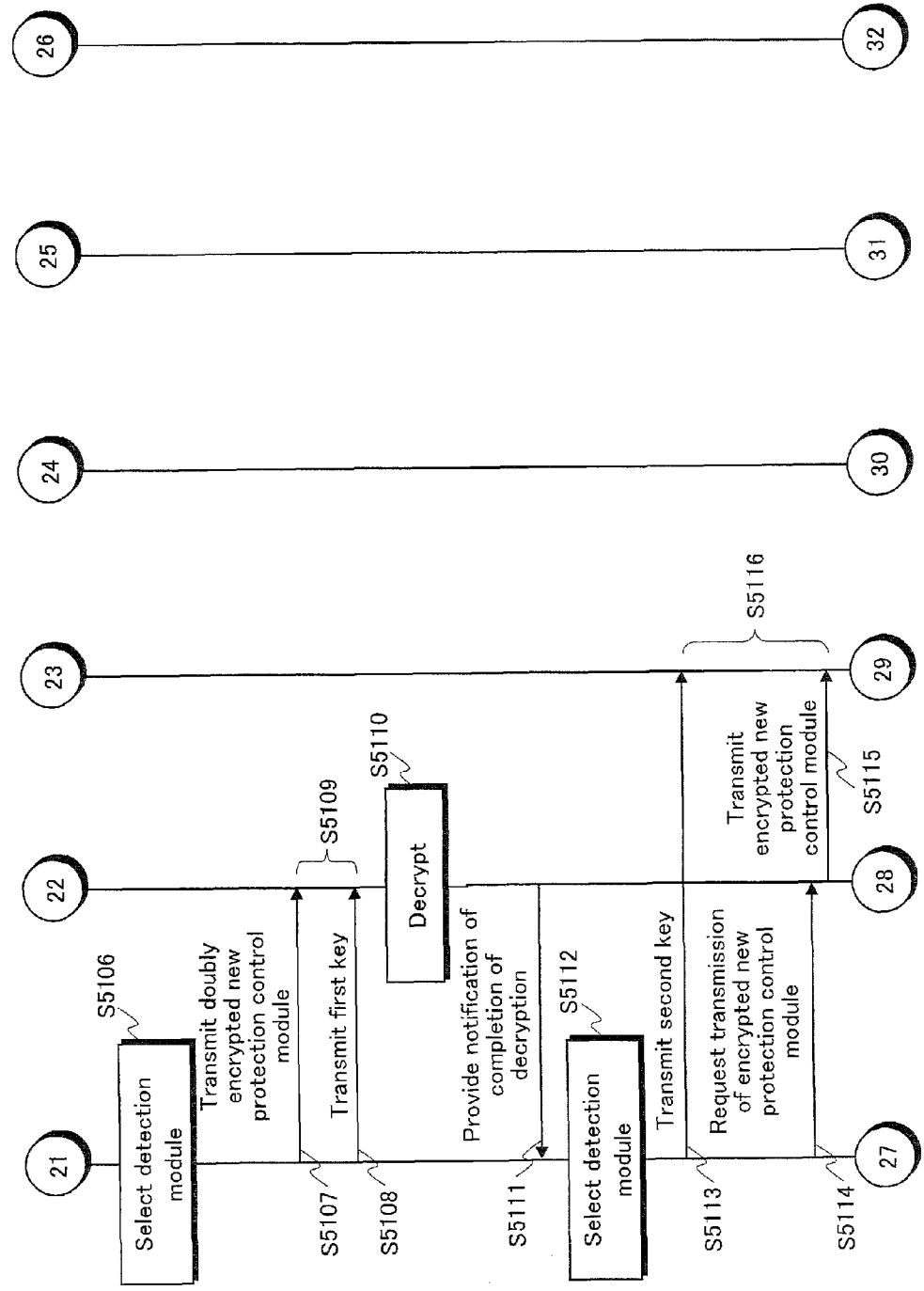
FIG. 47 is a sequence diagram showing recovery (updating) and is continued in FIG. 48.
Figure 48:
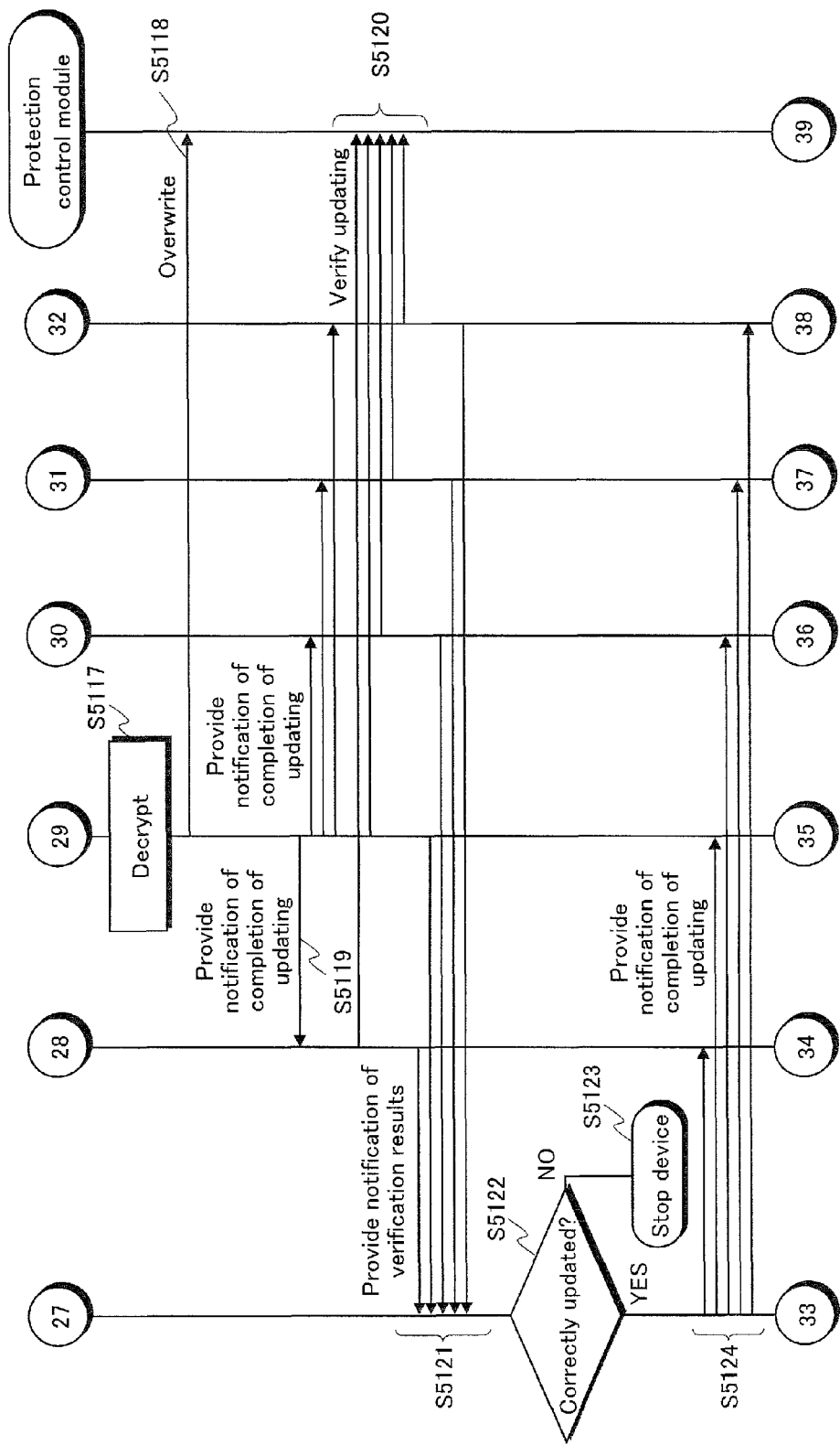
FIG. 48 is a sequence diagram showing recovery (updating) and is continued in FIG. 49.
Figure 49:
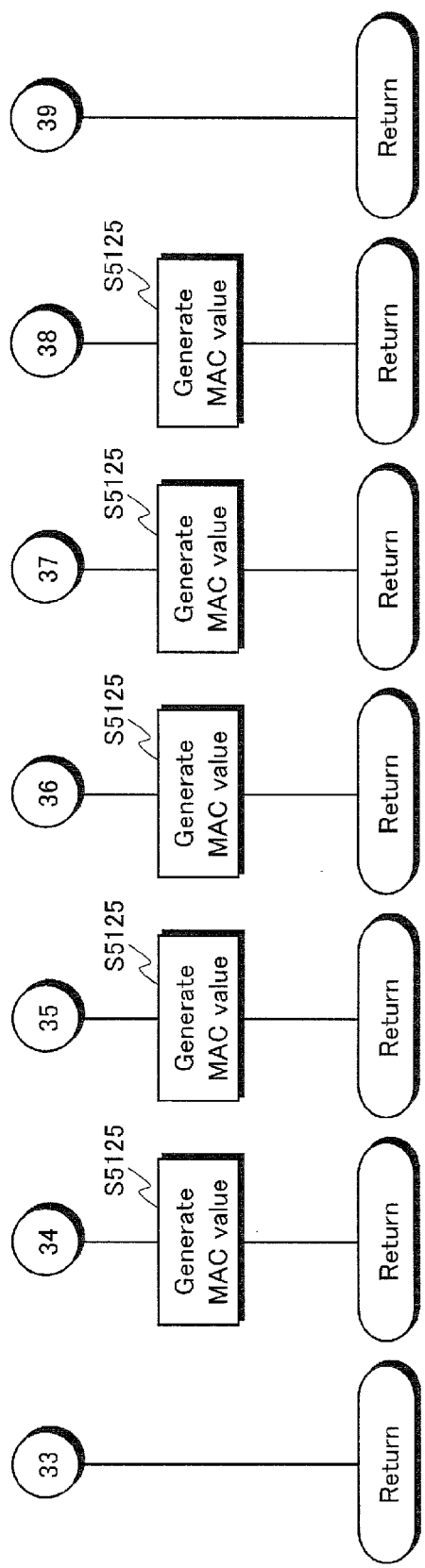
FIG. 49 is a sequence diagram showing recovery (updating) and is continued from FIG. 48.

Next, mutual monitoring (S5000 in FIG. 44) is described in detail with reference to the sequence diagram in FIG. 45.

During mutual monitoring, the detection modules 131a, 132a, 133a, 134a, and 135a perform tampering detection on another detection module in the detection module group 130a. The detection module on which to perform tampering detection during mutual monitoring is indicated in the monitoring pattern stored by each detection module. The monitoring pattern lists information for the module that is the target of tampering detection (a module identifier, a location in memory, a size, an address, a file name, etc.).

The monitoring pattern for mutual monitoring is a cyclic monitoring pattern. In the cyclic monitoring pattern in this example, the detection module 131a verifies the detection module 132a, the detection module 132a verifies the detection module 133a, the detection module 133a verifies the detection module 134a, the detection module 134a verifies the detection module 135a, and the detection module 135a verifies the detection module 131a.

The detection module 131a performs tampering detection on the detection module 132a (S5001) and transmits the tampering detection result to the determination unit 210 (S5002).

The detection module 132a performs tampering detection on the detection module 133a (S5003) and transmits the tampering detection result to the determination unit 210 (S5004).

The detection module 133a performs tampering detection on the detection module 134a (S5005) and transmits the tampering detection result to the determination unit 210 (S5006).

The detection module 134a performs tampering detection on the detection module 135a (S5007) and transmits the tampering detection result to the determination unit 210 (S5008).

The detection module 135a performs tampering detection on the detection module 131a (S5009) and transmits the tampering detection result to the determination unit 210 (S5010).

The determination unit 210 receives the tampering detection results from the detection modules (S5011). The determination unit 210 then determines whether tampering was detected in any of the detection modules (S5012). If tampering was detected in a detection module (S5012: YES), then the determination unit 210 terminates recovery processing (S5013). If tampering was not detected in any detection module (S5012: NO), all of the detection modules are identified as normal detection modules that have not been tampered with, and processing continues.

With the above cyclic monitoring pattern, when all of the tampering detection results from mutual monitoring between the detection modules indicate "No tampering (normal)", all of the detection modules can be identified as normal simultaneously. Mutual monitoring is thus performed efficiently.

(b) Updating

Next, updating (S5100 in FIG. 44) is described in detail with reference to the sequence diagrams in FIGS. 46 to 49.

First, the certificate generation unit 908 of the updated software delivery unit 240 generates an update verification certificate using the signature private key (S5101). The update verification certificate is for the detection modules 131a, 132a, 133a, 134a, and 135a to confirm whether the new protection control module has been installed correctly. The updated software delivery unit 240 transmits the generated certificate to the detection modules (S5102).

Next, the encryption key generation unit 905 in the updated software delivery unit 240 generates two encryption keys (a first key and a second key) for doubly encrypting the new protection control module (S5103). The encryption unit 906 encrypts the new protection control module using the second key, thus generating an encrypted new protection control module (S5104). The encryption unit 906 then further encrypts the encrypted new protection control module using the first key, thus generating a doubly encrypted new protection control module (S5105).

The updated software delivery unit 240 selects one of the detection modules in the detection module group 130*a* (S5106) and notifies the determination unit 210 of the identifier of the selected detection module. In this example, the detection module 131*a* is selected.

The updated software delivery unit 240 transmits the doubly encrypted new protection control module (S5107) and the first key (S5108) to the selected detection module 131*a*.

The detection module 131*a* receives the doubly encrypted new protection control module and the first key (S5109). The detection module 131*a* decrypts the doubly encrypted new protection control module using the first key, thus acquiring the encrypted new protection control module (S5110). The detection module 131*a* then notifies the updated software delivery unit 240 that decryption is complete (S5111).

Upon receiving the notification of completion of decryption, the updated software delivery unit 240 selects a detection module from the detection module group 130*a* that differs from the detection module 131*a* selected in step S5106 (S5112). In this example, the detection module 132*a* is selected.

The updated software delivery unit 240 transmits the second key to the selected detection module 132*a* (S5113). The updated software delivery unit 240 also issues a request to the detection module 131*a* to transmit the encrypted new protection control module acquired in step S5110 to the detection module 132*a* (S5114).

The detection module 131*a* receives the request from the updated software delivery unit 240 and transmits the encrypted new protection control module to the detection module 132*a* (S5115).

The detection module 132*a* receives the second key from the updated software delivery unit 240 and receives the encrypted new protection control module from the detection module 131*a* (S5116). The detection module 132*a* then decrypts the encrypted new protection control module using the second key, thus acquiring the new protection control module (S5117).

The detection module 132*a* overwrites the protection control module 120*a* with the new protection control module acquired in step S5117, thereby updating the protection control module 120*a* (S5118). The detection module 132*a* then transmits a notification of completion of updating to the other detection modules (S5119).

Next, the detection modules 131*a*, 132*a*, 133*a*, 134*a*, and 135*a* verify whether the protection control module has been correctly updated, using the already received update verification certificate (S5120). Furthermore, the detection modules notify the updated software delivery unit 240 of the verification results (S5121).

The updated software delivery unit 240 receives the verification results transmitted from the detection modules (S5121). The updated software delivery unit 240 then determines whether the protection control module has been correctly updated (S5122). When updating is determined not to have been performed correctly (S5122: NO), the updated software delivery unit 240 stops the device 100 (S5123).

When updating is determined to have been performed correctly (S5122: YES), the updated software delivery unit 240 notifies the detection modules of completion of updating (S5124).

Upon receiving the notification of completion of updating (S5124), the detection modules generate a MAC value for the new protection control module and write the generated MAC value in combination with the identifier of the protection control module in the MAC value table (S5125).

As explained above, during updating the updated software delivery unit 240 doubly encrypts the new protection control module for updating with a plurality of keys before transmission to the detection module group 130*a*. The detection module group 130*a* updates the protection control module 120*a* with the received new protection control module.

During this process, the updated software delivery unit 240 controls the timing at which the plurality of keys for decrypting the doubly encrypted new protection control module is transmitted to the detection module group 130*a*, making it difficult for an attacker to acquire the non-encrypted new protection control module.

(c) Relationship Between Mutual Monitoring and Updating

The above-described mutual monitoring and updating are performed in coordination with each other.

Mutual monitoring is performed periodically during two time periods: a first time period when the updated software delivery unit 240 transmits the plurality of keys (the first key and the second key) to detection modules included in the detection module group 130*a*, and a second time period when detection modules included in the detection module group 130*a* decrypt the doubly encrypted new protection control module and the encrypted new protection control module.

The time intervals at which mutual monitoring is performed periodically are, for example, shorter intervals than the time necessary for the new protection control module used for updating to traverse the transmission channel and be completely transmitted from the management apparatus 200*b* to the device 100*a*. For example, if transmission requires one second to complete, monitoring is performed at a shorter interval, such as 500 milliseconds.

Figure 50:
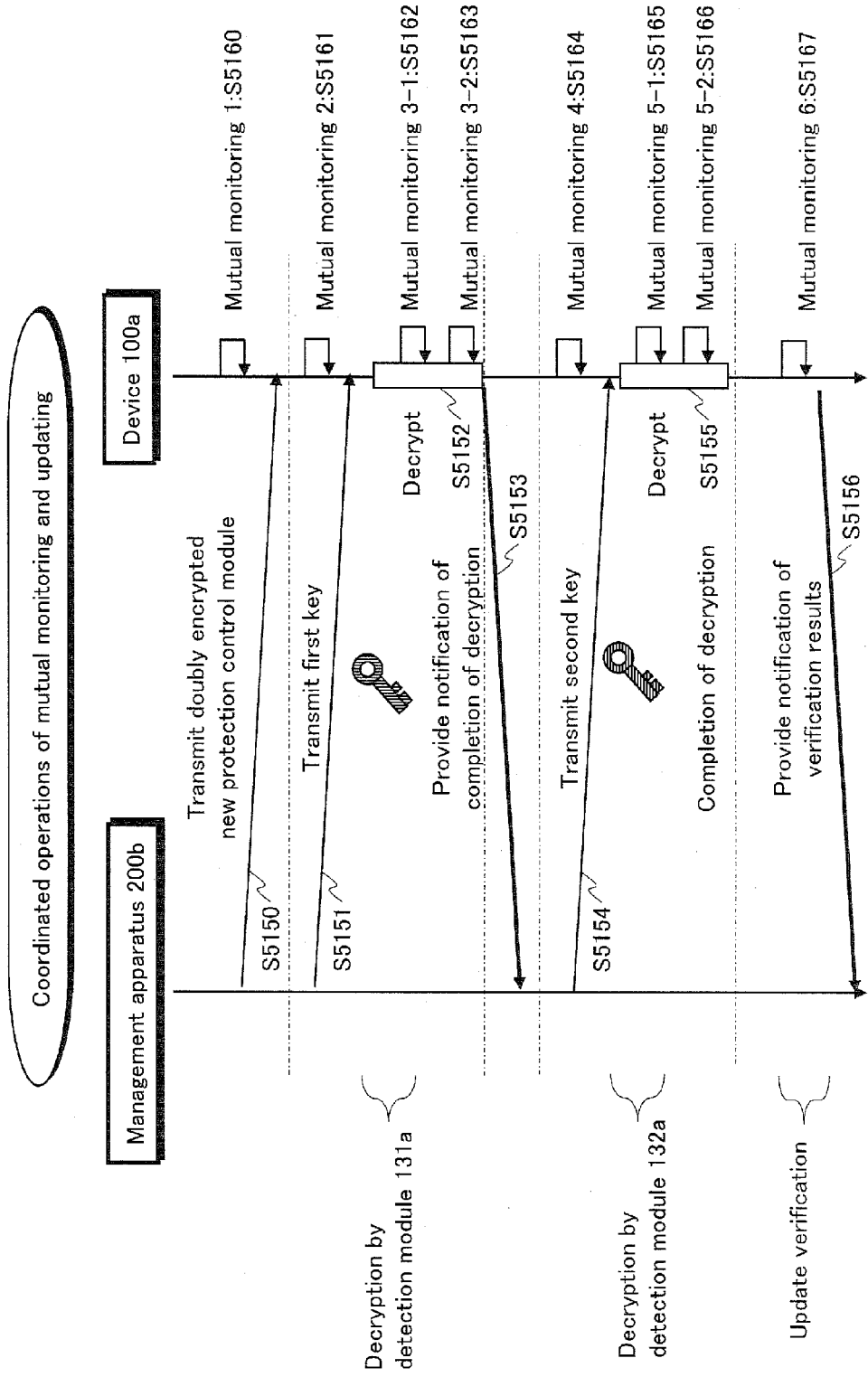
FIG. 50 illustrates coordinated operations of mutual monitoring and updating in Embodiment 3 of the present invention.

The coordinated operations of mutual monitoring and updating are now described with reference to FIG. 50.

First, the device 100*a* performs mutual monitoring (mutual monitoring 1 (S5160)) before the doubly encrypted new protection control module is transmitted from the management apparatus 200*b* (before step S5150). This is so as not to select an abnormal detection module that has been tampered with as the detection module for performing the update.

Subsequently, the device 100*a* performs mutual monitoring (mutual monitoring 2 (S5161)) before the detection module 131*a* receives the first key transmitted by the management apparatus 200*b* (before step S5151), thus confirming that an abnormal detection module has not been selected before the device 100*a* receives the first key.

Furthermore, after the detection module 131*a* receives the first key (S5151), while the detection module 131*a* decrypts the doubly encrypted new protection control module using the first key (S5152), decryption is periodically suspended for mutual monitoring (mutual monitoring 3-1 (S5162), 3-2 (S5163)). Therefore, even if the detection modules 131*a*, 132*a*, 133*a*, 134*a*, and 135*a* are attacked during decryption, the attack is detected in time to prevent the entire encrypted new protection control module from being divulged.

Subsequent processing is the same as above. Specifically, the device 100*a* performs mutual monitoring (mutual monitoring 4 (S5164)) before the detection module 132*a* receives the second key transmitted by the management apparatus 200*b* (before step S5154), thus confirming that an abnormal detection module has not been selected during updating before the device 100*a* receives the second key.

Furthermore, after the detection module 132*a* receives the second key (S5154), while the detection module 132*a* decrypts the encrypted new protection control module using the second key (S5155), decryption is periodically suspended for mutual monitoring (mutual monitoring 5-1 (S5165), 5-2 (S5166)). Mutual monitoring is then performed one last time (mutual monitoring 6 (S5167)). Subsequently, each detection module transmits the verification results to the updated software delivery unit 240 (S5156).

Therefore, an attack on the detection modules is detected in time to prevent the entire new protection control module from being divulged.

If tampering is detected in one of the detection modules during mutual monitoring, recovery processing is terminated. This allows the management apparatus 200*b* to suspend transmission of the first key or the second key, thereby making it impossible for an attacker to acquire the keys for decrypting the doubly encrypted new protection control module.

(d) Re-Encryption

Figure 51:
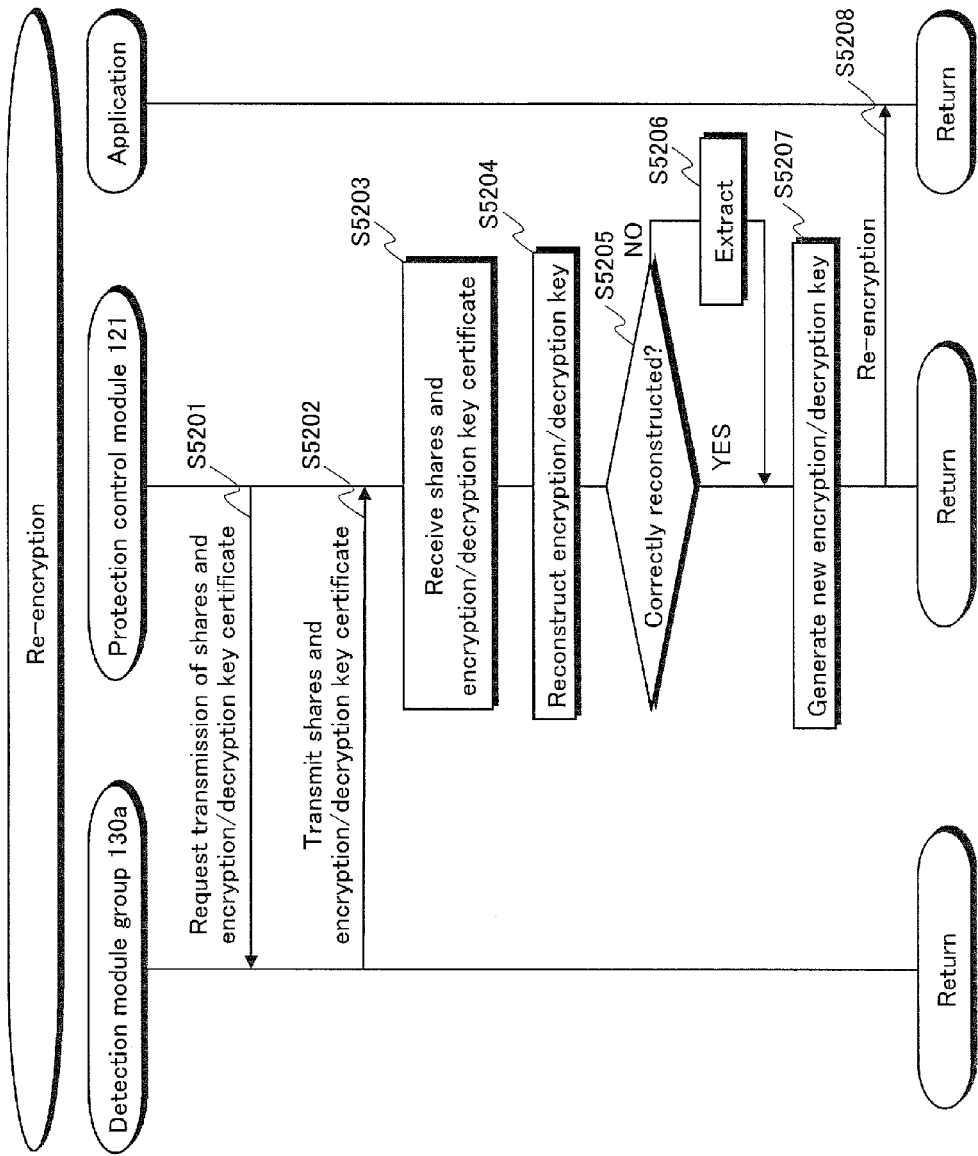
FIG. 51 is a sequence diagram showing recovery (re-encryption).

Next, re-encryption (S5200 in FIG. 44) is described in detail with reference to the sequence diagram in FIG. 51.

In this description, the detection modules 131*a*, 132*a*, 133*a*, 134*a*, and 135*a* are collectively referred to as the detection module group 130*a*.

First, the updated protection control module (referred to in the description of FIG. 51 as the "protection control module 121" to distinguish from the protection control module 120*a* before updating) issues a request to the detection modules 131*a*, 132*a*, 133*a*, 134*a*, and 135*a* to transmit the shares and the encryption/decryption key certificate stored by each detection module (S5201).

Upon receiving the request from the protection control module 121, the detection modules 131*a*, 132*a*, 133*a*, 134*a*, and 135*a* transmit the shares and the encryption/decryption key certificates (S5202).

The protection control module 121 receives the shares and the encryption/decryption key certificates from the detection modules 131*a*, 132*a*, 133*a*, 134*a*, and 135*a* (S5203) and, from the received shares, reconstructs the encryption/decryption key (referred to here as the "old encryption/decryption key") used by the protection control module 120 before updating (S5204). The protection control module 121 also refers to the encryption/decryption key certificates to verify whether the old encryption/decryption key was correctly reconstructed (S5205).

If the old encryption/decryption key was not correctly reconstructed (S5205: NO), the protection control module 121 extracts the abnormal detection module (or in other words, identifies the detection module that transmitted a malicious share) (S5206). The management apparatus 200*b* is notified of the identified abnormal detection module.

If the old encryption/decryption key was correctly reconstructed (S5205: YES), the encryption/decryption key generation unit 311 in the protection control module 121 generates a new encryption/decryption key (S5207). The decryption loading unit 304 decrypts the encrypted applications (110, 111) with the old encryption/decryption key and then re-encrypts the applications (110, 111) with the new encryption/decryption key (S5208).

Pages 50 to 52 of Patent Literature 2 contain a detailed description of both the method of reconstructing the old encryption/decryption key from the shares, as well as the method of identifying the abnormal detection module. In order to employ the same method as in Patent Literature 2, the encryption/decryption key in Embodiment 3 can be made to correspond to the private key d, the protection control module 121 to the authentication authority device, and the detection modules 131*a*, 132*a*, 133*a*, 134*a*, and 135*a* to the share storing devices in Patent Literature 2.

Furthermore, the method of identifying the abnormal detection module in step S5206 may adopt the detection between detection modules in Embodiment 1.

(7) Next Round Preparation Operations

Figure 52:
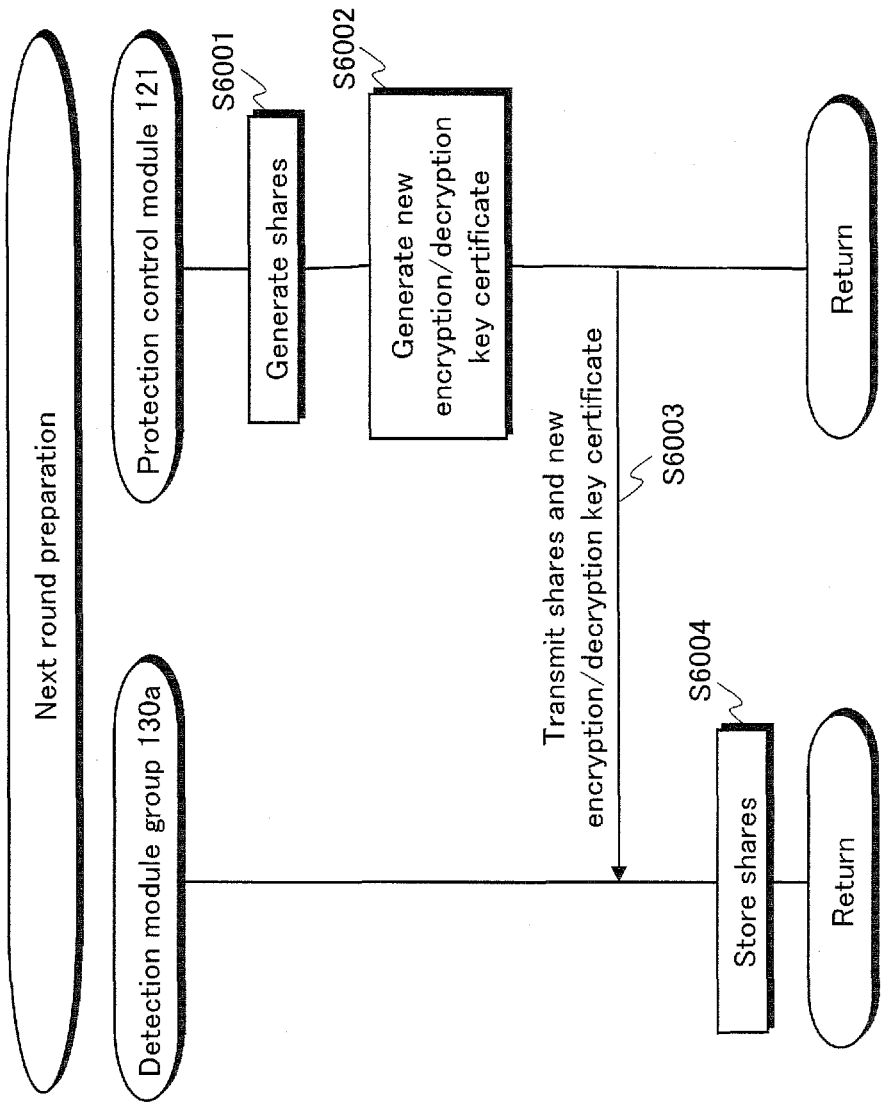
FIG. 52 is a sequence diagram showing next round preparation.

Next round preparation (S600 in FIG. 38) is described next in detail with reference to the sequence diagram in FIG. 52. During next round preparation, preparations are made for the next recovery after completion of the present recovery (S500 in FIG. 38). The following describes an example.

First, the protection control module 121 generates shares from the new encryption/decryption key using the secret sharing scheme (S6001) and generates a new encryption/decryption key certificate using the signature private key (S6002). The protection control module 121 transmits the generated shares and encryption/decryption key certificate to the detection modules 131*a*, 132*a*, 133*a*, 134*a*, and 135*a* (S6003).

As during initialization, the same number of shares as the number of detection modules is generated, and shares are transmitted so that each detection module stores a different pair of shares. The same new encryption/decryption key certificate is transmitted to the detection modules 131*a*, 132*a*, 133*a*, 134*a*, and 135*a*.

Each of the detection modules 131*a*, 132*a*, 133*a*, 134*a*, and 135*a* receives the shares and the new encryption/decryption key certificate from the protection control module 121 and stores the received shares and new encryption/decryption key certificate in the share storage unit 409 (S6004).

With the above Embodiment, when tampering is detected in the protection control module 120*a*, the protection control module that has been tampered with is updated to a new protection control module, thus improving safety in the system.

(Other Modifications)

While the present invention has been described based on the above Embodiments, the present invention is of course not limited to these Embodiments.

The present invention also includes cases such as the following.

(1) In the above Embodiments, the number of detection modules is five, but the number is not limited in this way and may be any number equal to or greater than two.

(2) During detection in the above Embodiments, protection control module detection and detection between detection modules may be performed a number of times.

(3) During verification of detection between detection modules in the above Embodiments, when the stored detection results list 6051 is as shown in FIG. 22, and when a detection result of "No tampering" for the detection module 134 is received from the detection module 135, the detection results are determined to be contradictory. The detection results may also be determined to be contradictory in the following case.

Figure 53:
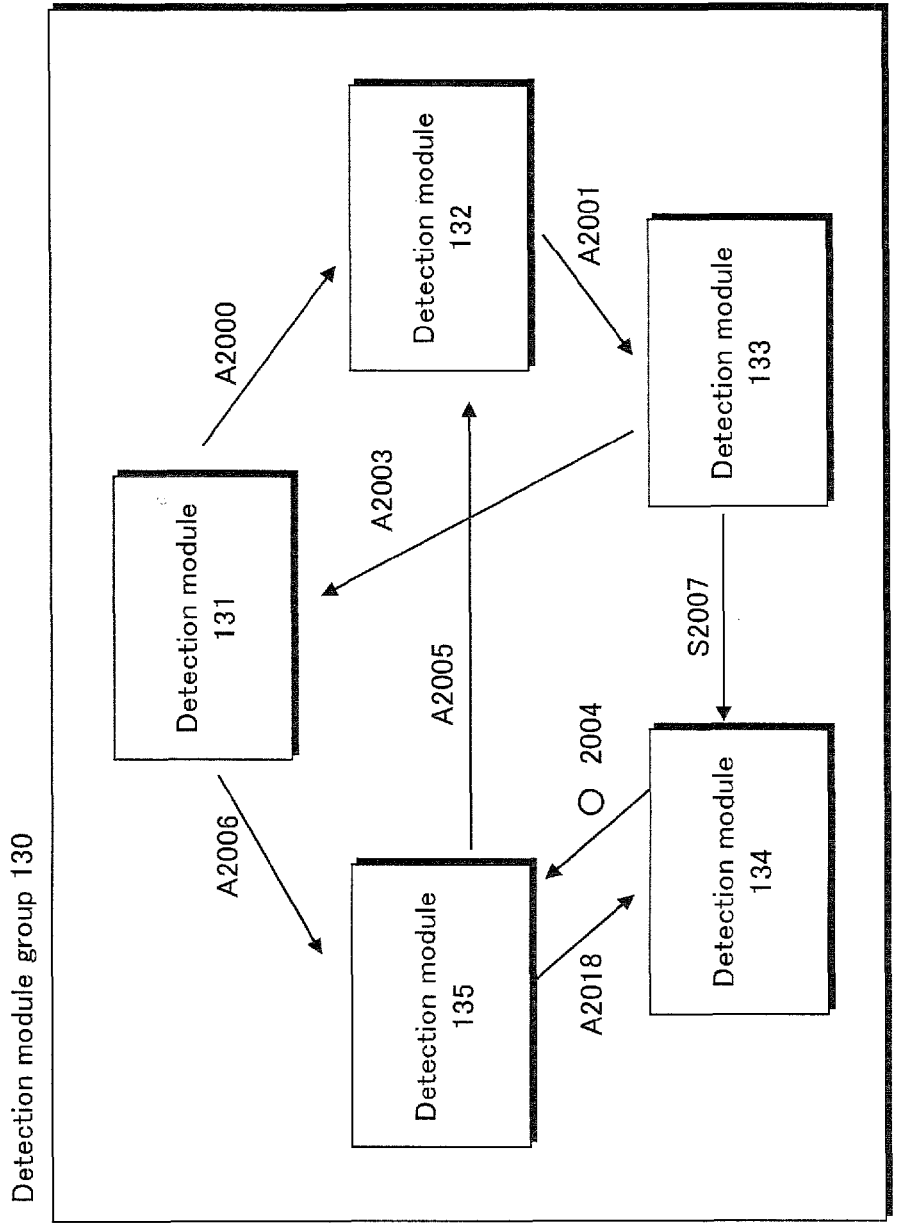
FIG. 53 illustrates a detection result in the detection module group 130.

The detection results list 6051 shown in FIG. 22 indicates that upon performing tampering detection on the detection module 135, the detection module 134 detected tampering in the detection module 135. Subsequently, after the detection module 134 performs tampering detection on the detection module 135, the determination unit 210 receives the detection result. FIG. 53 shows a detection result when the detection module 134 performs tampering detection again on the detection module 135. The detection result shown in FIG. 53 indicates that upon performing tampering detection on the detection module 135, the detection module 134 detects no tampering in the detection module 135. At this point, the tampering results from the detection module 134 are contradictory, since the determination unit 210 has stored in the detection results list 6051a detection result in which the detection module 134 detected tampering in the detection module 135 upon performing tampering detection. In other words, when the source monitoring module and the target monitoring module remain the same, the tampering detection results are determined to be contradictory if the previous tampering detection result indicates tampering, and the newly received tampering detection result indicates no tampering.

(4) In the monitoring pattern for normal module identification in Embodiment 2, the detection module 131 verifies the detection module 132, the detection module 132 verifies the detection module 133, the detection module 133 verifies the detection module 134, and the detection module 134 verifies the detection module 131. However, the monitoring pattern is not limited in this way, as long as tampering detection is performed in a unidirectional cycle.

(5) During identification in Embodiment 2, when there is no contradiction in the detection results in step S2403 of FIG. 32, the device is stopped, but the present invention is not limited in this way. Detection between detection modules may be performed. During such detection between detection modules, the monitoring pattern may be updated.

(6) In Embodiment 3, the detection modules may be update modules provided with a function to update other modules. During such updating, a detection module receives an updated module from the management apparatus and updates a module within the device. The module to be updated may be the protection control module, another detection module, or an application. This makes it possible to update a module in the device that is tampered with, thus improving reliability of the device.

(7) The following structure may be adopted.

Figure 54:
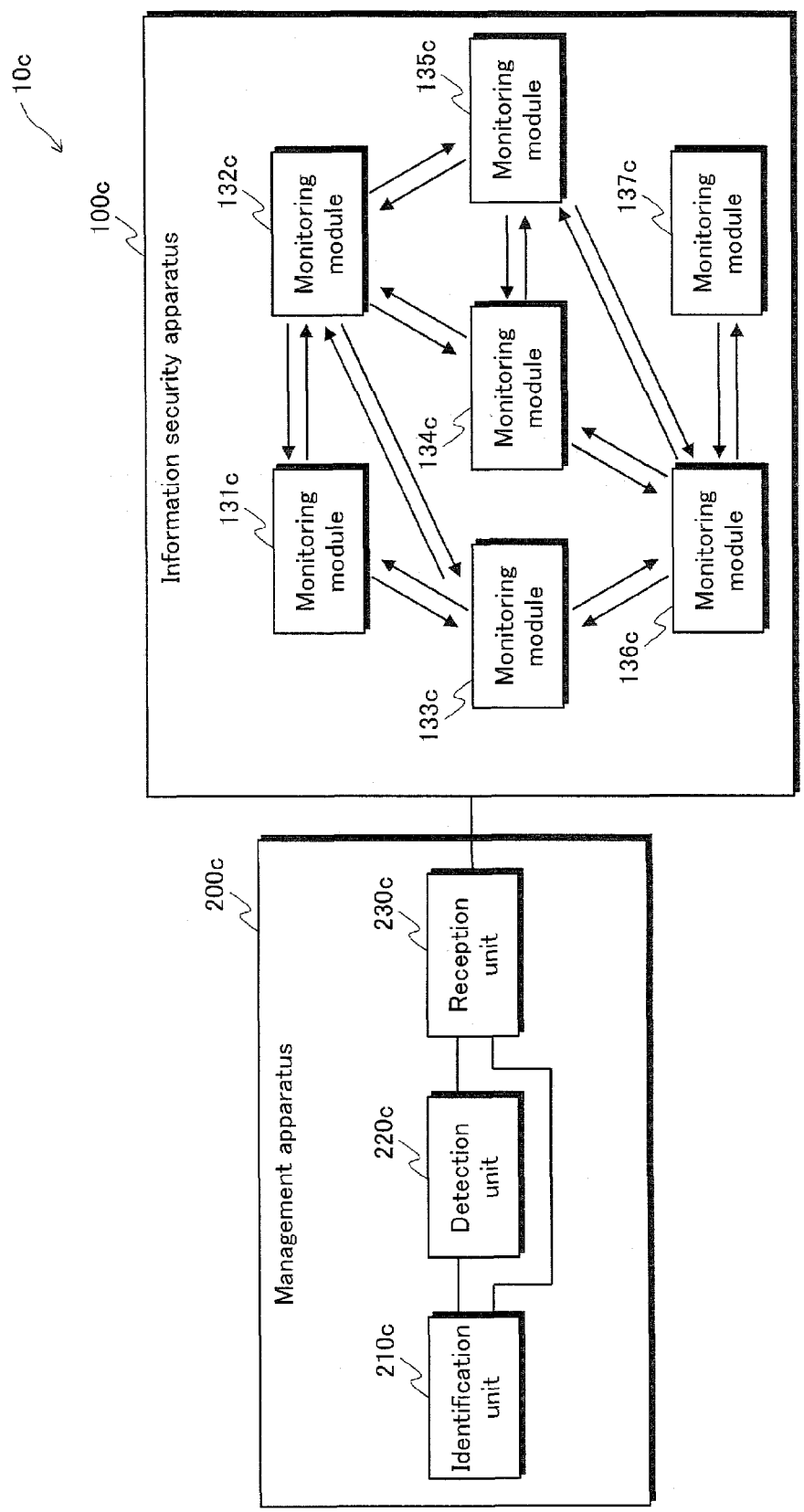
FIG. 54 is a block diagram showing a structure of a tampering monitoring system 10c as a modification of the present invention.

(a) As shown in FIG. 54, a tampering monitoring system 10c according to another Modification of the present invention includes a management apparatus 200c and an information security apparatus 100c.

The information security apparatus 100c has a plurality of monitoring modules 131c, 132c, . . . , 137c. The monitoring modules 131c, 132c, . . . , 137c each monitor for tampering in one or more of the other monitoring modules.

The management apparatus 200c manages the information security apparatus 100c. As shown in FIG. 54, the management apparatus 200c is provided with a reception unit 230c, a detection unit 220c, and an identification unit 210c.

The reception unit 230c receives, from the information security apparatus 100c, monitoring results generated by the monitoring modules each monitoring one or more of the other monitoring modules.

The detection unit 220c detects an abnormality by referring to a portion of the received monitoring results.

When an abnormality is detected, the identification unit 210c identifies a monitoring module that has been tampered with from among monitoring modules including (i) a monitoring module that generates the monitoring result related to the detected abnormality, and (ii) one or more monitoring modules identified by tracing back through a chain of monitoring modules consecutively starting from the monitoring module that generates the monitoring result related to the detected abnormality.

In this Modification, the tampering monitoring system 10c corresponds to the detection system, the management apparatus 200c to the management apparatus, the information security apparatus 100c to the device, and the monitoring modules to the detection modules stored by the device in the above Embodiments and Modifications.

Figure 55:
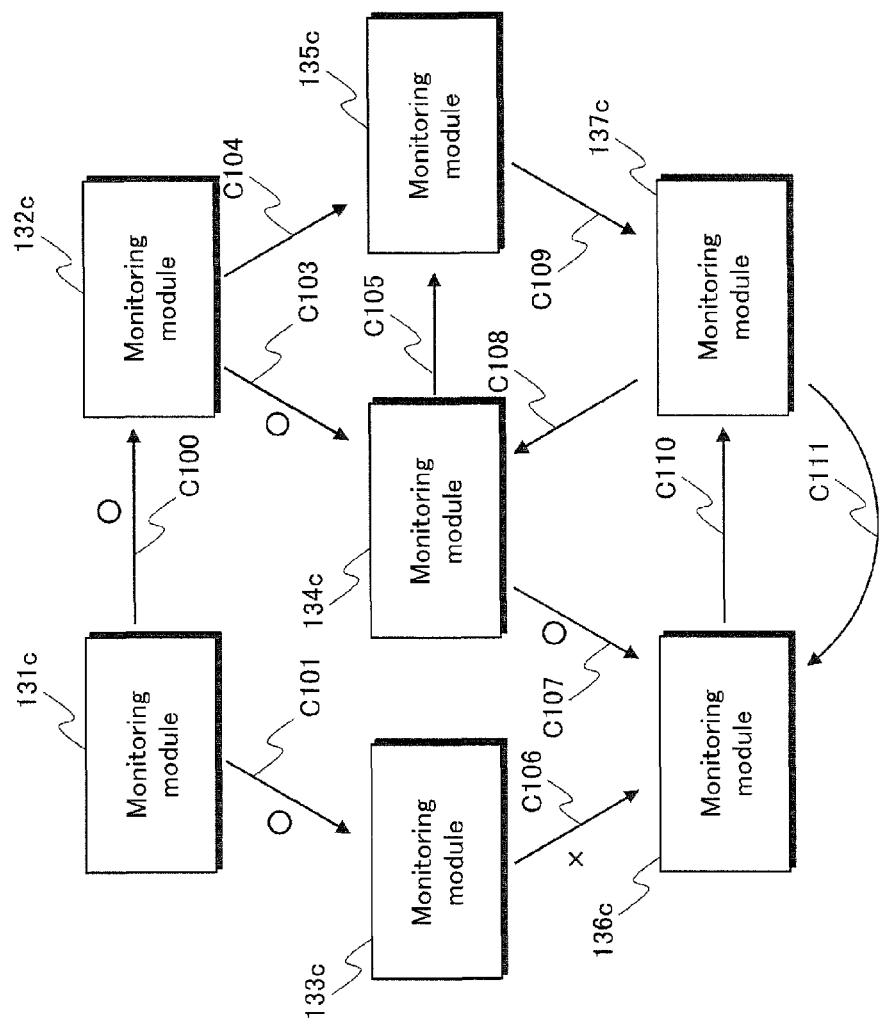
FIG. 55 shows an example of monitoring results received from an information security apparatus 100c.

(b) FIG. 55 shows an example of monitoring results received from the information security apparatus 100c by the reception unit 230c in the management apparatus 200c.

As described above, the monitoring modules 131c, 132c, . . . , 137c monitor other monitoring modules at a certain point. The concept of a "certain point" refers not only to a particular moment in time, but also encompasses a period of time during which it is assumed that the monitoring modules will not be tampered with. For example, the period of time may be one second, ten seconds, one minute, or one hour. The period of time may be even longer. The monitoring modules each transmit the monitoring results indicating whether the monitoring modules that are the target of monitoring have been tampered with, transmitting the results to the management apparatus 200c via the information security apparatus 100c.

In this description, identification of the module that has been tampered with operates under the following assumptions.

During the time period from the start of monitoring by a detection module (or monitoring module) until all of the monitoring results are acquired, the modules do not change. In other words, the modules are assumed not to be tampered with during this time period. This is because if the modules are tampered with during this time period, it would be difficult to identify which module has been tampered with.

Furthermore, it is assumed that at no time are all of the detection modules (or monitoring modules) tampered with. This is because if all of the detection modules (or monitoring modules) are tampered with, it would be difficult to identify which module has been tampered with.

As shown in FIG. 55, the monitoring result C100 by the monitoring module 131c for the monitoring module 132c indicates that the monitoring module 132c has not been tampered with, the monitoring result C103 by the monitoring module 132c for the monitoring module 134c indicates that the monitoring module 134c has not been tampered with, the monitoring result C101 by the monitoring module 131c for the monitoring module 133c indicates that the monitoring module 133c has not been tampered with, and the monitoring result C107 by the monitoring module 134c for the monitoring module 136c indicates that the monitoring module 136c has not been tampered with. On the other hand, the monitoring result C106 by the monitoring module 133c for the monitoring module 136c indicates that the monitoring module 136c has been tampered with.

Furthermore, FIG. 55 shows the monitoring result C104 by the monitoring module 132c for the monitoring module 135c, the monitoring result C105 by the monitoring module 134c for the monitoring module 135c, the monitoring result C109 by the monitoring module 135c for the monitoring module 137c, the monitoring result C108 by the monitoring module 137c for the monitoring module 134c, the monitoring result C111 by the monitoring module 137c for the monitoring module 136c, and the monitoring result C110 by the monitoring module 136c for the monitoring module 137c.

FIG. 56 shows an example of a data structure of monitoring results received from the information security apparatus 100c.

As shown in FIG. 56, the set C112 of monitoring results received from the information security apparatus 100c includes monitoring results C100, C101, C103, C106, C107, . . . . Each monitoring result includes an ID, a source monitoring module, a target monitoring module, a result, and a time of monitoring.

The ID is the identification number for uniquely identifying the monitoring result.

The source monitoring module is the module identifier for identifying the monitoring module that outputs the monitoring result.

The target monitoring module is the module identifier for identifying the monitoring module that was monitored in the monitoring result.

The result indicates the monitoring result. A circle, "○", for the monitoring result indicates that the target monitoring module has not been tampered with, and an "X" for the monitoring result indicates that the target monitoring module has been tampered with. However, if the source monitoring module has been tampered with, the source monitoring module may output an "X" for a monitoring module that has not been tampered with, or conversely a "○" for a monitoring module that has been tampered with.

The time of monitoring indicates the time that the source monitoring module checked for tampering in the target monitoring module. The time of monitoring is in the format year/month/date/hour/minute. As shown in FIG. 56, all of the monitoring results included in the set C112 of monitoring results have the same time, "2011.1.31 13:00". This indicates that tampering was checked for simultaneously on Jan. 31, 2011, at 13:00.

The reception unit 230c receives, for example, all of the monitoring results shown in FIG. 55 and transmits all of the received monitoring results to the detection unit 220c.

The detection unit 220c receives the monitoring results from the reception unit 230c and, referring to a portion of the received monitoring results, i.e. referring to a plurality of monitoring results for one monitoring module, detects an abnormality by detecting an inconsistency between the plurality of monitoring results. When there are two monitoring results for a certain monitoring module, the detection unit 220c refers, among the received monitoring results, to a first monitoring result and to a second monitoring result for the certain monitoring module in order to determine whether the first and the second monitoring results match. The detection unit 220c thereby detects whether the first and second monitoring results are inconsistent.

In the example shown in FIG. 55, the detection unit 220c refers to the monitoring result C106 and to the monitoring result C107 for the monitoring module 136c. The monitoring results C106 and C107 are both for the same monitoring module 136c. However, the monitoring result C106 indicates that the monitoring module 136c has been tampered with, whereas the monitoring result C107 indicates that the monitoring module 136c has not been tampered with. Therefore, the monitoring results C106 and C107 do not match. By determining that the monitoring results C106 and C107 do not match, the detection unit 220c detects an abnormality.

In this way, the detection unit 220c detects an inconsistency between two monitoring results for the same monitoring module as an abnormality.

As described above, the detection unit 220c does not refer to all of the received monitoring results, but rather only to a portion of the received monitoring results, i.e. to a plurality of monitoring results for the same monitoring module, in order to detect an abnormality.

Upon detecting an abnormality, the detection unit 220c notifies the identification unit 210c that a plurality of monitoring results for the same monitoring module do not match. In the example shown in FIG. 55, the detection unit 220c notifies the identification unit 210c that the monitoring results C106 and C107 do not match.

The identification unit 210c receives notification from the detection unit 220c that the first monitoring result and the second monitoring result for the same monitoring module do not match. Upon receiving the notification, the identification unit 210c receives all of the monitoring results from the reception unit 230c. Next, as shown below, the identification unit 210c identifies the monitoring module that has been tampered by referring to the plurality of monitoring results to trace back from the target monitoring module to the source monitoring module. In other words, the identification unit 210c refers to the first monitoring result and the second monitoring result in the notification to trace back from the target monitoring module to the source monitoring module. Starting with both the first monitoring result and the second monitoring result, the identification unit 210c refers to other monitoring results that indicate normality to successively trace back from the target monitoring module to the source monitoring module, determining whether the same monitoring module is arrived at during the tracing process. If the same monitoring module is arrived at, this monitoring module is identified as having been tampered with.

The following provides a more detailed description with reference to the example shown in FIG. 55.

Upon receiving notification that the first monitoring result C106 and the second monitoring result C107 for the same monitoring module 136c do not match, the identification unit 210c refers to the first monitoring result C106 to identify the source monitoring module 133c. Next, a monitoring result indicating that the identified monitoring module 133c is normal is searched for. In the example shown in FIG. 55, the monitoring result C101 is a monitoring result by the monitoring module 131c for the monitoring module 133c and indicates that the monitoring module 133c is normal. Therefore, the monitoring module 131c is identified as the source monitoring module for the monitoring module 133c. Similarly, a monitoring result indicating that the monitoring module 131c is normal is searched for. In the example shown in FIG. 55, no monitoring result by any monitoring module indicates that the monitoring module 131c is normal. Accordingly, the search for a monitoring result concludes. The identification unit 210c thus identifies the monitoring module 131c.

The identification unit 210c also refers to the second monitoring result C107 to identify the monitoring module 134c as the source monitoring module. Next, a monitoring result indicating that the identified monitoring module 134c is normal is searched for. In the example shown in FIG. 55, the monitoring result C103 is a monitoring result by the monitoring module 132c for the monitoring module 134c and indicates that the monitoring module 134c is normal. Therefore, the monitoring module 132c is identified as the source monitoring module for the monitoring module 134c. Similarly, a monitoring result indicating that the monitoring module 132c is normal is searched for. In the example shown in FIG. 55, the monitoring result C100 is a monitoring result by the monitoring module 131c for the monitoring module 132c and indicates that the monitoring module 132c is normal. Therefore, the monitoring module 131c is identified as the source detection module for the monitoring module 132c. Furthermore, a monitoring result indicating that the monitoring module 131c is normal is similarly searched for. In the example shown in FIG. 55, no monitoring result by any monitoring module indicates that the monitoring module 131c is normal. Accordingly, the search for a monitoring result concludes. The identification unit 210c thus identifies the monitoring module 131c.

Next, the identification unit 210c determines whether the plurality of monitoring modules identified by separate trace routes are the same monitoring module. In this example, the identification unit 210c identifies the monitoring modules as the same monitoring module 131c.

Accordingly, the identification unit 210c thus identifies the monitoring module 131c as having been tampered with.

If the monitoring module 131c is assumed not to have been tampered with, the monitoring result C101 by the monitoring module 131c would be correct, meaning that the monitoring module 133c has not been tampered with. As indicated by the monitoring result C106 from the monitoring module 133c, the monitoring module 136c would therefore have been tampered with. On the other hand, under the above assumption, the monitoring module 132c would not have been tampered with, as indicated by the monitoring result C100, nor would the monitoring module 134c, as indicated by the monitoring result C103. The monitoring module 136c would therefore not have been tampered with, as indicated by the monitoring result C107.

The two monitoring results C106 and C107 for the monitoring module 136c thus do not match. It can therefore be concluded that the above assumption is incorrect. In other words, it is incorrect to assume that the monitoring module 131c has not been tampered with, which leads to the conclusion that the monitoring module 131c has in fact been tampered with.

Figure 57:
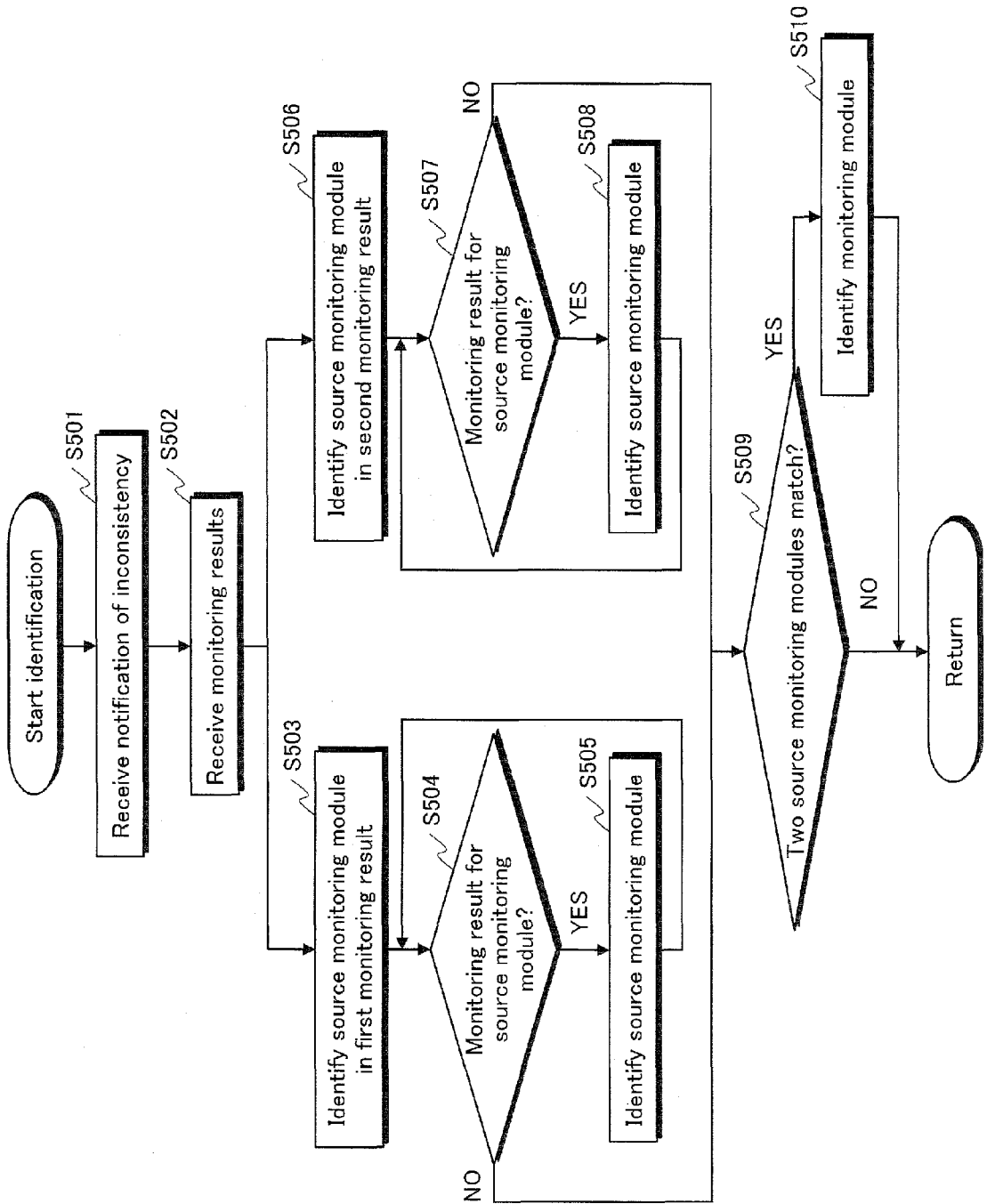
FIG. 57 is a flowchart showing operations of an identification unit 210c.

Operations by the identification unit 210c are described with reference to the flowchart in FIG. 57.

The identification unit 210c receives notification from the detection unit 220c that the first monitoring result and the second monitoring result for the same monitoring module do not match (S501).

Upon receiving the notification, the identification unit 210c receives all of the monitoring results from the reception unit 230c (S502).

The identification unit 210c refers to the first monitoring result to identify the source monitoring module that transmitted the first monitoring result (S503). Next, the identification unit 210c searches for a monitoring result indicating that the identified monitoring module is normal. When no such monitoring result is found (S504: "NO"), processing proceeds to step S509. When such a monitoring result is found (S504: "YES"), the identification unit 210c refers to the monitoring result to identify the source monitoring module that transmitted the monitoring result (S505). Processing is then repeated starting from step S504.

The identification unit 210c also refers to the second monitoring result to identify the source monitoring module that transmitted the second monitoring result (S506). Next, the identification unit 210c searches for a monitoring result indicating that the identified monitoring module is normal. When no such monitoring result is found (S507: "NO"), processing proceeds to step S509. When such a monitoring result is found (S507: "YES"), the identification unit 210c refers to the monitoring result to identify the source monitoring module that transmitted the monitoring result (S508). Processing is then repeated starting from step S507.

Next, it is determined whether the monitoring module ultimately identified by the route traced from the first monitoring result (S503-S505) and the monitoring module ultimately identified by the route traced from the second monitoring result (S506-S508) match (S509). When the monitoring modules match (S509: "YES"), the identified monitoring module is identified as having been tampered with (S510).

(c) FIG. 58 shows another example of monitoring results received from the information security apparatus 100c by the reception unit 230c in the management apparatus 200c.

As described above, the monitoring modules 131c, 132c, . . . , 137c monitor other monitoring modules at a first point in time. The concept of a first point in time refers not only to a particular moment in time, but also encompasses a period of time. The monitoring modules each transmit monitoring results for the first point in time indicating whether the monitoring modules that are the target of monitoring have been tampered with, transmitting the results to the management apparatus 200c via the information security apparatus 100c.

The monitoring modules 131c, 132c, . . . , 137c also monitor other monitoring modules at a second point in time. Like the first point in time, the concept of a second point in time refers not only to a particular moment in time, but also encompasses a period of time. The second point in time is later than the first point in time. For example, if the first point in time is "Jan. 31, 2011, 13:00", the second point in time may be "Feb. 5, 2011, 9:00", which is later than the first point in time. The monitoring modules each transmit monitoring results for the second point in time indicating whether the monitoring modules that are the target of monitoring have been tampered with, transmitting the results to the management apparatus 200c via the information security apparatus 200c.

Note that the information security apparatus 100c is not limited to transmitting the monitoring results for the first point in time and subsequently transmitting the monitoring results for the second point in time. After the second point in time, the information security apparatus 100c may transmit the monitoring results for the first point in time and the monitoring results for the second point in time.

The reception unit 230c receives the monitoring results for the first point in time immediately after the first point in time and receives the monitoring results for the second point in time immediately after the second point in time. Note that immediately after the second point in time, the reception unit 230c may receive the monitoring results for the first point in time and the monitoring results for the second point in time.

As shown in FIG. 58A, at time t=k, the monitoring result C121 by the monitoring module 131c for the monitoring module 132c indicates that the monitoring module 132c has been tampered with. On the other hand, as shown in FIG. 58B, at time t=k+i, the monitoring result C122 by the monitoring module 131c for the monitoring module 132c indicates that the monitoring module 132c has not been tampered with.

FIG. 59 shows an example of a data structure of monitoring results. As shown in FIG. 59, the set C120 of monitoring results includes monitoring results C121 and C122, including for each monitoring result an ID, a source monitoring module, a target monitoring module, a result, and a time of monitoring. The ID, the source monitoring module, the target monitoring module, the result, and the time of monitoring are as described above.

The detection unit 220c detects, among the received monitoring results, the following inconsistency: the first monitoring result by the first monitoring module for the second monitoring module at the first point in time indicates that the second monitoring module has been tampered with, whereas the second monitoring result by the first monitoring module for the second monitoring module at the second point in time indicates that the second monitoring module has not been tampered with. Upon detecting the inconsistency, the detection unit 220c notifies the identification unit 210c of the inconsistency.

In the example shown in FIGS. 58A and 58B, the detection unit 220c detects, among the received monitoring results, the following inconsistency: the monitoring result C121 by the monitoring module 131c for the monitoring module 132c at time t=k indicates that the monitoring module 132c has been tampered with, whereas the monitoring result C122 by the monitoring module 131c for the monitoring module 132c at time t=k+i indicates that the monitoring module 132c has not been tampered with.

Upon receiving notification of the inconsistency from the detection unit 220c, the identification unit 210c identifies the first monitoring module has having been tampered with. In the example shown in FIGS. 58A and 58B, the identification unit 210c identifies the monitoring module 131c as having been tampered with.

The reason why the identification unit 210c identifies the monitoring module 131c as having been tampered with is as follows.

In the example shown in FIGS. 58A and 58B, assume the monitoring module 131c is a normal monitoring module that has not been tampered with. At time t=k, the monitoring module 131c determines that the monitoring module 132c has been tampered with, yet at time t=k+i, the monitoring module 131c determines that the monitoring module 132c is normal. Between the time t=k and t=k+i, the monitoring module 132c cannot return to being normal, and therefore the monitoring results C121 and C122 are contradictory. Accordingly, the assumption that the monitoring module 131c is normal is incorrect. It is therefore concluded that the monitoring module 131c has been tampered with.

(d) FIG. 60 shows another example of monitoring results received from the information security apparatus 100c by the reception unit 230c in the management apparatus 200c.

As described above, the monitoring modules 131c, 132c, . . . , 137c monitor other monitoring modules at a first point in time. As described above, the concept of a first point in time refers not only to a particular moment in time, but also encompasses a period of time. The monitoring modules each transmit monitoring results for the first point in time indicating whether the monitoring modules that are the target of monitoring have been tampered with, transmitting the results to the management apparatus 200c via the information security apparatus 100c.

The monitoring modules 131c, 132c, . . . , 137c also monitor other monitoring modules at a second point in time. Like the first point in time, the concept of a second point in time refers not only to a particular moment in time, but also encompasses a period of time. As described above, the second point in time is later than the first point in time. The monitoring modules each transmit monitoring results for the second point in time indicating whether the monitoring modules that are the target of monitoring have been tampered with, transmitting the results to the management apparatus 200c via the information security apparatus 100c.

Note that the information security apparatus 100c is not limited to transmitting the monitoring results for the first point in time and subsequently transmitting the monitoring results for the second point in time. After the second point in time, the information security apparatus 100c may transmit the monitoring results for the first point in time and the monitoring results for the second point in time.

The reception unit 230c receives the monitoring results for the first point in time immediately after the first point in time and receives the monitoring results for the second point in time immediately after the second point in time. Note that immediately after the second point in time, the reception unit 230c may receive the monitoring results for the first point in time and the monitoring results for the second point in time.

As shown in FIG. 60A, at time t=k, the monitoring result C131 by the monitoring module 131c for the monitoring module 132c indicates that the monitoring module 132c has been tampered with. As shown in FIG. 60B, at time t=k+i, the monitoring result C133 by the monitoring module 132c for the monitoring module 131c indicates that the monitoring module 131c has not been tampered with.

FIG. 61 shows an example of a data structure of monitoring results. As shown in FIG. 61, the set C130 of monitoring results includes monitoring results C131 and C133, including for each monitoring result an ID, a source monitoring module, a target monitoring module, a result, and a time of monitoring. The ID, the source monitoring module, the target monitoring module, the result, and the time of monitoring are as described above.

The detection unit 220c detects, among the received monitoring results, the following abnormality: the first monitoring result by the first monitoring module for the second monitoring module at the first point in time indicates that the second monitoring module has been tampered with, whereas the second monitoring result by the second monitoring module for the first monitoring module at the second point in time indicates that the first monitoring module has not been tampered with.

In the example shown in FIGS. 60A and 60B, the detection unit 220c detects, among the received monitoring results, the following abnormality: the monitoring result C131 by the monitoring module 131c for the monitoring module 132c at time t=k indicates that the monitoring module 132c has been tampered with, whereas the monitoring result C133 by the monitoring module 132c for the monitoring module 131c at time t=k+i indicates that the monitoring module 132c has not been tampered with.

When the first monitoring result indicates that the second monitoring module has been tampered with and the second monitoring result indicates that the first monitoring module has not been tampered with, the identification unit 210c identifies the second monitoring module as having been tampered with.

In the example shown in FIGS. 60A and 60B, when detecting the abnormality wherein the monitoring result C131 indicates that the monitoring module 132c has been tampered with, whereas the monitoring result C133 indicates that the monitoring module 131c has not been tampered with, the identification unit 210c identifies the monitoring module 132c as having been tampered with.

The reason why the identification unit 210c identifies the monitoring module 132c as having been tampered with is as follows.

In the example shown in FIGS. 60A and 60B, at time t=k, the monitoring module 131c determines that the monitoring module 132c has been tampered with, and at time t=k+i, the monitoring module 132c determines that the monitoring module 131c is normal.

Assume that the monitoring module 131c is normal. The monitoring result C131 thus indicates that the monitoring module 132c has been tampered with.

Now assume instead that the monitoring module 131c has been tampered with. The monitoring result C133 indicates that the monitoring module 131c is normal, and therefore the monitoring module 132c has been tampered with.

It can therefore be concluded that the monitoring module 132c has been tampered with.

(8) The following structure may be adopted.

The management apparatus and the information security apparatus (device) switch between a normal mode and an abnormal mode.

In normal mode, the management apparatus and the information security apparatus (device) operate for the purpose of identifying an abnormal detection module (or monitoring module), i.e. a module that has been tampered with. Normal mode can thus be called abnormal module identification mode. In normal mode, a detection module (monitoring module) first scans for an attack on the protection control module, i.e. tampering with the protection control module. Second, a plurality of detection modules (a plurality of monitoring modules) scan (or monitor) each other for an abnormality, i.e. tampering.

If an abnormal module is detected during normal mode, the management apparatus and the information security apparatus (device) switch from normal mode to abnormal mode.

During abnormal mode, the management apparatus and the information security apparatus (device) first update the protection control module in the information security apparatus (device) to a normal protection control module if danger, i.e. tampering, has been detected in the protection control module. Second, if an abnormal module has been detected, the abnormal module is deactivated. Third, the monitoring pattern stored by the detection modules (or monitoring modules) is updated to a new monitoring pattern. The following is an example of updating the monitoring pattern.

(9) The following structure may be adopted.

Figure 62:
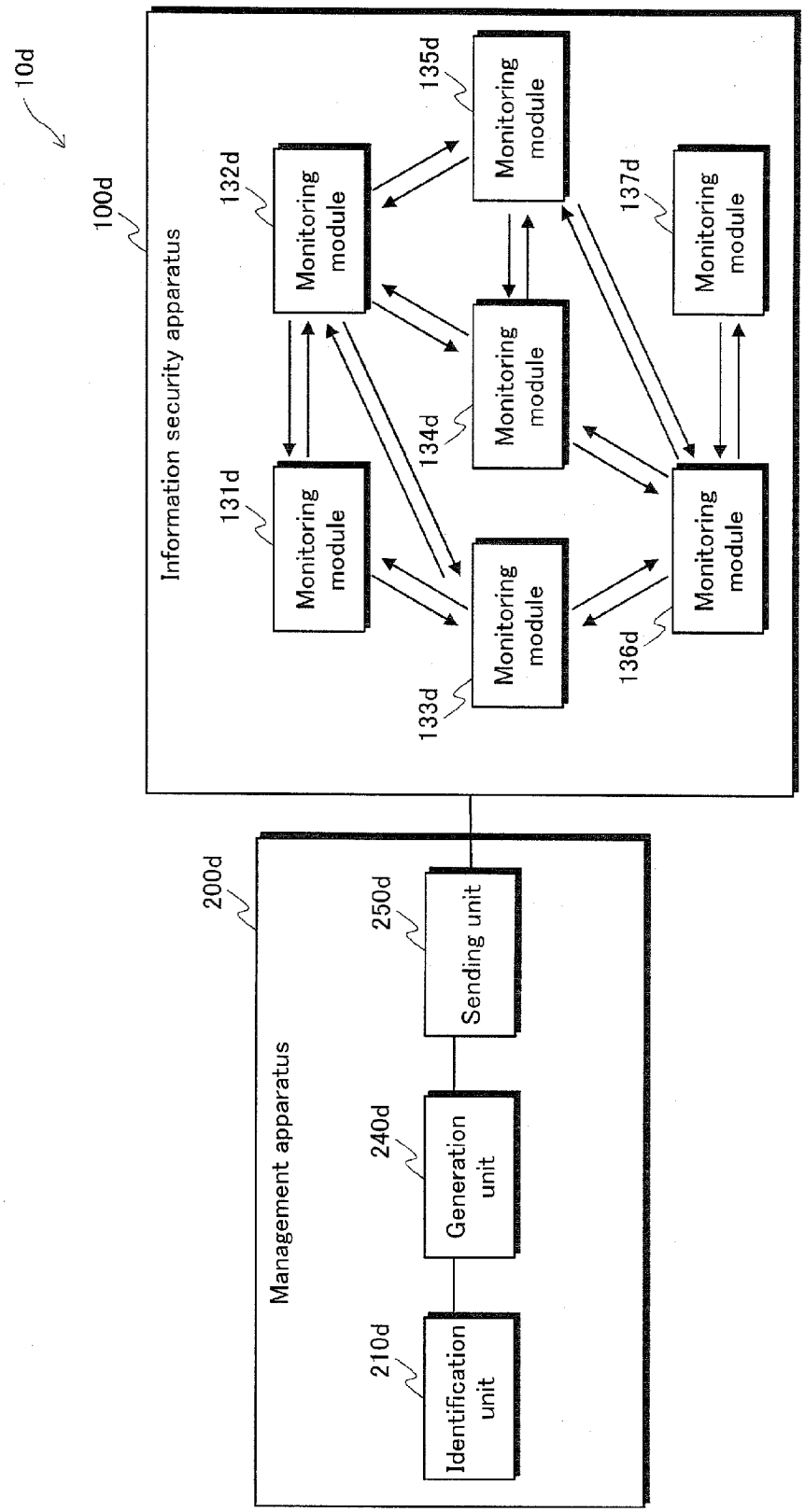
FIG. 62 is a block diagram showing a structure of a tampering monitoring system 10d as another modification of the present invention.

(a) As shown in FIG. 62, a tampering monitoring system 10d according to another Modification of the present invention includes a management apparatus 200d and an information security apparatus 100d.

The information security apparatus 100d has a plurality of monitoring modules 131d, 132d, . . . , 137d. The monitoring modules 131d, 132d, . . . , 137d each monitor for tampering in one or more of the other monitoring modules.

The management apparatus 200d manages the information security apparatus 100d. As shown in FIG. 62, the management apparatus 200d is provided with a sending unit 250d, a generation unit 240d, and an identification unit 210d.

The identification unit 210d identifies a monitoring module that has been tampered with from among the plurality of monitoring modules 131d, 132d, . . . , 137d.

The generation unit 240d generates a monitoring pattern for each monitoring module, excluding the monitoring module that has been tampered with from the plurality of monitoring modules 131d, 132d, . . . , 137d. In the generated monitoring pattern, each normal monitoring module monitors only one other normal monitoring module, and each normal monitoring module is monitored by only one other normal monitoring module.

The sending unit 250d transmits the generated monitoring patterns for the normal monitoring modules to the information security apparatus.

The information security apparatus 100d receives the monitoring patterns and causes the normal monitoring modules respectively to overwrite the monitoring patterns stored therein with the received monitoring patterns.

The plurality of monitoring patterns generated by the generation unit 240d form a cyclic monitoring pattern.

(b) The following provides further detail on the management apparatus 200d.

Figure 63:
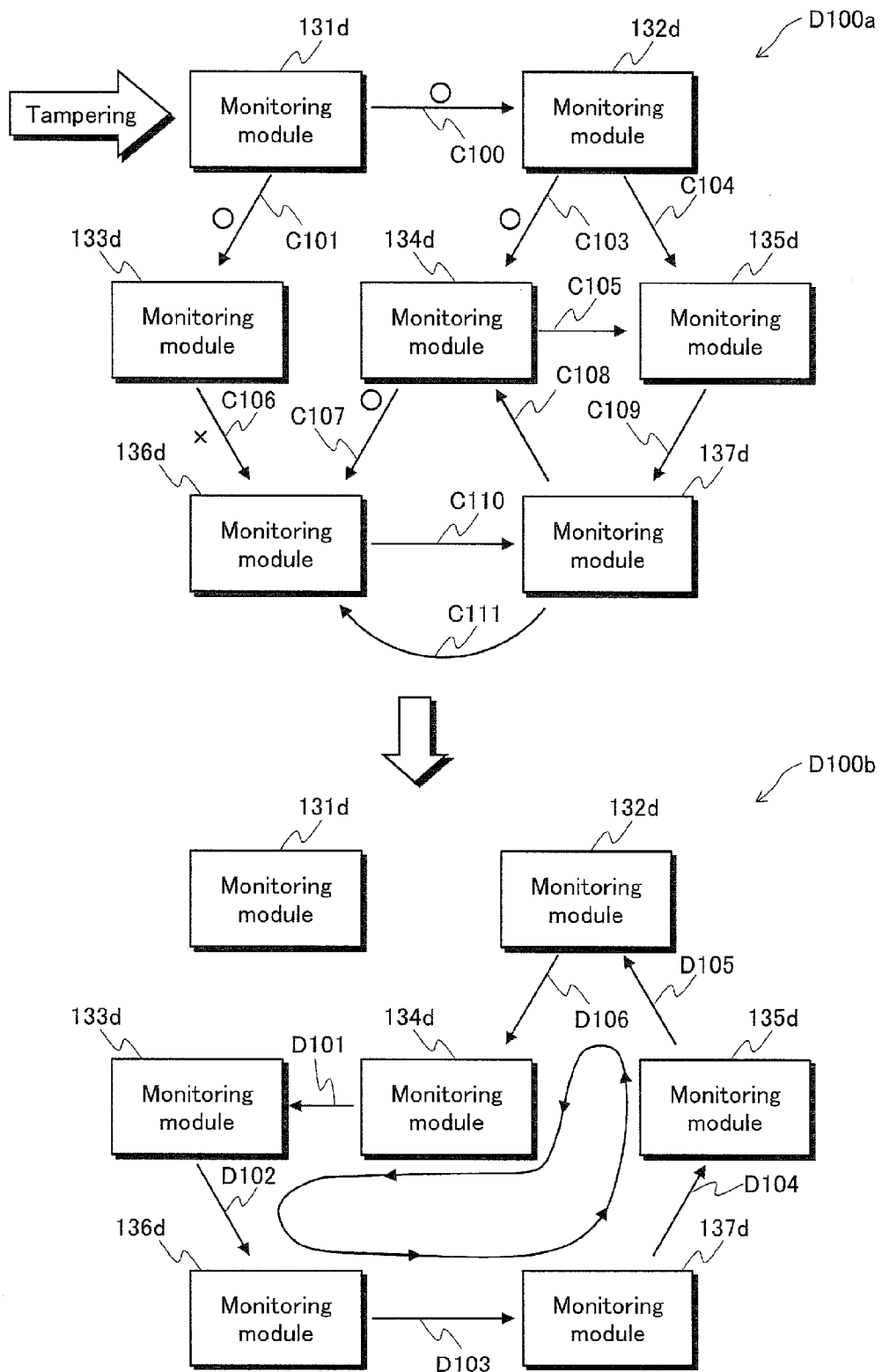
FIG. 63 shows an example of a set of monitoring results D100a and of a set of monitoring patterns D100b.

The management apparatus 200d receives the set D100a of monitoring results, for example, shown in FIG. 63. The identification unit 210d identifies the monitoring module 131d as having been tampered with, as described in the above Embodiments and Modifications. The set D100a of monitoring results is the same as the set shown in FIG. 55, and therefore a description thereof is omitted.

The generation unit 240d excludes the monitoring module 131d that has been tampered with from the plurality of monitoring modules 131d, 132d, . . . , 137d, thus selecting the monitoring modules 132d, . . . , 137d. These monitoring modules are called normal monitoring modules.

As shown by the set D100b of monitoring patterns in FIG. 63, the generation unit 240d generates a monitoring pattern D106 in which the monitoring module 132d monitors the monitoring module 134d, a monitoring pattern D101 in which the monitoring module 134d monitors the monitoring module 133d, a monitoring pattern D102 in which the monitoring module 133d monitors the monitoring module 136d, a monitoring pattern D103 in which the monitoring module 136d monitors the monitoring module 137d, a monitoring pattern D104 in which the monitoring module 137d monitors the monitoring module 135d, and a monitoring pattern D105 in which the monitoring module 135d monitors the monitoring module 132d.

FIG. 64 shows an example of a data structure of monitoring patterns. The monitoring patterns D101, D102, . . . , D106 are each formed by an ID, a source monitoring module, and a target monitoring module. The ID is an identifier for uniquely identifying the monitoring pattern. The source monitoring module is the module identifier for identifying the monitoring module to which the monitoring pattern is assigned. The monitoring pattern is stored in the monitoring module indicated by the source monitoring module. This monitoring module monitors for tampering in another monitoring module in accordance with the monitoring pattern. The target monitoring module is the module identifier for identifying the monitoring module that is the target of monitoring by the monitoring module to which the monitoring pattern is assigned.

In accordance with the monitoring patterns D101, D102, . . . , D106 thus generated, the monitoring module 132d monitors the monitoring module 134d, the monitoring module 134d monitors the monitoring module 133d, the monitoring module 133d monitors the monitoring module 136d, the monitoring module 136d monitors the monitoring module 137d, the monitoring module 137d monitors the monitoring module 135d, and the monitoring module 135d monitors the monitoring module 132d.

As shown in the set D100b of monitoring patterns in FIG. 63, the route traced during monitoring starts from the monitoring module 132d, traverses all of the monitoring modules (excluding the monitoring module that has been tampered with), and returns to the monitoring module 132d. A plurality of routes for monitoring thus form a closed cycle, which is why the set D100b of monitoring patterns in FIG. 63 is referred to as a cyclic monitoring pattern.

As described above, the plurality of monitoring patterns generated by the generation unit 240d form a cyclic monitoring pattern. In the cyclic monitoring pattern, each monitoring module monitors only one other monitoring module, and each monitoring module is monitored by only one other monitoring module. A plurality of routes for monitoring from the source monitoring module to the target monitoring module exist and, when connected, form a closed cycle.

By generating this sort of cyclic monitoring pattern, each monitoring module monitors only one other monitoring module, and each monitoring module is monitored by only one other monitoring module. The number of times the monitoring modules perform monitoring is therefore reduced to a minimum by using a cyclic monitoring pattern.

If the number of monitoring modules is n, the number of monitoring patterns in the cyclic monitoring pattern is 1/(n−1) times the number of monitoring patterns generated when forming a complete graph.

(10) The following structure may be adopted.

An aspect of the present invention is a management apparatus for managing an information security apparatus that includes a plurality of monitoring modules that monitor for tampering, the management apparatus comprising: a reception circuit configured to receive, from the information security apparatus, a plurality of monitoring results each generated by a source monitoring module monitoring a target monitoring module, the source and the target each being one of the monitoring modules; a detection circuit configured to detect an abnormality by referring to fewer than all of the monitoring results received by the reception circuit; and an identification circuit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is an integrated circuit for managing an information security apparatus that includes a plurality of monitoring modules that monitor for tampering, the integrated circuit comprising: a reception circuit configured to receive, from the information security apparatus, a plurality of monitoring results each generated by a source monitoring module monitoring a target monitoring module, the source and the target each being one of the monitoring modules; a detection circuit configured to detect an abnormality by referring to fewer than all of the monitoring results received by the reception circuit; and an identification circuit configured to identify, when an abnormality is detected, a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

Another aspect of the present invention is a management apparatus for managing an information security apparatus that includes a plurality of monitoring modules that monitor for tampering, the management apparatus comprising: a memory unit storing a computer program composed of a combination of a plurality of computer instructions; and a processor configured to read the computer instructions one at a time from the computer program stored by the memory unit, to decode the read computer instruction, and to operate in accordance with the result of decoding. The computer program causes the management apparatus, which is a computer, to perform the steps of: a) receiving, from the information security apparatus, a plurality of monitoring results each generated by a source monitoring module monitoring a target monitoring module, the source and the target each being one of the monitoring modules; b) detecting an abnormality by referring to fewer than all of the monitoring results received in step a); and c) when an abnormality is detected, identifying a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

The following structure may also be adopted.

The present invention may be a management apparatus for managing an information security apparatus that includes a plurality of monitoring modules that monitor for tampering, the management apparatus comprising: an identification circuit configured to identify a monitoring module that has been tampered with among the monitoring modules; a generation circuit configured to generate a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and a transmission circuit configured to transmit the monitoring patterns for the normal monitoring modules to the information security apparatus. Upon receiving the monitoring patterns for the normal monitoring modules, the information security apparatus causes the normal monitoring modules each to store the corresponding monitoring pattern.

The present invention may be an integrated circuit for managing an information security apparatus that includes a plurality of monitoring modules that monitor for tampering, the integrated circuit comprising: an identification circuit configured to identify a monitoring module that has been tampered with among the monitoring modules; a generation circuit configured to generate a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and a transmission circuit configured to transmit the monitoring patterns for the normal monitoring modules to the information security apparatus. Upon receiving the monitoring patterns for the normal monitoring modules, the information security apparatus causes the normal monitoring modules each to store the corresponding monitoring pattern.

Another aspect of the present invention is a management apparatus for managing an information security apparatus that includes a plurality of monitoring modules that monitor for tampering, the management apparatus comprising: a memory unit storing a computer program composed of a combination of a plurality of computer instructions; and a processor configured to read the computer instructions one at a time from the computer program stored by the memory unit, to decode the read computer instruction, and to operate in accordance with the result of decoding. The computer program causes the management apparatus, which is a computer, to perform the steps of: a) identifying a monitoring module that has been tampered with among the monitoring modules; b) generating a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and c) transmitting the monitoring patterns for the normal monitoring modules to the information security apparatus. Upon receiving the monitoring patterns for the normal monitoring modules, the information security apparatus causes the normal monitoring modules each to store the corresponding monitoring pattern.

(11) The following structure may be adopted.

The present invention may be a non-transitory computer-readable recording medium having recorded thereon a computer program for management used in a management apparatus for managing an information security apparatus that includes a plurality of monitoring modules that monitor for tampering. The computer program causes a management apparatus, which is a computer, to perform the steps of: a) receiving, from the information security apparatus, a plurality of monitoring results each generated by a source monitoring module monitoring a target monitoring module, the source and the target each being one of the monitoring modules; b) detecting an abnormality by referring to fewer than all of the monitoring results received in step a); and c) when an abnormality is detected, identifying a monitoring module that has been tampered with from among (i) a monitoring module that generates a monitoring result related to the abnormality, and (ii) one or more monitoring modules identified by tracing back through a chain of monitoring modules consecutively from the target to the source, starting from the monitoring module that generates the monitoring result related to the abnormality.

The present invention may also be a non-transitory computer-readable recording medium having recorded thereon a computer program for management used in a management apparatus for managing an information security apparatus that includes a plurality of monitoring modules that monitor for tampering. The computer program causes the management apparatus, which is a computer, to perform the steps of: a) identifying a monitoring module that has been tampered with among the monitoring modules; b) generating a plurality of monitoring patterns in one-to-one correspondence with a plurality of normal monitoring modules, the normal monitoring modules being the monitoring modules other than the monitoring module that has been tampered with, so that each normal monitoring module monitors one other normal monitoring module, and each normal monitoring module is monitored by one other normal monitoring module; and c) transmitting the monitoring patterns for the normal monitoring modules to the information security apparatus. Upon receiving the monitoring patterns for the normal monitoring modules, the information security apparatus causes the normal monitoring modules each to store the corresponding monitoring pattern.

(12) Each of the above modules may be an individual computer program, a module embedded in the operating system, a driver called by the operating system, or an application program.

(13) Each of the above devices is, specifically, a computer system composed of a microprocessor, ROM, RAM, hard disk unit, display unit, keyboard, mouse, etc. Computer programs are stored on the RAM or the hard disk unit. By operating in accordance with the computer programs, the microprocessor achieves the functions of each device. In order to achieve predetermined functions, the computer programs are composed of a combination of multiple command codes that indicate instructions for the computer.

(14) Part or all of the components comprising each of the above-described devices may be assembled as one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates according to the computer programs, and thereby the system LSI accomplishes its functions.

Individual components comprising each of the above-described devices may respectively be made into discrete chips, or part or all of the components may be made into one chip.

Although referred to here as a system LSI, depending on the degree of integration, the terms IC, LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(15) Part or all of the components comprising each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions. The IC card/module may be tamper resistant.

(16) The present invention may be the above-described method. The present invention may be computer programs that achieve the method by a computer.

The present invention may also be a computer-readable recording medium, such as a flexible disk, hard disk, CD-ROM, MO, DVD, DVD-ROM, DVD-RAM, BD (Blu-ray Disc), or semiconductor memory, on which the above-mentioned computer program is recorded.

The present invention may also be the computer programs to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs after the computer programs are transferred via being recorded on the recording medium, via one of the above-mentioned networks, etc.

(17) The following structure may be adopted.

An aspect of the present invention is a management apparatus for identifying an abnormal detection module that has been tampered with among a plurality of detection modules connected via a network and operating in an information processing apparatus, the management apparatus comprising: a reception unit configured to receive tampering detection results from the detection modules; a tampering detection result storage unit configured to store, from among the tampering detection results, a tampering detection result determined to be abnormal; and an abnormal module identification unit configured to assume that one of the detection modules is a normal detection module, to determine, based on the assumption, whether the tampering detection result stored by the tampering detection result storage unit and a newly received tampering detection result are contradictory, and when determining positively, to identify the detection module assumed to be normal as an abnormal detection module.

With this structure, by storing a detection result that indicates tampering, an abnormal detection module can be identified based on whether detection results are contradictory, even if all of the detection modules have not performed tampering detection once. The processing load on the device is therefore reduced.

The management apparatus may further comprise a deactivation instruction unit configured to output a deactivation instruction for the identified abnormal detection module.

With this structure, the information processing apparatus operates without being blocked by the abnormal detection module, since the detected abnormal detection module is deactivated. This increases the reliability of the information processing apparatus.

The management apparatus may further comprise a monitoring pattern update instruction unit configured to update a monitoring pattern to a cyclic monitoring pattern in which all detection modules other than the detection module identified as an abnormal detection module perform tampering detection in a unidirectional cycle; and a normal module identification unit configured to identify, when all tampering detection results by the detection modules in the cyclic monitoring pattern are normal, the detection modules as normal detection modules.

With this structure, processing in the information processing apparatus can be performed with a normal module, thus increasing the reliability of the information processing apparatus.

At least one detection module in the information processing apparatus may be an update module provided with a function to update another module. The management apparatus may further comprise: a monitoring pattern update instruction unit configured to update a monitoring pattern to a cyclic monitoring pattern in which all detection modules other than the detection module identified as an abnormal detection module perform tampering detection in a unidirectional cycle; a normal module identification unit configured to identify, when all tampering detection results by the detection modules in the cyclic monitoring pattern are normal, the detection modules as normal detection modules; and a control unit configured to control, when a detection module identified as a normal detection module is the update module having the function to update another module, the detection module to update another module.

With this structure, the normal detection module is reliably used to update another module, thus increasing the reliability of the information processing apparatus.

The information processing apparatus may further include an application program and a protection control module configured to protect the application program, and the other module may be the detection module, the application program, or the protection control module.

An aspect of the present invention is a detection system formed by an information processing apparatus that includes a plurality of detection modules that monitor for tampering and a management apparatus for managing the information processing device, the management apparatus comprising: a reception unit configured to receive tampering detection results from the detection modules; a tampering detection result storage unit configured to store, from among the tampering detection results, a tampering detection result determined to be abnormal; and an abnormal module identification unit configured to assume that one of the detection modules is a normal detection module, to determine, based on the assumption, whether the tampering detection result stored by the tampering detection result storage unit and a newly received tampering detection result are contradictory, and when determining positively, to identify the detection module assumed to be normal as an abnormal detection module.

In the detection system, the management apparatus may further comprise a deactivation instruction unit configured to output a deactivation instruction for the identified abnormal detection module.

In the detection system, the management apparatus may further comprise: a monitoring pattern update instruction unit configured to update a monitoring pattern to a cyclic monitoring pattern in which all detection modules other than the detection module identified as an abnormal detection module perform tampering detection in a unidirectional cycle; and a normal module identification unit configured to identify, when all tampering detection results by the detection modules in the cyclic monitoring pattern are normal, the detection modules as normal detection modules.

In the detection system, at least one detection module in the information processing apparatus may be an update module provided with a function to update another module. The management apparatus may further comprise: a monitoring pattern update instruction unit configured to update a monitoring pattern to a cyclic monitoring pattern in which all detection modules other than the detection module identified as an abnormal detection module perform tampering detection in a unidirectional cycle; and a normal module identification unit configured to identify, when all tampering detection results by the detection modules in the cyclic monitoring pattern are normal, the detection modules as normal detection modules; and a control unit configured to control, when a detection module identified as a normal detection module is the update module having the function to update another module, the detection module to update another module.

An aspect of the present invention is an integrated circuit having a function to manage an information processing device having a plurality of detection modules that monitor for tampering, the integrated circuit comprising: a reception unit configured to receive tampering detection results from the detection modules; a tampering detection result storage unit configured to store, from among the tampering detection results, a tampering detection result determined to be abnormal; and an abnormal module identification unit configured to assume that one of the detection modules is a normal detection module, to determine, based on the assumption, whether the tampering detection result stored by the tampering detection result storage unit and a newly received tampering detection result are contradictory, and when determining positively, to identify the detection module assumed to be normal as an abnormal detection module.

An aspect of the present invention is a management method for managing an information processing device having a plurality of detection modules that monitor for tampering, the management method comprising the steps of: a) receiving tampering detection results from the detection modules; b) storing, from among the tampering detection results, a tampering detection result determined to be abnormal; and c) assuming that one of the detection modules is a normal detection module, determining, based on the assumption, whether the tampering detection result stored in step b) and a newly received tampering detection result are contradictory, and when determining positively, identifying the detection module assumed to be normal as an abnormal detection module.

An aspect of the present invention is a computer-readable recording medium having recorded thereon a computer program for managing an information security apparatus that includes a plurality of detection modules that monitor for tampering, the computer program causing a computer to execute the steps of: a) receiving tampering detection results from the detection modules; b) storing, from among the tampering detection results, a tampering detection result determined to be abnormal; and c) assuming that one of the detection modules is a normal detection module, determining, based on the assumption, whether the tampering detection result stored in step b) and a newly received tampering detection result are contradictory, and when determining positively, identifying the detection module assumed to be normal as an abnormal detection module.

An aspect of the present invention is a computer program for managing an information security apparatus that includes a plurality of detection modules that monitor for tampering, the computer program causing a computer to execute the steps of: a) receiving tampering detection results from the detection modules; b) storing, from among the tampering detection results, a tampering detection result determined to be abnormal; and c) assuming that one of the detection modules is a normal detection module, determining, based on the assumption, whether the tampering detection result stored in step b) and a newly received tampering detection result are contradictory, and when determining positively, identifying the detection module assumed to be normal as an abnormal detection module.

(18) The above Embodiments and Modifications may be combined with one another.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

In the areas of manufacturing and selling management apparatuses that provide software for information processing devices, the present invention is useful as technology for the management apparatus to identify unauthorized software operating on the information processing device and to update the software securely.

REFERENCE SIGNS LIST 10, 11 detection system
12 software updating system
100, 100a device
110, 111 applications
120, 120a protection control module
121 new protection control module
130, 130a detection module group
131, 132, 133, 134, 135 detection module
131a, 132a, 133a, 134a, 135a detection module
140 access control module
150 OS
160 boot loader
171 CPU
172 EEPROM
173 RAM
200, 200a, 200b management apparatus
210 determination unit
220 module deactivation unit
230 monitoring pattern update unit
240 updated software delivery unit
250 transmission unit
301 reception unit
302 sending unit
303 control unit
304 decryption loading unit
305 tampering detection unit
306 analysis tool detection unit
307 encryption/decryption key storage unit
308 encryption/decryption key sharing unit
309 certificate generation unit
310 encryption/decryption key reconstruction unit
311 encryption/decryption key generation unit
401 reception unit
402 sending unit
403 control unit
404 verification unit
405 MAC value generation unit
406 MAC value table updating unit
407 updating unit
408 authentication unit
409 share storage unit
501 reception unit
502 sending unit
503 access information storage unit
601 reception unit
602 sending unit
603 instruction generation unit
604 module identifying unit
605 detection results storage unit
701 reception unit
702 sending unit
703 access information acquisition key storage unit
704 detection module selection unit
801 reception unit
802 sending unit
803 monitoring pattern generation unit
804 control unit
901 reception unit
902 sending unit
903 control unit
904 authentication unit
905 encryption key generation unit
906 encryption unit
907 detection module selection unit
908 certificate generation unit
909 signature private key storage unit
910 updated software storage unit
911 encryption key storage unit

The invention claimed is:

1. A management apparatus for managing an information security apparatus that includes a plurality of monitoring modules that monitor for tampering, the management apparatus comprising:

a non-transitory memory device that stores a program; and
a processing device that executes the program and causes the management apparatus to operate as:
a reception circuit configured to receive, from the information security apparatus, a plurality of monitoring results generated by the monitoring modules, the monitoring modules each being a source monitoring module that monitors and generates a monitoring result for at least one other of the monitoring modules, and each being a target monitoring module that is monitored by at least one other of the monitoring modules;
a detection circuit configured to detect an abnormality relating to tampering of one of the monitoring modules, by referring to fewer than all of the monitoring results received by the reception unit; and
an identification circuit configured to identify, when the abnormality related to the tampering is detected, a monitoring module that has been tampered with from among (i) a monitoring module that generates a monitoring result related to the abnormality, and (ii) one or more monitoring modules identified by tracing back through a chain of monitoring modules consecutively from a target monitoring module to a source monitoring module that is a monitoring module that generates a monitoring result for the target monitoring module, starting from the monitoring module that generates the monitoring result related to the abnormality, the chain including one or more links each associating a source monitoring module that generates a monitoring result for a target monitoring module with the target monitoring module monitored by the source monitoring module.

2. The management apparatus of claim 1, wherein
the detection circuit detects, as the abnormality, an inconsistency between two or more monitoring results for one of the monitoring modules, and
the identification circuit identifies the monitoring module that has been tampered with by tracing back through chains of monitoring modules by referring to the two or more monitoring results.

3. The management apparatus of claim 2, wherein
the monitoring modules in the information security apparatus each monitor one or more other monitoring modules for tampering at a point in time and transmit the monitoring results,
the reception circuit receives the monitoring results for the point in time,
the detection circuit detects the inconsistency by determining whether, among the monitoring results received by the reception circuit, a first monitoring result and a second monitoring result for one of the monitoring modules match, and
the identification circuit (i) consecutively traces back through chains of monitoring modules, respectively starting with the first monitoring result and the second monitoring result, by referring to other monitoring results that indicate no tampering, (ii) determines whether an identical monitoring module is arrived at, and (iii) when determining positively, identifies the identical monitoring module as the monitoring module that has been tampered with.

4. The management apparatus of claim 2, wherein
the monitoring modules in the information security apparatus each monitor one or more of the other monitoring modules for tampering at a first point in time and at a later second point in time and transmit the monitoring results at the respective points in time,
the reception circuit receives the monitoring results for the first point in time and the monitoring results for the second point in time,
the detection circuit detects, among the monitoring results received by the reception circuit, the inconsistency when (i) a first monitoring result by a first monitoring module for a second monitoring module at the first point in time indicates that the second monitoring module has been tampered with, and (ii) a second monitoring result by the first monitoring module for the second monitoring module at the second point in time indicates that the second monitoring module has not been tampered with, and
when the detection circuit detects the inconsistency, the identification circuit identifies the first monitoring module as the monitoring module that has been tampered with.

5. The management apparatus of claim 1, wherein
the monitoring modules in the information security apparatus each monitor one or more of the other monitoring modules for tampering at a first point in time and at a later second point in time and transmit the monitoring results at the respective points in time,
the reception circuit receives the monitoring results for the first point in time and the monitoring results for the second point in time,
the detection circuit detects, among the monitoring results received by the reception circuit, the abnormality when (i) a first monitoring result by a first monitoring module for a second monitoring module at the first point in time indicates that the second monitoring module has been tampered with, and (ii) a second monitoring result by the second monitoring module for the first monitoring module at the second point in time indicates that the first monitoring module has not been tampered with, and
when the first monitoring result indicates that the second monitoring module has been tampered with and the second monitoring result indicates that the first monitoring module has not been tampered with, the identification circuit identifies the second monitoring module as the monitoring module that has been tampered with.

6. A management method used in a management apparatus for managing an information security apparatus that includes a plurality of monitoring modules that monitor for tampering, the management method comprising the steps of:
a) receiving, from the information security apparatus, a plurality of monitoring results generated by the monitoring modules, the monitoring modules each being a source monitoring module that monitors and generates a monitoring result for at least one other of the monitoring modules, and each being a target monitoring module that is monitored by at least one other of the monitoring modules;
b) detecting an abnormality relating to tampering of one of the monitoring modules by referring to fewer than all of the monitoring results received in the receiving step; and
c) identifying, when the abnormality related to the tampering is detected, a monitoring module that has been tampered with from among (i) a monitoring module that generates a monitoring result related to the abnormality, and (ii) one or more monitoring modules identified by tracing back through a chain of monitoring modules consecutively from a target monitoring module to a source monitoring module that is a monitoring module that generates a monitoring result for the target monitoring module, starting from the monitoring module that generates the monitoring result related to the abnormality, the chain including one or more links each associating a source monitoring module that generates a monitoring result for a target monitoring module with the target monitoring module monitored by the source monitoring module.

7. A non-transitory computer-readable recording medium having recorded thereon a computer program for management used in a management apparatus for managing an information security apparatus that includes a plurality of monitoring modules that monitor for tampering, the computer program causing the management apparatus, which is a computer, to execute the steps of:
a) receiving, from the information security apparatus, a plurality of monitoring results generated by the monitoring modules, the monitoring modules each being a source monitoring module that monitors and generates a monitoring result for at least one other of the monitoring modules, and each being a target monitoring module that is monitored by at least one other of the monitoring modules;

b) detecting an abnormality relating to tampering of one of the monitoring modules, by referring to fewer than all of the monitoring results received in step a); and c) identifying, when the abnormality related to the tampering is detected, a monitoring module that has been tampered with from among (i) a monitoring module that generates a monitoring result related to the abnormality, and (ii) one or more monitoring modules identified by tracing back through a chain of monitoring modules consecutively from a target monitoring module to a source monitoring module that is a monitoring module that generates a monitoring result for the target monitoring module, starting from the monitoring module that generates the monitoring result related to the abnormality, the chain including one or more links each associating a source monitoring module that generates a monitoring result for a target monitoring module with the target monitoring module monitored by the source monitoring module.

8. An integrated circuit for managing an information security apparatus that includes a plurality of monitoring modules that monitor for tampering, the integrated circuit comprising:

a non-transitory memory device that stores a program; and a processing device that executes the program and causes the integrated circuit to operate as:

a reception circuit configured to receive, from the information security apparatus, a plurality of monitoring results generated by the monitoring modules, the monitoring modules each being a source monitoring module that monitors and generates a monitoring result for at least one other of the monitoring modules, and each being a target monitoring module that is monitored by at least one other of the monitoring modules;

a detection circuit configured to detect an abnormality relating to tampering of one of the monitoring modules by referring to fewer than all of the monitoring results received by the reception circuit; and an identification circuit configured to identify, when the abnormality related to the tampering is detected, a monitoring module that has been tampered with from among (i) a monitoring module that generates a monitoring result related to the abnormality, and (ii) one or more monitoring modules identified by tracing back through a chain of monitoring modules consecutively from a target monitoring module to a source monitoring module that is a monitoring module that generates a monitoring result for the target monitoring module, starting from the monitoring module that generates the monitoring result related to the abnormality, the chain including one or more links each associating a source monitoring module that generates a monitoring result for a target monitoring module with the target monitoring module monitored by the source monitoring module.

9. A monitoring system formed by an information security apparatus that includes a plurality of monitoring modules that monitor for tampering and a management apparatus for managing the information security apparatus, the management apparatus comprising:

a non-transitory memory device that stores a program; and a processing device that executes the program and causes the management apparatus to operate as:

a reception circuit configured to receive, from the information security apparatus, a plurality of monitoring results generated by the monitoring modules, the monitoring modules each being a source monitoring module that monitors and generates a monitoring result for at least one other of the monitoring modules, and each being a target monitoring module that is monitored by at least one other of the monitoring modules;

a detection circuit configured to detect an abnormality relating to tampering of one of the monitoring modules by referring to fewer than all of the monitoring results received by the reception circuit; and an identification circuit configured to identify, when the abnormality related to the tampering is detected, a monitoring module that has been tampered with from among (i) a monitoring module that generates a monitoring result related to the abnormality, and (ii) one or more monitoring modules identified by tracing back through a chain of monitoring modules consecutively from a target monitoring module to a source monitoring module that is a monitoring module that generates a monitoring result for the target monitoring module, starting from the monitoring module that generates the monitoring result related to the abnormality, the chain including one or more links each associating a source monitoring module that generates a monitoring result for a target monitoring module with the target monitoring module monitored by the source monitoring module.

* * * * *